US010846672B2

(12) United States Patent
Dion et al.

(10) Patent No.: US 10,846,672 B2
(45) Date of Patent: Nov. 24, 2020

(54) KIOSKS FOR REMOTE COLLECTION OF ELECTRONIC DEVICES FOR VALUE, AND ASSOCIATED MOBILE APPLICATION FOR ENHANCED DIAGNOSTICS AND SERVICES

(71) Applicant: A La Carte Media Inc., Montreal (CA)

(72) Inventors: Dominique Dion, Montreal (CA); Tony Mastronardi, Montreal (CA); David Bordeleau, Montreal (CA)

(73) Assignee: A LA CARTE MEDIA, INC., Montreal (CA)

(*) Notice: Subject to any disclaimer, the term of this patent is extended or adjusted under 35 U.S.C. 154(b) by 319 days.

(21) Appl. No.: 15/598,004

(22) Filed: May 17, 2017

(65) Prior Publication Data

US 2017/0323279 A1 Nov. 9, 2017

Related U.S. Application Data

(63) Continuation-in-part of application No. 15/153,137, filed on May 12, 2016, now Pat. No. 10,339,509.
(Continued)

(51) Int. Cl.
*G06Q 40/00* (2012.01)
*G06Q 20/18* (2012.01)
(Continued)

(52) U.S. Cl.
CPC ............ *G06Q 20/18* (2013.01); *A63F 13/85* (2014.09); *G06K 9/6267* (2013.01); *G06K 9/78* (2013.01);
(Continued)

(58) Field of Classification Search
CPC ..... G07F 11/62; G06Q 30/0641; G06Q 20/18
See application file for complete search history.

(56) References Cited

U.S. PATENT DOCUMENTS 6,595,342 B1 7/2003 Maritzen et al.
2003/0088455 A1* 5/2003 Gruber ................... G06Q 30/02
705/14.12
(Continued)

FOREIGN PATENT DOCUMENTS

WO WO 2010/040116 A1 4/2010
WO WO 2012/138679 A1 10/2012
WO WO 2014/165146 A1 10/2014

OTHER PUBLICATIONS

Ferriolo, Shayn (The Key to Kiosks,https://multichannelmerchant.com/marketing/the-key-to-kiosks/, Jun. 1, 2003) (Year: 2003).*
(Continued)

*Primary Examiner* — Bruce I Ebersman
*Assistant Examiner* — Mark H Gaw
(74) *Attorney, Agent, or Firm* — Nixon & Vanderhye, P.C.

(57) ABSTRACT

A kiosk for accepting a portable electronic device from a client in exchange for payment includes a display, one or more cameras, a portable device receiving arrangement, a payment dispensing arrangement, and a communication connection to a remote server and/or operator. The kiosk is configured to, in conjunction with the remote server and/or operator, perform one or more of associating a fundraising even with an amount payable for the accepted portable electronic device, change or defer payments in accordance with at least some attributes that are yet to be evaluated, and to perform authentication of the accepted portable electronic device.

20 Claims, 46 Drawing Sheets

Related U.S. Application Data

(60) Provisional application No. 62/160,115, filed on May 12, 2015.

(51) Int. Cl.

| | | |
|---|---|---|
| *G06Q 30/02* | (2012.01) | |
| *G06K 9/78* | (2006.01) | |
| *G06K 9/62* | (2006.01) | |
| *H04N 5/232* | (2006.01) | |
| *G06T 7/00* | (2017.01) | |
| *A63F 13/85* | (2014.01) | |
| *G07F 17/32* | (2006.01) | |
| *G07F 19/00* | (2006.01) | |
| *G06F 3/0482* | (2013.01) | |
| *G06F 3/0488* | (2013.01) | |

(52) U.S. Cl.
CPC ..... *G06Q 30/0208* (2013.01); *G06Q 30/0279* (2013.01); *G06T 7/0002* (2013.01); *G07F 17/3216* (2013.01); *G07F 17/3244* (2013.01); *G07F 19/20* (2013.01); *H04N 5/232* (2013.01); *H04N 5/23206* (2013.01); *G06F 3/0482* (2013.01); *G06F 3/0488* (2013.01); *G07F 17/3295* (2013.01)

(56) References Cited

U.S. PATENT DOCUMENTS

| | | | |
|---|---|---|---|
| 2009/0024528 A1* | 1/2009 | Otero | G06Q 20/10 705/44 |
| 2012/0016518 A1* | 1/2012 | Saario | G06Q 20/18 700/232 |
| 2012/0191562 A1 | 7/2012 | Bowles et al. | |
| 2012/0197812 A1* | 8/2012 | Ishii | G06Q 10/08 705/308 |
| 2012/0271701 A1* | 10/2012 | Keck | G06Q 30/06 705/14.25 |
| 2013/0261793 A1* | 10/2013 | Geller | G06Q 30/06 700/234 |
| 2014/0195442 A1* | 7/2014 | Kraft | G06Q 20/20 705/306 |
| 2016/0098689 A1 | 4/2016 | Bowles et al. | |
| 2016/0132840 A1 | 5/2016 | Bowles et al. | |
| 2016/0328684 A1 | 11/2016 | Bowles et al. | |

OTHER PUBLICATIONS

Extended European Search Report in corresponding EP Appln. No. 16792261.6 dated Sep. 5, 2018.
International Search Report in corresponding Application No. PCT/IB2018/055218 dated Oct. 18, 2018.
International Search Report and Written Opinion dated Sep. 22, 2016.

* cited by examiner

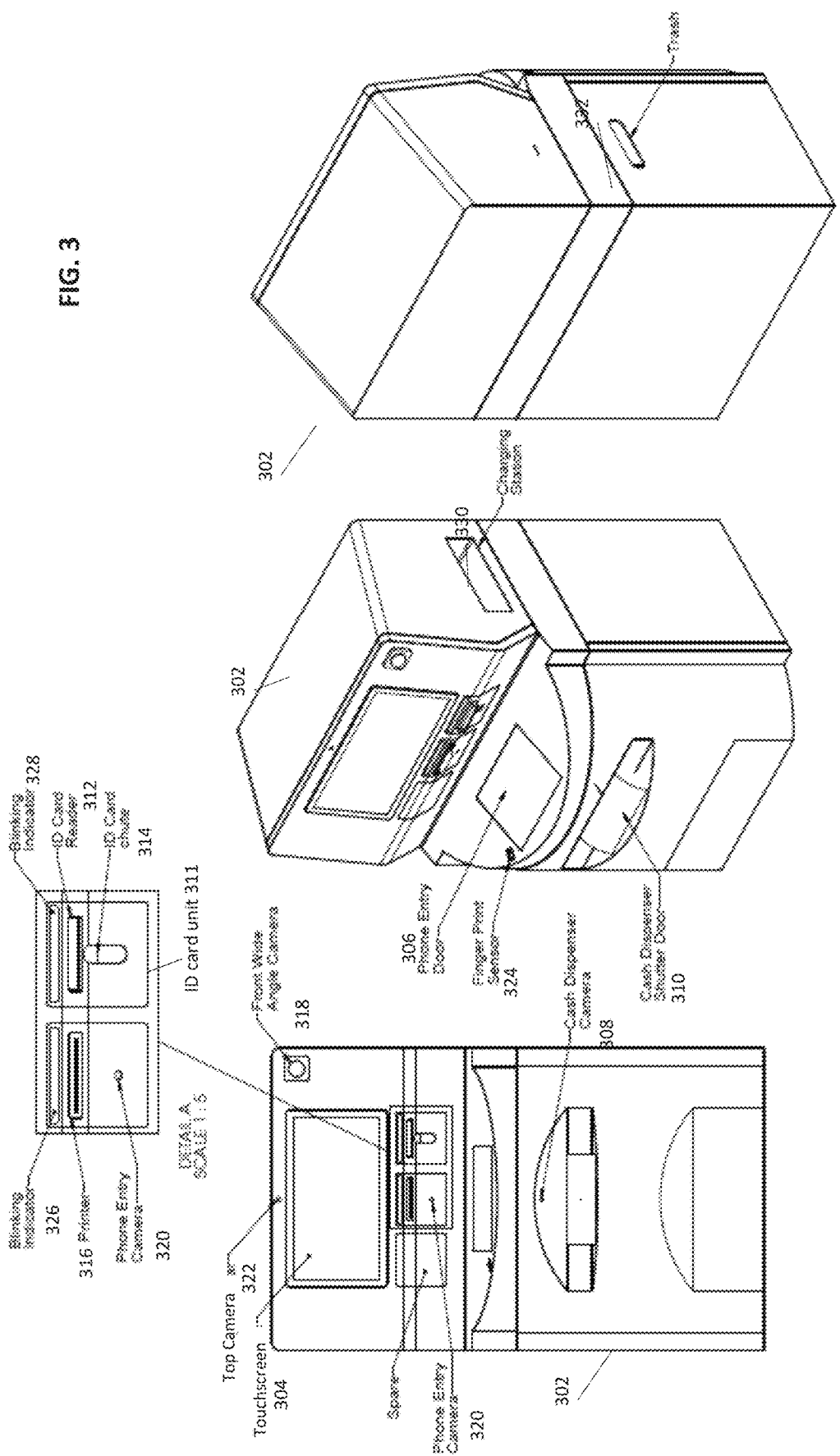

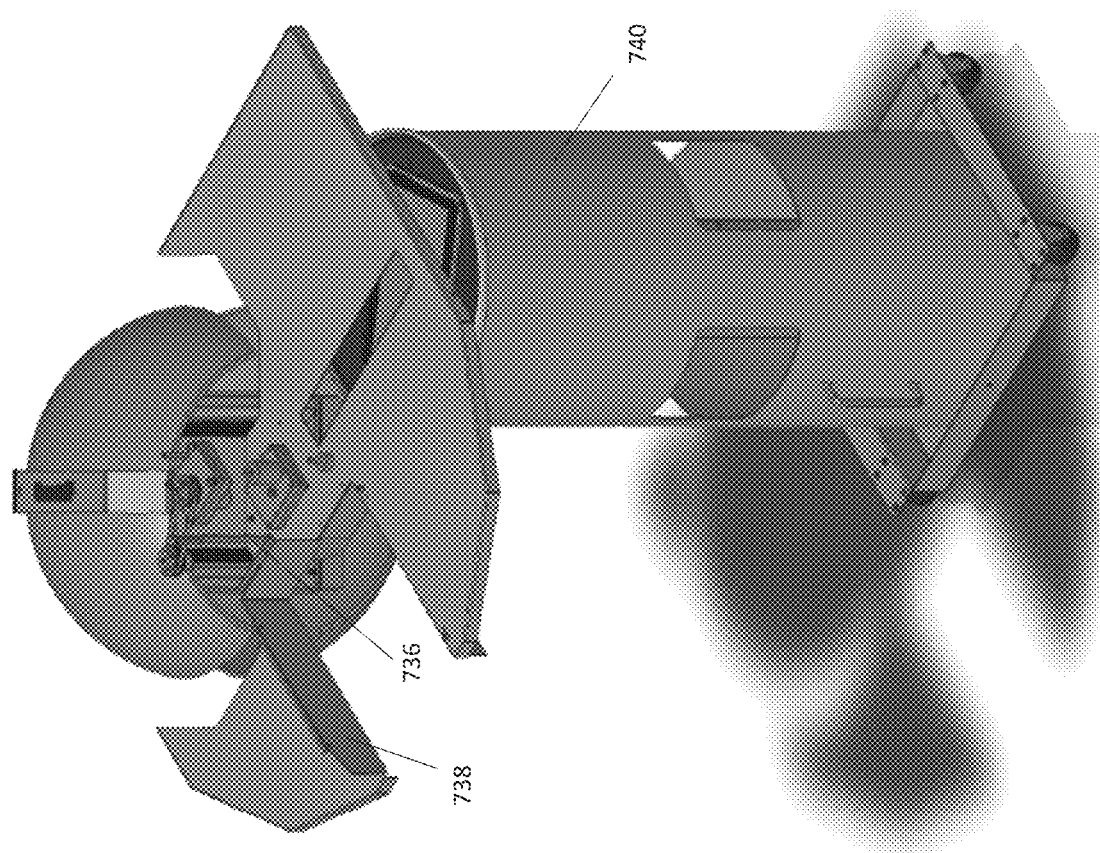

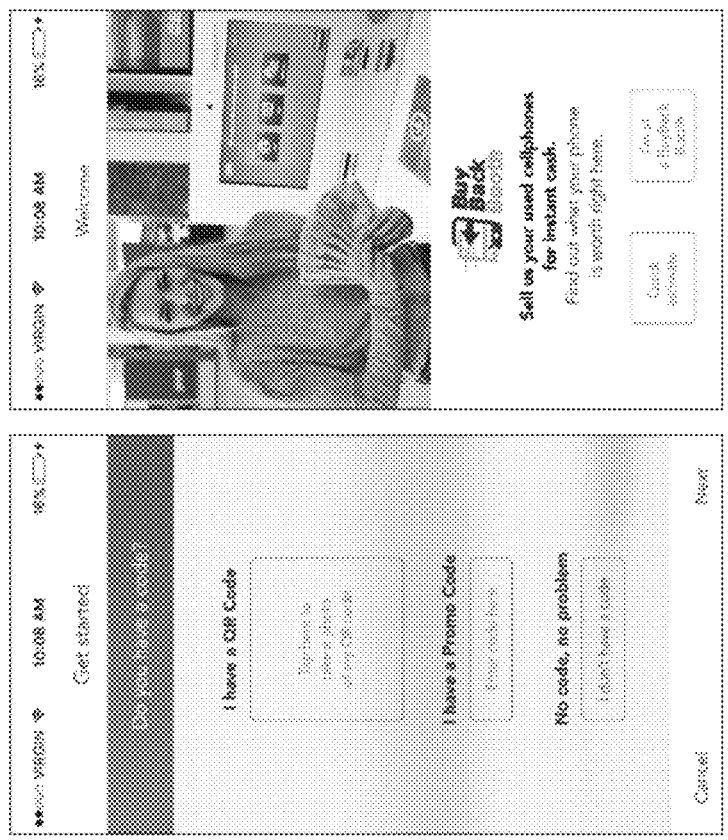

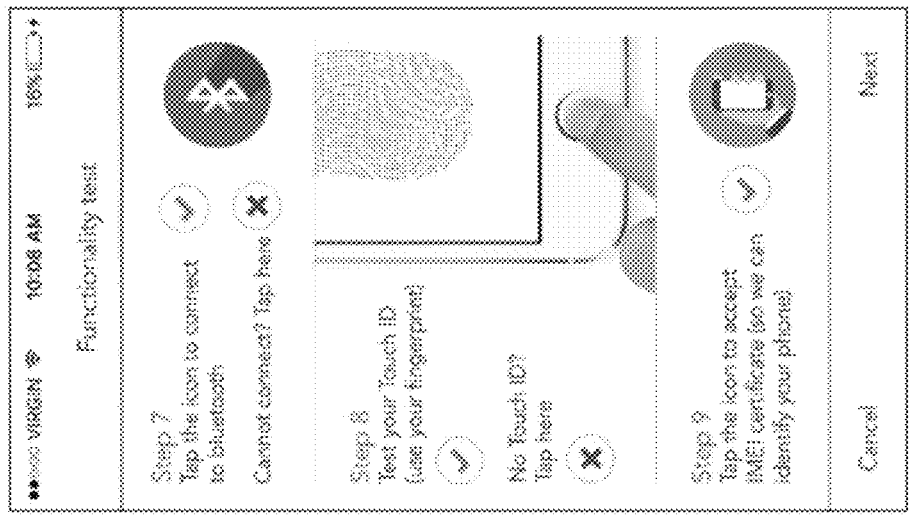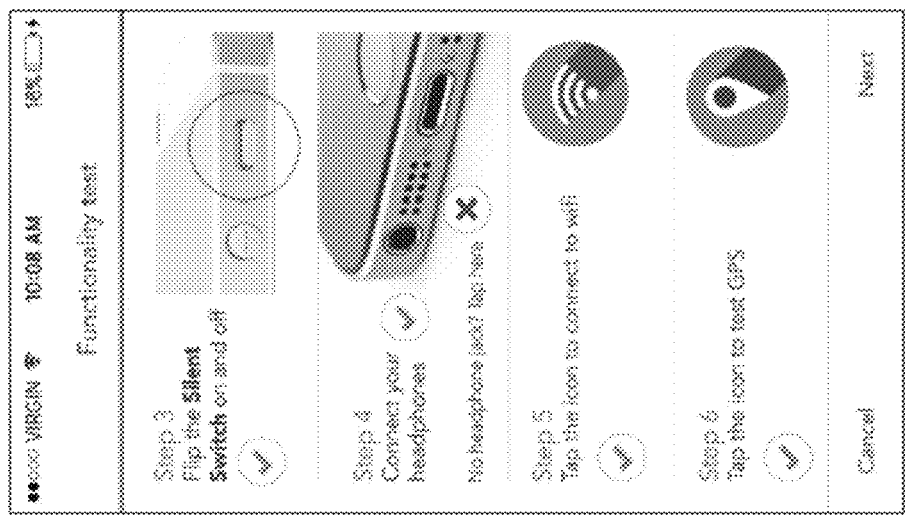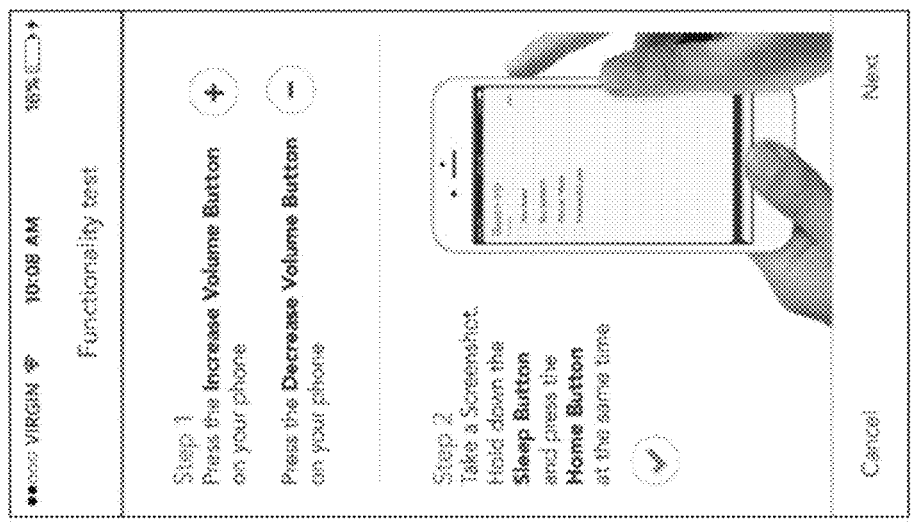
FIG. 37

| desired_markup_% =<br>base_markup_% +<br>risk_markup_for_model_% +<br>risk_markup_for_buyer_% +<br>risk_markup_for_area_% | 20% +<br>25% +<br>0% +<br>-10%<br>= 30% |
|---|---|
| Offered_price =<br>selling_price /<br>(1+desired_markup) | 100 /<br>(1,30)<br>= 76,92$ |
| Other rules:<br>- transportation_fee_from_area<br>... | -2<br>= 74,92$ |

FIG. 40

KIOSKS FOR REMOTE COLLECTION OF ELECTRONIC DEVICES FOR VALUE, AND ASSOCIATED MOBILE APPLICATION FOR ENHANCED DIAGNOSTICS AND SERVICES

CROSS-REFERENCE TO RELATED APPLICATIONS

This application is a continuation-in-part of U.S. patent application Ser. No. 15/153,137 filed on May 12, 2016, which claims the benefit of U.S. Provisional Patent Application No. 62/160,115 filed on May 12, 2015, which is hereby incorporated by reference in its entirety.

FIELD OF THE TECHNOLOGY

The technology presented herein relates to systems and methods related to the remote collection of small electronic devices in exchange for value. For example, the technology presented herein may be used in a distributed set of kiosks configured to accept a client's used electronic device, such as, for example, a smartphone, tablet computer, a smart watch or the like, and to provide the client with an amount in money for an estimated value of that accepted used electronic device.

BACKGROUND

Many people often find themselves in situations where, after having bought a new smartphone or some other consumer electronic device to replace an older device, they would like to conveniently and safely dispose of the old device. In many instances, such persons may desire to trade the old device for some monetary gain. Although they may use a service such as Ebay or the like to list and sell the old device, such avenues for disposing old devices are not convenient in that one must manually perform a number of steps such as listing the device for sale, monitoring purchase offers, provide the buyer with the device via mail or other manner, wait a relatively long time before receiving the money from the buyer, and even after the transaction has completed, still run the risk of subjecting oneself to adverse comments by the buyer and/or return of the device.

Distributed collection centers, such as collection kiosks (herein sometimes also referred to as "booths") that are configured to accept a client's smartphone and to then provide the client with an amount of money corresponding to an estimated value are known, such as those provided by ecoATM™ However, further improvements are desired in order to make the process of trading in old consumer electronic devices more convenient for clients and more reliable and efficient for the kiosk operators (e.g., kiosk owners, entity responsible for collecting electronic devices from multiple kiosks for subsequent trading).

Embodiments disclosed in this application provide for remote distributed collection kiosks for efficiently collecting certain electronic devices.

SUMMARY

A kiosk for accepting a portable electronic device from a client in exchange for payment includes a display, one or more cameras, a portable device receiving arrangement, a payment dispensing arrangement, and a communication connection to a remote server and/or operator. The kiosk is configured to, in conjunction with the remote server and/or operator, control an application program executing on the portable electronic device and one or more of the cameras to detect characteristics of the portable electronic device. The kiosk is also configured to determine a value for the portable electronic device based upon aspects including the detected characteristics, and to display the determined value on said at least one display for approval by the client. Subsequently, based upon the determined value, the kiosk provides a payment to the client via the payment dispensing arrangement, and deposits the portable electronic device in the kiosk for subsequent collection.

A system comprising a plurality of call center terminals, a central server, and a plurality of kiosks, such as above, connected to the call center terminals and the central server via a network is also described.

According to some example embodiments, a distributed kiosk system is provided. The kiosk system comprises a central server and a plurality of kiosks. Each kiosk includes a portable device receiving arrangement and a payment dispensing arrangement, and is connected to the central server via a network. Each kiosk is configured to receive a portable electronic device deposited by a client, display a list of one or more fundraising campaigns from a database, receive a client selection of a selected fundraising campaign from the displayed list, determine a value of the deposited portable electronic device, credit a first amount to the selected fundraising campaign wherein the first amount is determined based at least upon the determined value, and pay to the client a second amount determined based upon the determined value and the first amount.

According to some example embodiments, a method includes acquiring by an app executed on a portable electronic device information regarding the portable electronic device, analyzing the acquired information, determining an estimated payable amount for the portable electronic device based on the analyzing, displaying on a screen of the portable electronic device the estimated payable amount for the portable electronic device, receiving the portable electronic device in a kiosk, further analyzing the portable electronic device in the kiosk, and displaying on a screen of the kiosk a finalized payable amount determined based upon said analyzing the portable electronic device in the kiosk and the estimated payable amount.

According to some example embodiments, a method includes receiving information associated with a first portable electronic device from a second portable electronic device, the information including an image of the first electronic device captured by a camera of the second portable electronic device; receiving the first portable electronic device in a kiosk; controlling the kiosk to acquire additional information regarding the first portable electronic device and analyze the first portable electronic device, wherein the controlling is performed based on the information received from the second portable electronic device; determining a proposed payable amount for the first portable electronic device based upon the acquired information and the analysis; and displaying the proposed payable amount.

According to some example embodiments, a distributed kiosk system comprises a central server and a plurality of kiosks. Each kiosk includes a portable device receiving arrangement and a payment dispensing arrangement, and is connected to the central server via a network. Each kiosk is configured to: receive, using the portable device receiving arrangement, a portable electronic device deposited by a client;

determine values for a first subset of attributes of the received portable electronic device using at least a first evaluation performed by a kiosk and/or an application executed on the portable electronic device; identify a second subset of attributes of the received portable electronic device, wherein values for the second subset of attributes remain unverified by said at least one first evaluation; determine a first price for the portable device based at least in part on the first subset of attributes, and determine at least a second price based at least on the second subset of attributes; and dispense payment of the first price and another amount based on the at least the second price at respectively different times.

According to an embodiment, a distributed kiosk system comprises a central server and a plurality of kiosks. Each kiosk includes a portable device receiving arrangement and a payment dispensing arrangement and is connected to the central server via a network. The central server is configured to: receive from one of a portable electronic device or a kiosk of the plurality of kiosks, a message including a unique identifier displayed by the other of the portable electronic device or the kiosk; perform verification of the received unique identifier and the other of the portable electronic device or the kiosk; and in response to the verification, enable communication between the kiosk and the portable electronic device in relation to evaluating the portable electronic device in the kiosk.

BRIEF DESCRIPTION OF THE DRAWINGS

FIGS. 3-5 schematically illustrates various hardware aspects of an electronic device collection kiosk, according to some embodiments.

FIG. 35 illustrates a screen for acquiring a promotion code or QR code from the client, according to some embodiments.

FIG. 36 illustrates a screen providing for the user to select between the two options, according to some embodiments.

FIG. 37 shows screens for guiding the client through testing various buttons and ports of the trade device, according to some embodiments.

FIG. 40 illustrates a potential formula for establishing the offered price, according to some embodiments.

DETAILED DESCRIPTION

Exemplary embodiments of this disclosure include an electronic device collection kiosk that facilitates remote distributed collection of electronic devices in exchange for a monetary value or other value. The electronic devices that may be collected in these kiosks may include consumer electronic devices or portable electronic devices such as, but not limited to, smartphones, tablet computers, smart watches, game devices, personal health monitoring devices, or other processor-based electronic devices. In some cases, it may be expected that the kiosks described herein will more frequently collect smartphones and the like which are in widespread use and are often replaced with newer versions on a relatively short (e.g., 2-4 years) replacement cycle by many consumers. These embodiments will be described with reference to the accompanying drawings. It should be noted that the embodiments described below are illustrative only, in order to describe, for example, the electronic device collection kiosk according to this disclosure is formed and operated, and it is not intended to limit the electronic device collection kiosk or the like according to this disclosure to specific configurations described below. Other specific configurations may be employed as appropriate according to the embodiments.

Figure 1:
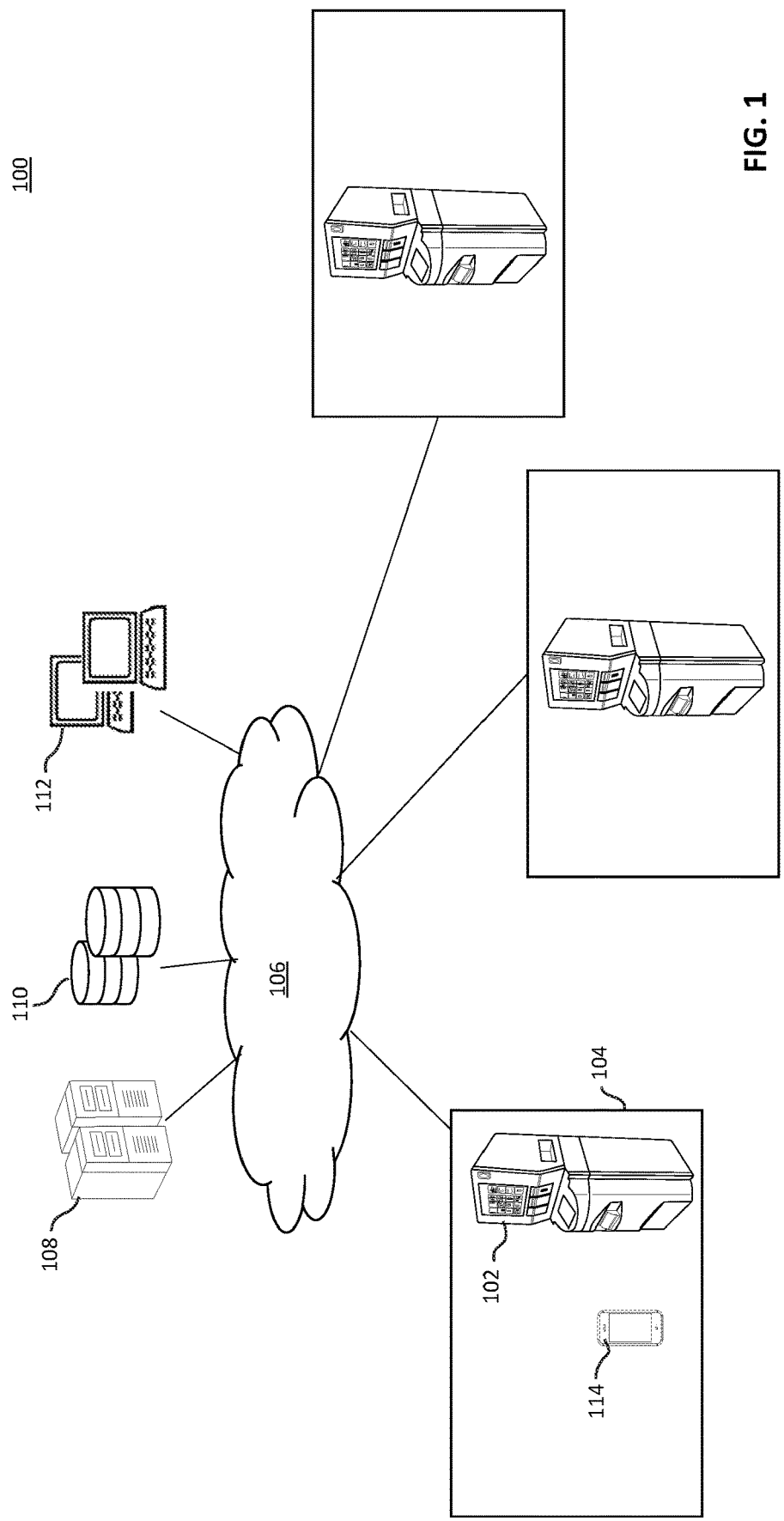
FIG. 1 illustrates a system view of a network of remote distributed electronic device collection kiosks, according to some embodiments.

FIG. 1 illustrates a system 100 comprising a network of distributed electronic device collection kiosks, according to certain example embodiments. A plurality of electronic device collection kiosks (hereinafter referred to simply as "kiosk(s)") 102 are located at various geographically distributed locations. Each kiosk 102 may be physically located within a kiosk premise 104. The kiosk premise 104 may be a building or other area under the supervision of, for example, a retail store or other enterprise.

The kiosks 102 are connected via one or more communication networks 106 to data processing servers 108, data storage 110 and a call center 112. The network 106 may include, but is not limited to, the Internet and/or one or more other communications networks such as local area networks, wide area network, cellular connection, and/or point-to-point communication connections.

The processing servers (sometimes referred to herein as central servers) 108, storage servers 110 and call center 112 may be located at the same geographical location or at different locations. The processing servers 108 may include one or more of any type of computers and are configured to perform processing and/or analysis of data collected at the kiosks 102 and information related to the electronic devices that are being collected at the kiosks 102. The processing at one or more processing servers 108 may include real-time processing of information with respect to a currently ongoing transaction between a kiosk in the network and a client. For example, the information transmitted by a kiosk during a trade transaction can be progressively monitored and analyzed, for example, by comparing known information about the device currently being traded to information about known counterfeits. In some embodiments, the processing servers may receive and process information acquired by a trade device during an evaluation or pre-evaluation process. In yet other embodiments, another device (e.g., a smartphone other than the trade device) may acquire images and other information regarding a trade device and/or user and may transmit to the processing servers for processing. In certain example embodiments, processing servers 108 may include, or may access, a pricing server which is configured to provide suggested prices for various types of electronic devices identified at a kiosk. As further described below, in some example embodiments, one or more processing servers 108 may keep track of a fundraising project or the like that is spread across the kiosks. The processing servers 108 may also include a pricing server which, with the assistance of a pricing database in databases 110 including pricing information and pricing determination configuration parameters, operate to provide querying kiosks with pricing and pricing related information for various portable electronic devices. Given the virtualization of today's computing, the word server used herein may also refer to computing servers that may be running on one or more physical or virtual hardware.

The data storage servers 110 are configured to store information related to electronic devices that may be collected at the kiosks, and data collected at the kiosks (e.g., session data, client information, information regarding consumer electronic devices submitted by clients for analysis, information regarding other activities (e.g., fundraising activities) associated with the kiosks etc.). The data storage servers 110 may comprise any type of digital data storage devices and may use any type of database and/or file structure to collect and maintain the stored data. The data storage servers 110 may also have databases storing profiles for any type of devices that are accepted by kiosks, and performance metrics (e.g., time to complete certain test instructions per model) etc. For example, one or more images from each type of device previously processed by any of the kiosks may be stored in order to be used in automated recognition of devices. Pricing information for already completed transactions, and for other known portable electronic devices may also be stored.

The call center 112 is configured to enable one or more operators ("call center agents" or "call center operators") to interact with users (e.g., clients) who are close to any one of the kiosks 102. The interaction may include one or more of audio, video and data feed. For example, when a person is in close proximity to one of the kiosks 102 in order to submit his electronic device 114 to the kiosk, one or more operators via terminals in the call center 112 may interact with the client regarding the submission of electronic device 114. The interaction may be facilitated by the audio, video and/or data interfaces of the kiosk 102 and/or the user's device 114. In some example embodiments, the services provided by the call center operators may be grouped into two or more classes of services, as described below. In some embodiments, at least some of the call center operators may be fully or partially automated.

Figure 2B:
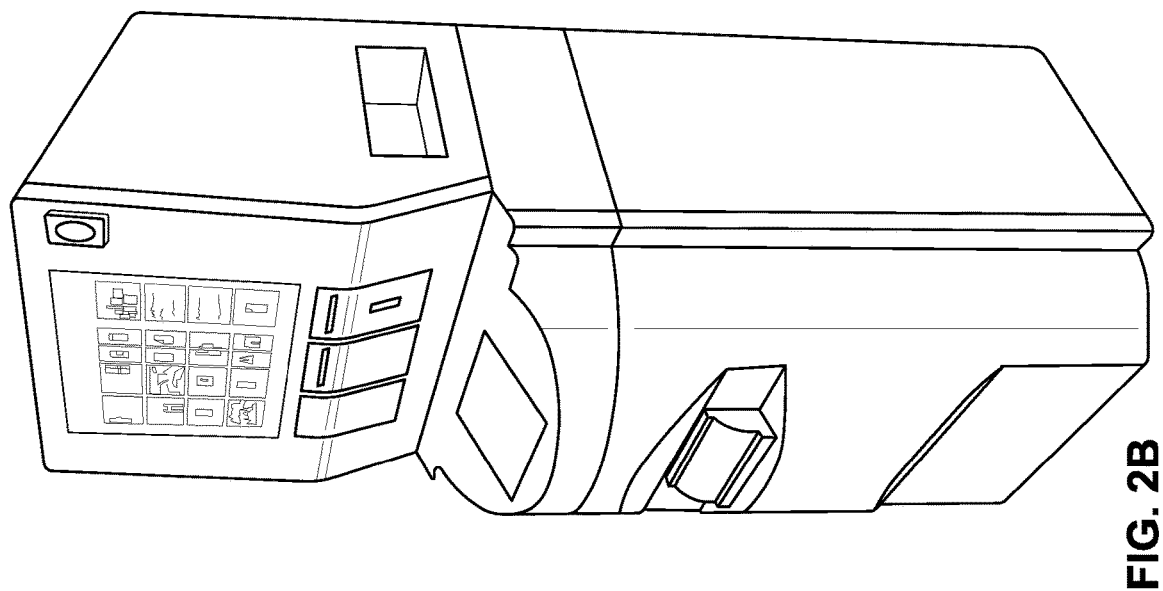
FIGS. 2A-B a front view and an angled view, respectively, of a model electronic device collection kiosk, according to some embodiments.
Figure 2A:
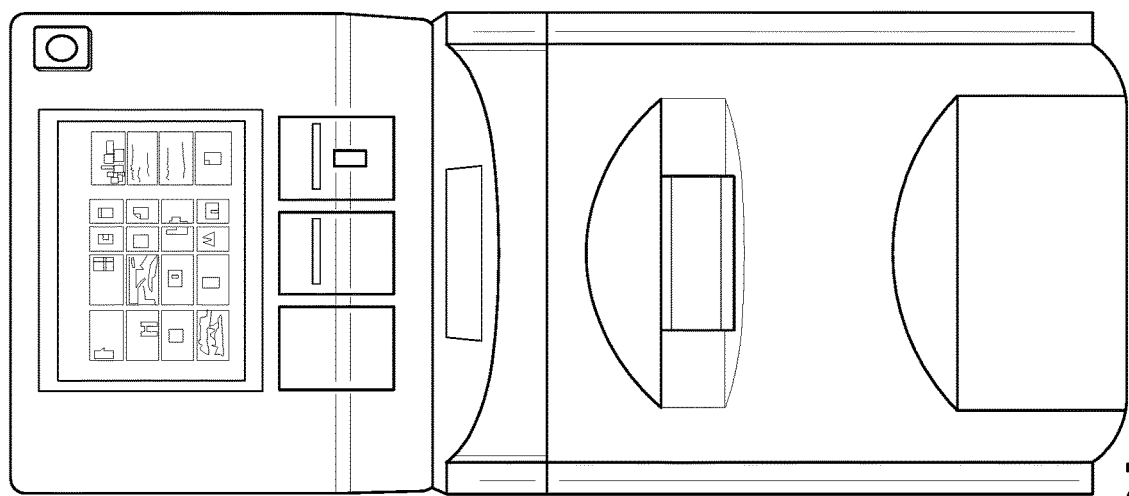
Figure 4:
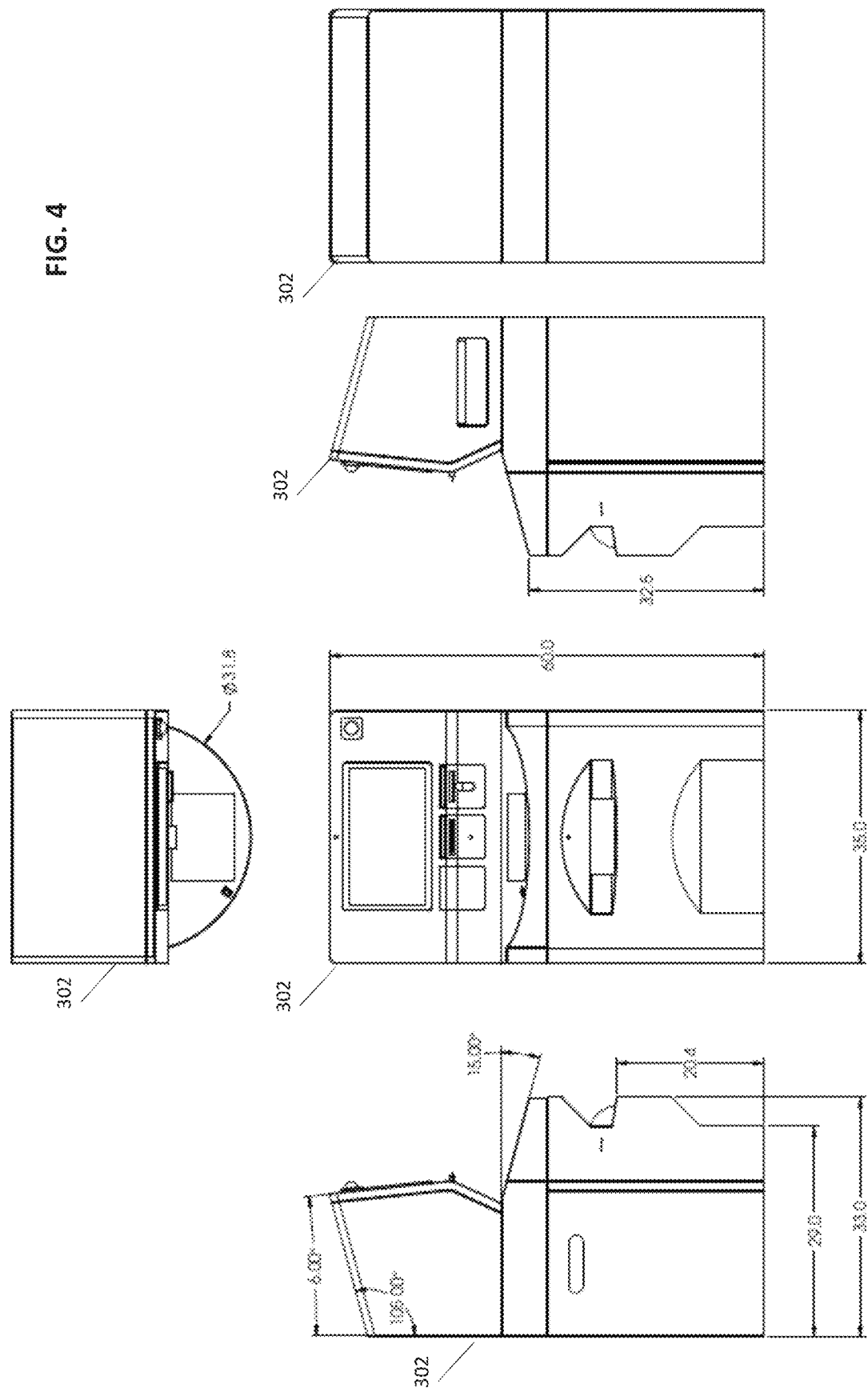
Figure 5:
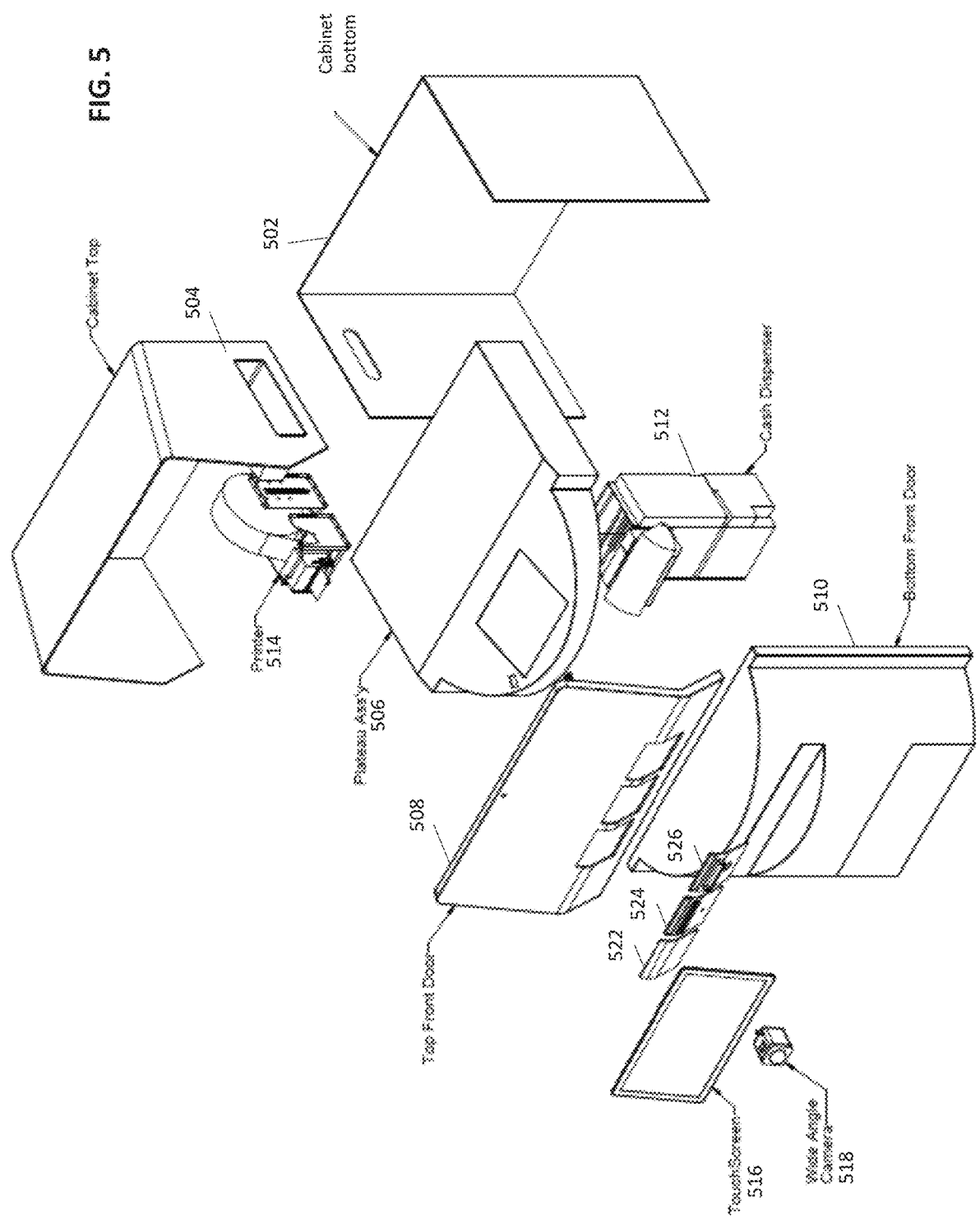

FIGS. 2A and 2B show a front view and an angled view, respectively, of a model electronic device collection kiosk according to certain example embodiments. FIGS. 3-5 schematically illustrates various aspects of an electronic device collection kiosk according to some embodiments.

FIG. 3 schematically illustrates a frontal view (left), an angled frontal view (middle) and an angled rear view (right) of an electronic device collection kiosk 302, according to certain example embodiments.

The kiosk 302 includes a screen 304 to display instructions and messages to the client. Screen 304 may be configured to display messages, images, and/or video. The displayed content may be stored in the kiosk, dynamically generated based upon interactions with the client and/or call center operator, and/or received over a network from an external source such as, for example, processing server 108, storage 110 and/or call center 112. In at least some embodiments, screen 304 may include a touchscreen (e.g. display screen including a touch-sensitive panel) by which the client can provide input to the kiosk using fingers and/or a stylus. The touchscreen may be configured to display a keyboard or the like for the client to provide inputs. In addition to, or in place of the keyboard, the touchscreen may provide displayed buttons and the like that the user can "touch" in order to provide inputs to the computer programs executed on kiosk 302.

The kiosk 302 includes a device entry door 306 that is opened in order for the client to submit the device for scanning and processing and also, in some cases, for the client to retrieve the device from the kiosk 302. The device entry door 306 is manipulated to control access to a scanning area, referred to herein as the camera chamber, where the device is scanned using one or more cameras. In certain example embodiments, device entry door 306 is electronically controlled to open only at certain points during a transaction with a client. For example, the door 306 may be controlled by the kiosk 302 to remain closed at all times except when the displayed messaging on screen 304 indicates that the client may now submit the device for scanning and processing or when the messaging indicates that the client may now retrieve the electronic device. In some embodiments, the device entry door 306 may be opened and/or closed manually by the client.

Kiosk 302 may also include a cash dispenser (not shown in FIG. 3) which has a related cash dispenser camera 308 and a cash dispenser shutter door 310 that controls access to the cash dispenser. The cash dispenser is configured to dispense cash to the client, and has access to a known amount of money in stored cash of one or more value denominations. In certain example embodiments, the cash dispenser shutter door 310 is electronically controlled to provide access to the cash dispenser only at certain times during a transaction. The cash dispenser camera 308 is configured to monitor the cash dispenser door. In some embodiments, the cash dispenser camera 308 is selectively activated to take images and/or record video when the cash dispenser shutter door is activated. For example, during an interval starting shortly before the cash dispenser shutter door is opened to shortly after it is closed, the cash dispenser camera may be activated recording video. In some embodiments, one or more other cameras of the Kiosk too can be activated for all or some part of the duration in which the cash dispenser camera is active. The recorded images/video may be stored in association with an identification of the client or clients who are currently interacting with the kiosk.

In an embodiment of the invention, the kiosk comprises or is connected to a card dispenser unit, which is capable to mechanically dispensing cards such as store gift cards or merchandising coupons or value stored on a card. The card dispenser unit can be of any type, such as simple mechanics dispensing predefined value cards, hybrid models such as the Mutek F5 or multi tray Mutek MTK F56. In an example embodiment of the invention comprising a card dispenser unit, the kiosk is capable of sending instructions to the card dispenser for writing information which may comprise of a unique identification code that can be assigned in a database accessible on the network or otherwise distributed to a variety of database or lists. In some embodiments, a monetary value is assigned to the unique identification code in a database so that, for example, a vending equipment or payment terminal, such as POS systems or card payment system that is capable of functioning with open loop or closed loop card systems can be used. Although not shown separately in FIG. 3, the card dispenser may be incorporated as an output device in the kiosk or the card dispenser may be incorporated in another device such as the cash dispenser.

An ID card unit 311 is provided to accept an ID card, such as, for example, a driver's license. The ID card unit 311 may include an ID card reader 312 and an ID card chute 314. The ID card reader 312 may be configured to accept a submitted ID card such as a driver's license, to move the ID card into a scan region (not separately shown), to read one or more of a magnetic stripe, a smart card chip, or an RFID in the ID card, and/or to scan or photograph one or both sides of that ID card while it is in the scan region. After the ID card has been processed in the ID card reader 312, it may be dropped into the ID card chute 314 or, in some embodiments, be returned through the same or similar card slot as it was put into. The ID card chute may have an electronically or manually controlled door which can be opened to retrieve the ID card. The ID card unit may have an indicator 328 to display status associated with the ID card reader. In some embodiments, the indicator 328 may include one or more indicator lights to indicate one or more its operational statuses such as, for example, ready to receive ID card, scanning in progress, ID card is in the chute. In some embodiments, the indicator 328 may include an LCD display screen in which short status messages can be displayed. In some other embodiments, the ID card unit 311 may include a camera that can capture images of a ID card in sufficient resolution, and associated optical character recognition (OCR) or other technology to process the captured images of the ID card to determine identification information. For example, with such a unit 311, the user of the kiosk may be prompted to hold each side of the ID card up to a camera for an image of sufficient resolution can be captured, and the captured images can be processed by OCR software to detect the associated driver license number, name etc. contained in the ID card.

A printer 316 incorporated into kiosk 302 may be configured to print one or more of receipts, estimates, labels, etc., as commanded by one or more processors in the kiosk. An indicator 326 may be associated with the printer to display its status. In some embodiments, the indicator 326 includes one or more indicator lights which may be associated with the printer to provide visual status of the printer's operation (e.g., "printer busy", "out of paper", etc.). In some other embodiments, the indicator 326 may be an LCD display screen.

The kiosk 302 may also have incorporated into it one or more outside-facing cameras, such as, for example, front wide angle camera 318, device entry monitoring camera 320, and top camera 322. The front wide angle camera 318 and top camera 322 can be configured to capture images of the client as he/she approaches the kiosk and/or interacts with the kiosk. The device entry monitoring camera 320 is configured to provide for monitoring the device entry door 306 and surrounding area, so that aspects relating to the submission of the device to the kiosk and retrieval of the device from the kiosk can be reliably confirmed. The cash dispenser monitoring camera 308 is another outward facing camera provided in at least some embodiments. The kiosk may be configured so that two or more of these cameras can be activated in a coordinated manner. For example, in some examples, one or more of the cameras may be activated based on a trigger detected by one of the cameras (e.g., motion detection from top camera 322 or wide angle camera 318), when triggered by opening of a controlled shutter or door of the kiosk, when the fingerprint reader is activated, when the touchscreen is touched, etc.

A fingerprint scanner 324 may be arranged on the surface of the kiosk 302 such that the client is provided the ability to conveniently provide a fingerprint scan via the kiosk 302. In various embodiments, the fingerprint of a user may be stored by the kiosk in association with the ID card of the client, and may be used in association with agreements etc. as the client's signature, and/or to provide access verification for one or more of the controlled shutters.

Kiosk 302 may also have incorporated in its structure a charging station 330 and/or a trash bin 332. The charging station 330 can be configured for providing clients with the capability to charge devices such as the electronic device which they wish to transact using the kiosk 302. In some embodiments, the charging station 330 includes power outlet such that the client can plug in his own power cord to charge his electronic device. In some other embodiments, one or more different charging cables/connecters of different types (e.g. connectors for iPhone, connector for Samsung Galaxy S5, different types of USB connectors, etc.) may be provided such that the client can select the appropriate charging cable. In yet other embodiments, a combination of the above two techniques may be provided. The charging station may be behind an electronically controlled door. The charging station may, in some embodiments, charge a plugged in device for long as it is left plugged in the charging station. In some other embodiments, the charging station may be configured to provide a measured charge for each plugged in device. The measured charge may be provided based upon a limited time allowed for charging, based upon limited duration and amount of power provided, or based upon a percentage of the battery being charged.

The trash bin 332 is designed to provide clients with the convenience of disposing small amounts of trash such as, for example, wrapping or packaging for electronic devices, labels, receipts, and additional parts associated with the electronic device that is submitted to the kiosk etc. In some embodiments, in place or in addition to the trash bin, another peripherals bin (accessory bin) is provided. The peripheral bin may be protected by a controlled door, and, in some embodiments, may be opened only for a client who has completed a predetermined stage of the transaction process (e.g., stage of actually submitting an electronic device to be scanned by the kiosk, stage of completing authentication by submitting the identification documents, etc.). The peripherals deposited into the bin may be collected in a chute. The collected peripheral etc., may be for purposes of recycling. However, in some embodiments, peripherals submitted to the peripheral bin may be tagged or marked as being associated with an electronic device submitted to the kiosk, so that, if necessary, the peripherals can be associated with the proper electronic device in a downstream activity.

FIG. 4 illustrates several schematic profile views of the kiosk 302, organized into an upper row and a lower row, according to certain example embodiments. In the lower row of images, a left side profile view (left most on page), a front profile view (second from left), a right profile view (third from left), and a rear profile view (right most in page) are shown. A top view (i.e., viewed from above) of kiosk 302 is shown in the upper row. As can be seen in FIG. 4, the charging station 330 and garbage bin 332 can be located on the sides of the kiosk because of their relatively infrequent expected use. The display screen may be slightly angled upwards so that it is more comfortably visible to a client of the kiosk. Fingerprint sensor 324 and electronic device deposit door 306 in a flat surface approximately at the level of a client's hands.

In some example embodiments, the kiosk 302 has at least one security sensor for securing the kiosk. Such security features may be particularly useful for kiosks which may contain significant amount of cash. Such security sensors can be any of or a combination of door(s) opening detection(s), tilt detection, movement detection (for instance using an accelerometer), camera detection which can detect for instance movement inside the cabinet or abnormal amount of light caused by opening.

The security sensors are analyzed by the kiosk computer and a signal (e.g., an alarm) is transmitted to the processing servers 108 and/or call center 112 when abnormal activity is detected. In the event that an alarm is set off by legitimate activities such as maintenance or cash refilling, an operator can, for example, enter a passcode on screen or through a special code on an application (not the user application) to deactivate the alarm system. The security system can also take pictures and record the video signals on the hard drive and make a significant portion available upon security breach, for instance by uploading the last minute of video to the server or sending recent pictures to said server.

FIG. 5 illustrates more detail of certain parts of the kiosk 302. Kiosk cabinet bottom sides and back 502, cabinet top 504, top and bottom front doors 508 and 510, plateau assembly 506 are shown. Cash dispenser 512, printer 514, touchscreen 516, wide angle camera 518, and front covers 522, 524 and 526 for, respectively, the spare opening, printer opening and ID card unit opening shown in the top front door 508, are also illustrated.

Figure 6:
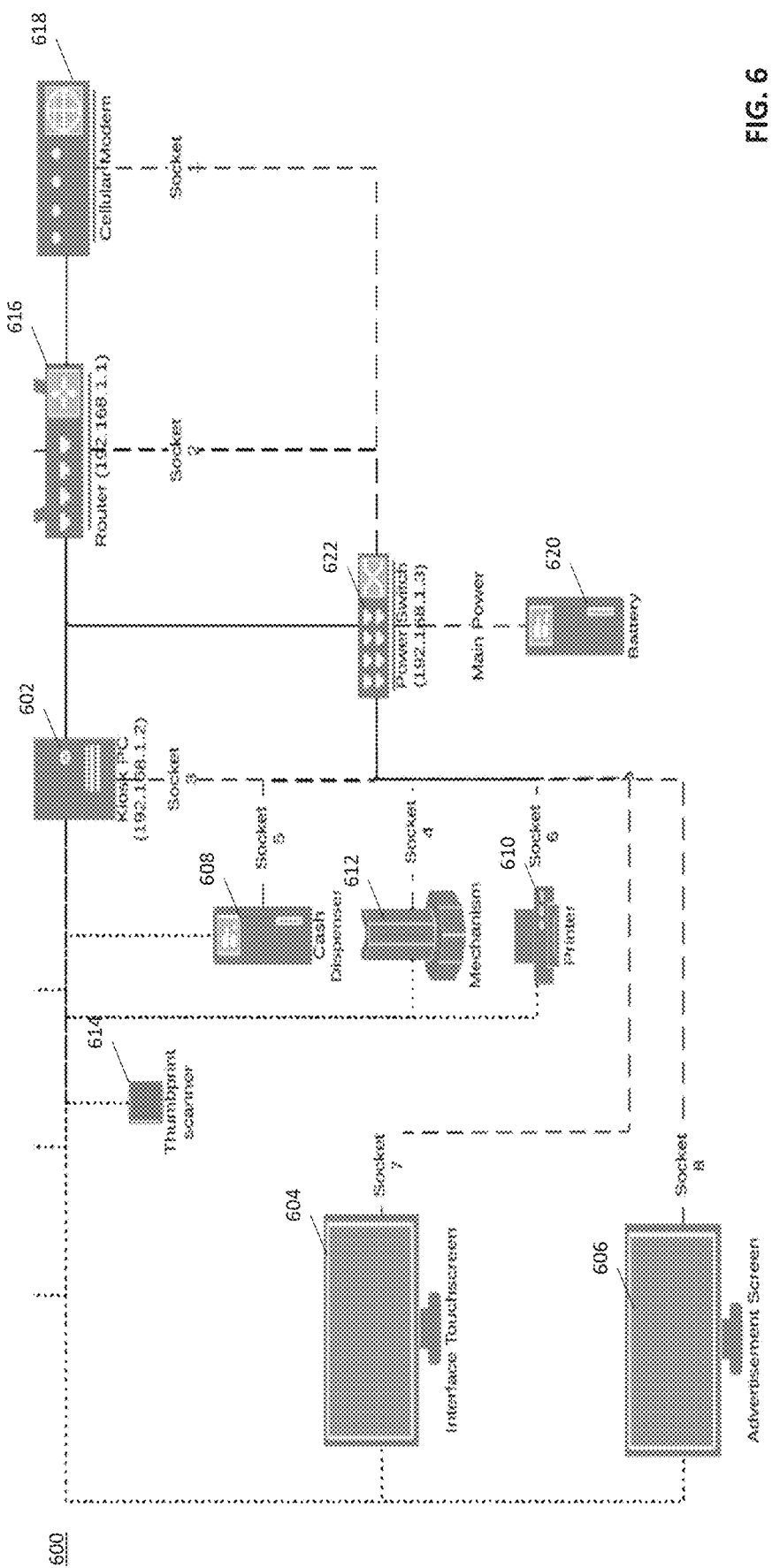
FIG. 6 schematically illustrates interconnections between components in an electronic device collection kiosk, according to an embodiment.

FIG. 6 schematically illustrates a network 600 connecting components in an electronic device collection kiosk such as kiosks 102 and 302, according to an embodiment. For example, according to some embodiments, kiosk 302 may include a kiosk computer 602, an interface touch screen 604, an advertising screen 606, a cash dispenser 608, a printer 610, a mechanism 612, a fingerprint scanner 614, a router 616, a modem 618, a battery 620, and a power switch 622. In some embodiments, the advertising screen 606 may comprise multiple screens including one or more screens that are integrated with the kiosk 302 and one or more that are physically separated from but operably connected to the kiosk 302.

According to some embodiments kiosk computer 602 may be based upon a platform such as, for example, Windows Embedded 8 Standard. The main graphical user interface screen(s) displayed by the kiosk computer 602 to clients or potential clients may be formed, for example, using Chromium (see, for example, https://www.chromium.org) as the container and using one or more of HTML5/Javascript/CSS as the language, and accessing libraries such as, for example, JQuery. The kiosk's main graphical user interface may include all graphical elements, animations, audio and logic associated with client interaction with the kiosk. The main GUI and/or kiosk computer 602 may communicate directly with a server, such as processing server 108, and hardware service through AJAX calls and receives events through web sockets. Included in the main GUI or implemented separately is a digital sign interface for displaying marketing images and/or videos based on a predetermined or remotely-specified sequence. For example, the sequence may be specified from a remote server, such as processing server 108, using a digital sign administrative interface implemented in the kiosk software. The digital sign interface may also be formed using one or more languages such as HTML5/Javascript/CSS, libraries such as JQuery, and a Chromium container.

In addition to the main interface and the digital sign interface, the kiosk may also implement a service interface that may replace the main interface and/or the digital sign interface when activated by a service technician or other entity. The service interface may enable the service technician to access configurations, calibrations and system checks to help correct problems or issues with the kiosk. The service interface logic interacts directly with a hardware service through AJAX calls. The service interface may also be formed using one or more languages such as HTML5/Javascript/CSS, libraries such as JQuery, and a Chromium container.

The software logic implementing the hardware service may be created using a computer programming language such as C++, and using one or more of the libraries CURL, OpenCV, ZBar and DirectShow. The hardware service may be implemented as a Windows Service (e.g. and include automatic startup and recovery). The hardware service contains the logic that interacts with the Operating System and hardware peripherals on the kiosk 302. It may contain an HTTP server which listens for calls from the kiosk interface and service interface. It may also accepts web socket connections to send events to the interfaces. The service may be self-updating, self-configuring and self-healing. Self-updating means that, on startup, the service queries the server for potential updates and executes incremental updates until it reaches the latest version. In case of issues, the service reverts back to its previous known good version. Self-configuring means that, on startup, the service verifies Operating System configurations and corrects any discrepancies. It also verifies all its configuration options (i.e., COM Port numbers, Camera assignations) and tries to correct any issues automatically. Self-healing means that when a hardware error is encountered, the service will automatically power cycle the faulty device and try to re-initialize it before triggering a service call as a last resort.

The kiosk computer may, in some embodiments include a personal computer PC, having a CPU processor such as AMD A6-6400K, and a motherboard such as Gigabyte GA-F2A78M-D3H, with a 4 GB of RAM.

The touchscreen may be a model such as "ELO E496859 22" touchscreen having resolution of 1920×1080. The touchscreen may be connected to the kiosk computer via a DVI interface. The digital sign screen may, for example, have a resolution such as 1920×1080, and may be connected with a VGA interface. The device camera may include, for example, E-Con Systems See3CAMCU13, and may provide a resolution of 4912×3684. A lens such as a 6 mm focal length, may be used. A USB connection may be used for communication with the kiosk. The face camera may include a USB connected camera such as "E-on systems See3CAMCU50" at a resolution such as 2654×1956 and lens 2.8 mm focal length. The security camera may include a USB connected camera such as an "E-Con Systems See3CAMCU50" camera with a 2.1 mm focal length and 2654×1956 resolution.

The kiosk router may include a router such as TP-Link TL-WDR3600 running firmware such as OpenWRT 14.07. The router includes connections: WAN Ethernet to the modem; LAN Ethernet to the PC; and LAN Ethernet to the Power Switch. The router may be flashed with OpenWRT and then configured to the specific needs of the kiosk. The router may be configured, for example, to communicate with the hardware service when WiFi connections are made and when the kiosk app is downloaded from an app store or the like. The router may expose the interface to open and close the WiFi radio which is controlled by the hardware service. A modem may provide the Ethernet connection to the router and may be based upon a cellular connection.

The mechanism may include an Arduino Mega controller connected to a virtual COM port through USB. The Arduino firmware may be configured to only contain simple logic to control the motors and lights while making sure there is no interference. The hardware service carries all or most of the logic associated with the good functioning of the mechanism.

The cash dispenser may be a model such as, WBE GBM-10M, connected to a virtual COM port through USB. The kiosk power switch may be an item such as a Digital Loggers LPC738270 switch. The power switch may be connected via Ethernet to the router and may power the battery for charging. In some embodiments, the power switch may be an Ethernet managed power switch. All devices are connected to individual sockets which can be controlled through HTTP calls. The hardware service may use this functionality to power cycle faulty devices. The battery may be of the UPS variety. In some embodiments the UPS may at least have enough power at all times so that current ongoing processing can be completed in case of a power failure. For example, the UPS may be configured to have at least a predetermined amount of power required for the kiosk to return a trade device that has been deposited in the kiosk and to close all access doors before shutting down in the case of a power failure.

The server may be hosted by a cloud provider such as, for example, Amazon Web Services (AWS), and may use an operating system such as Ubuntu 14.04, and include subsystems such as Apache, PHP, MongoDB, OpenERP. The server may operate a plurality of call center queues. In some embodiments, the server keeps a web socket connection alive with each kiosk to keep track of its status and active session. When the logic dictates that a call center agent should be involved in the session, the session is put into queue based on the agent level required. Sessions are then pushed to an available agent. The queues may be services based on a round-robin servicing discipline.

In some embodiments, kiosk sessions are archived by the server. All session information may be contained in JSON format. At the end of a session, this data file is inserted into a database (e.g., MongoDB). The archived sessions can be analyzed and evaluated to determine patterns. For example, most frequently occurring defects for each type of electronic device, most frequent combinations of defects, etc. can be determined from such analysis, and may be used in enhancing the process of device acceptance in the kiosk.

In some embodiments, OpenERP is used to keep track of kiosk hardware inventory, trade device inventory, sales transactions and accounting. Each completed kiosk session inserts a transaction into the ERP system. Once the trade devices are picked up on location, a purchase order is created for the phones expected to be shipped by the kiosk operator. The ERP system may also be used to keep track of services associated with the kiosks such as fundraising campaigns, etc.

The call center agent interface creates a web socket connection to the server and waits for a session to be assigned. Agents have a level that dictates the type of session they can handle (described below). The interface may be formed using one or more languages such as HTML5/Javascript/CSS, libraries such as JQuery, and a container such as Chromium.

The call center agents may be classified into a plurality of levels and assigned for servicing clients according to the classification. In some embodiments, the system may provide for three levels of call center agents. A level 1 agent cannot interact directly with the client. The only types of session a level 1 agent handles are best case scenarios where the ID and trade device needs to be verified. A level 2 agent can interact with the client to help him navigate the kiosk interface. He/she can also assess non-working trade devices and match them against a list the system offers based on the physical metrics retrieved. Level 2 agents can handle level 1 sessions. A level 3 agent can handle level 1 and 2 sessions but also has access to specific kiosk controls to fix and/or report problems on the kiosk.

In addition to the above, the system may also include an administration or supervisor interface. The interface may be formed using one or more languages such as HTML5/Javascript/CSS, libraries such as JQuery, and a container in the form of any browser. The supervisor interface connects to the server via web socket and receives events on all changes to the system. This lets the supervisor see the queues and kiosk statuses in real time. The supervisor has the ability to open any session (past or ongoing) and get real time updates of the progression and interactions with the agents. A set of tools is made available to diagnose, fix and report issues with kiosks.

The user experience is enhanced with the presence of an internet based call center that is capable of communicating through digital audio streams between a customer service agent and the user of the app or the kiosk. Such digital audio streams may, for example, be encapsulated within Websocket technology or the like. The audio stream connection can be established following a request by user for help or assistance, following timed-out or failed operations such as a user not being able to insert an ID card, following a system error such as a malfunction of the opening door, following an alarm such as a door opened without authorization or other security sensor, or by the agent proactively assisting users.

In an embodiment, when an audio stream is established by one of the above methods, a control widget is displayed on the kiosk or app screen providing the user with additional control over the communication, such as volume control up and down, mute, closing the communication etc.

In an embodiment, especially on the kiosk, the call center agent may have the capability to prevent the user from closing the communication so that any person with suspicious intentions can be remotely monitored and spoken to.

In an embodiment, some portable electronic devices may require human intervention to complete examination or for troubleshooting purposes and the call center may have software functions that can trigger commands to be sent to the kiosk, for example, take picture from selected camera (main, surveillance, bubble, tray, etc.), operate mechanical equipment controlled by the kiosk (e.g., tray, arm, bubble), with a direction (up, down, forward, backward), turn on/off lighting elements, enable zoom forward/backward on an inspection camera, pan/tilt control of inspection camera etc.

Figure 7:
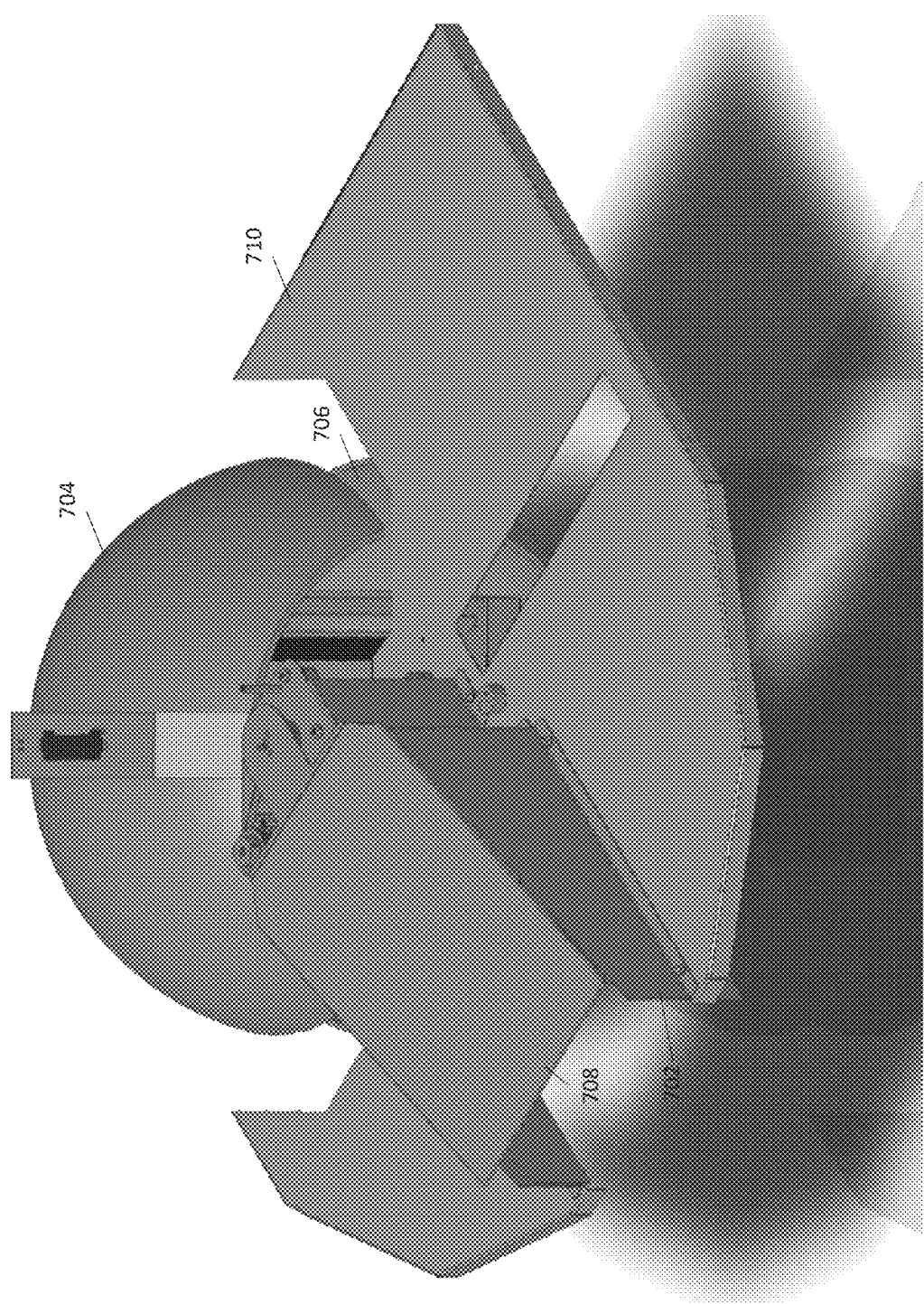
FIGS. 7-17 schematically illustrates aspects of a device scanning chamber and/or a drum assembly included in electronic device collection kiosks, according to some embodiments.

FIGS. 7-17 schematically illustrate aspects of a device scanning unit and/or a drum assembly included in kiosks 102, according to certain example embodiments. FIG. 7 illustrates a schematic view of the device scanning unit 700, according to an embodiment. The unit 700 includes a top dome 704 and a bottom dome 706 arranged such that they enclose a globe-shaped area which may be used as the device scanning chamber (sometimes referred to herein as the "device examination bubble" or "bubble"). A device entry unit 702 includes a device entry door 708. A plateau 710 is used to attach the device scanning unit 700 to the kiosk, such as kiosk 302.

The device scanning chamber may be made so that it facilitates accomplishing, among other things, a few goals. In an example embodiment, the device scanning chamber is designed to optimize for generating shadowless images of the device being scanned. For example, the device scanning chamber is configured for diffused lighting that bounces off of a matte white surface which is ideally suited for creating shadowless pictures.

The two transversely cut domes 704 and 706 are mounted opposite each other. Both domes rotate around the same radius and are mechanically linked together. This shape allows for the most compact space to offer the greatest picture taking benefit. For example, in the illustrated embodiment, this allows for capturing images throughout a 360-degree path around the device being scanned.

A camera is attached at the apex of one of the domes (e.g., at the apex of dome 704) and is focused internally to the center area (where the device will be moved while resting on a transparent glass tray) of the globe-shaped scanning chamber. The other dome serves as a constant neutral backdrop so that all of the full-front or full-back pictures taken of the device (e.g., smartphone) will have a completely monotone and uniform backdrop that can be cropped out, leaving a full, clear image of the smartphone.

The two domes allow for an almost infinite number of picture taking angles. This flexibility is highly beneficial when determining the condition of the device submitted. The flexibility in image taking can be especially important when trying to ascertain whether a device has a cracked screen, etc. By triggering the flash of the camera and taking pictures at varying angles, it is easier to make this determination based upon the captured images. Moreover, by enabling a call center operator to control at least some of the image taking, a more particularized, efficient, image taking process may be implemented. For example, in some embodiments, the call center operator may control aspects of the rotation of the domes, camera focus and/or angle, camera location, flash triggering timing and duration, level of light etc. In some embodiments, the call center operator may also control, for example, the movement of the tray holding the device inside the camera chamber, the positioning, movement and/or rotation of the device. In yet other embodiments, the call center operator may control the camera and associated equipment to deposit a predetermined quantity of some substance (e.g., powder, liquid etc.) to facilitate the quality and effectiveness of the captured images.

Figure 15B:
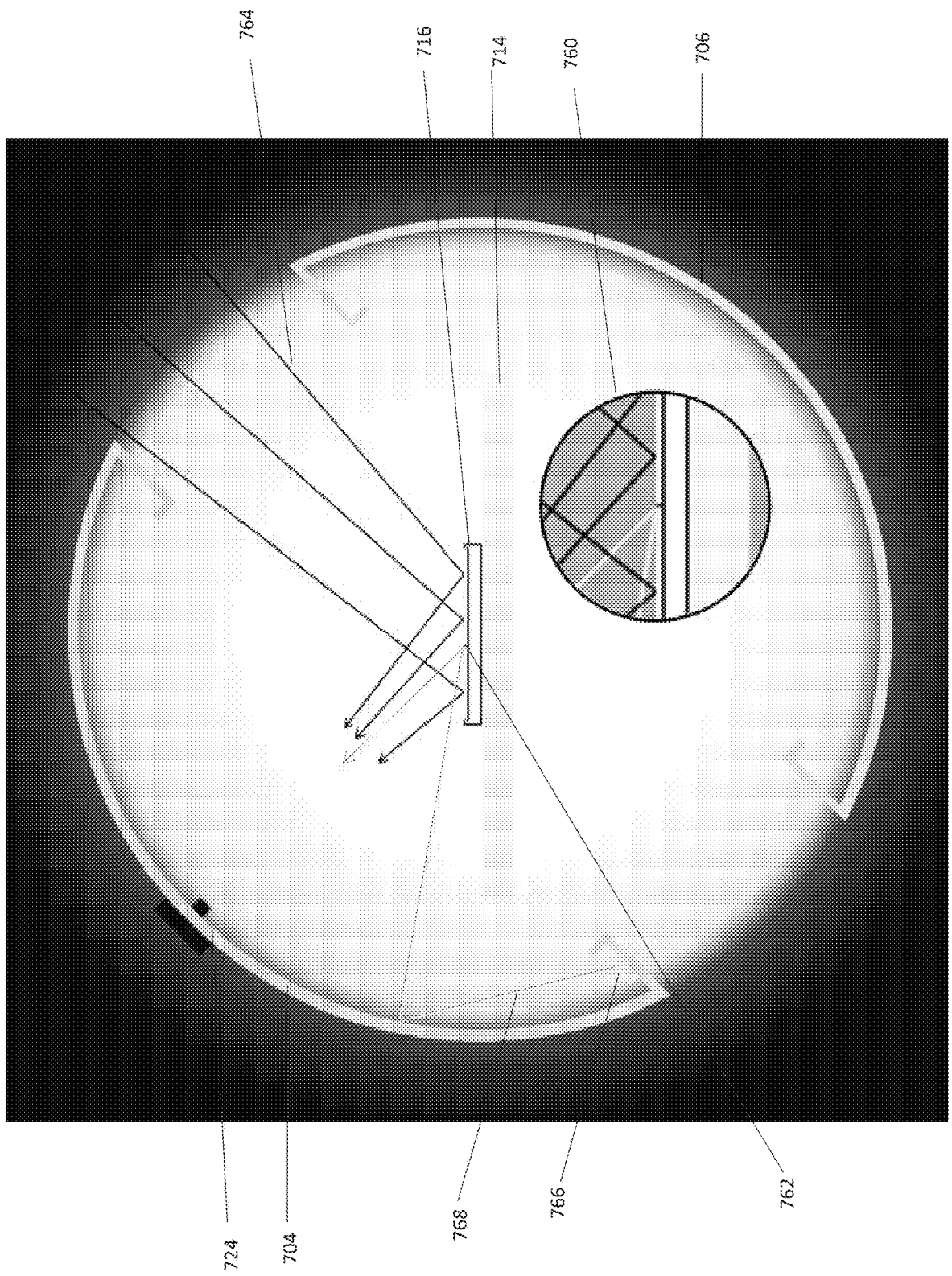

This design also allows, in some embodiments, for a gap to be had between where the two domes would meet (and where the tray holding the device travels through). In a completely sealed kiosk, this area is seen as almost black when taking pictures at about 45 degrees from the apex (e.g., when the tray holding the camera is horizontal). When rotating the camera and taking pictures, there may be certain angles that have this dark area reflect differently on the screen of the device. The dark area is a great help in determining whether there is a crack on the device's screen. For example, FIG. 15B illustrates image taking for crack detection.

In some embodiments, in addition to, or in place of a camera which images only visible light, a camera that images other light wavelengths, such as, but not limited to, infrared or ultra violet, and corresponding lighting sources can be used. In some embodiments, a full spectrum camera that can capture light in the visible and invisible (to the human eye) spectrum may be used. The inventors have noticed that certain types of hairline cracks on a screen are more effectively noticeable under ultra violet or infrared light rather than the normal visible light. The call center operator may control the light wavelength(s) for one or more of the images. In some embodiments, the selection of light wavelength(s) may be automated and may be controlled by the kiosk or the remote server, based upon the type of electronic device and/or features detected during the examination of the electronic device.

Some embodiments may, instead of the domes with moving cameras, utilize a series of fixed cameras and, in some cases, may control the electronic device to turn or move so that any desired angle of the electronic device can be imaged. One or more cameras and/or 3D imaging techniques may be used to obtain data that can be used in the determination of the device's dimensions, type, condition, features etc. In some embodiments, at least one camera taking images of the trade device may be a 3D camera capable of measuring depth. In some embodiments, cameras may be assisted by strategically located mirrors capable of extending the viewing capability of the camera toward the device both for device identification of the make and model or for defect detections, through techniques such as the above described techniques.

In some embodiments, the kiosk app (while executing on the device) may be used to cause a series of patterns (e.g., straight lines, circles, etc.) to be drawn on the display of the device, and concurrently one or more cameras can be used to capture the images on the device's display. Distortions in the patterns can be measured to assist in locating defects in the screen of the device. These techniques, as used in some embodiments, are believed to substantially improve the probability of detecting hairline cracks etc., before the device is accepted.

In still other embodiments, a 3D capturing apparatus alone or in combination with other cameras in the camera chamber may be used to assist with outlining the size, shape and color of the traded device.

Figure 8:
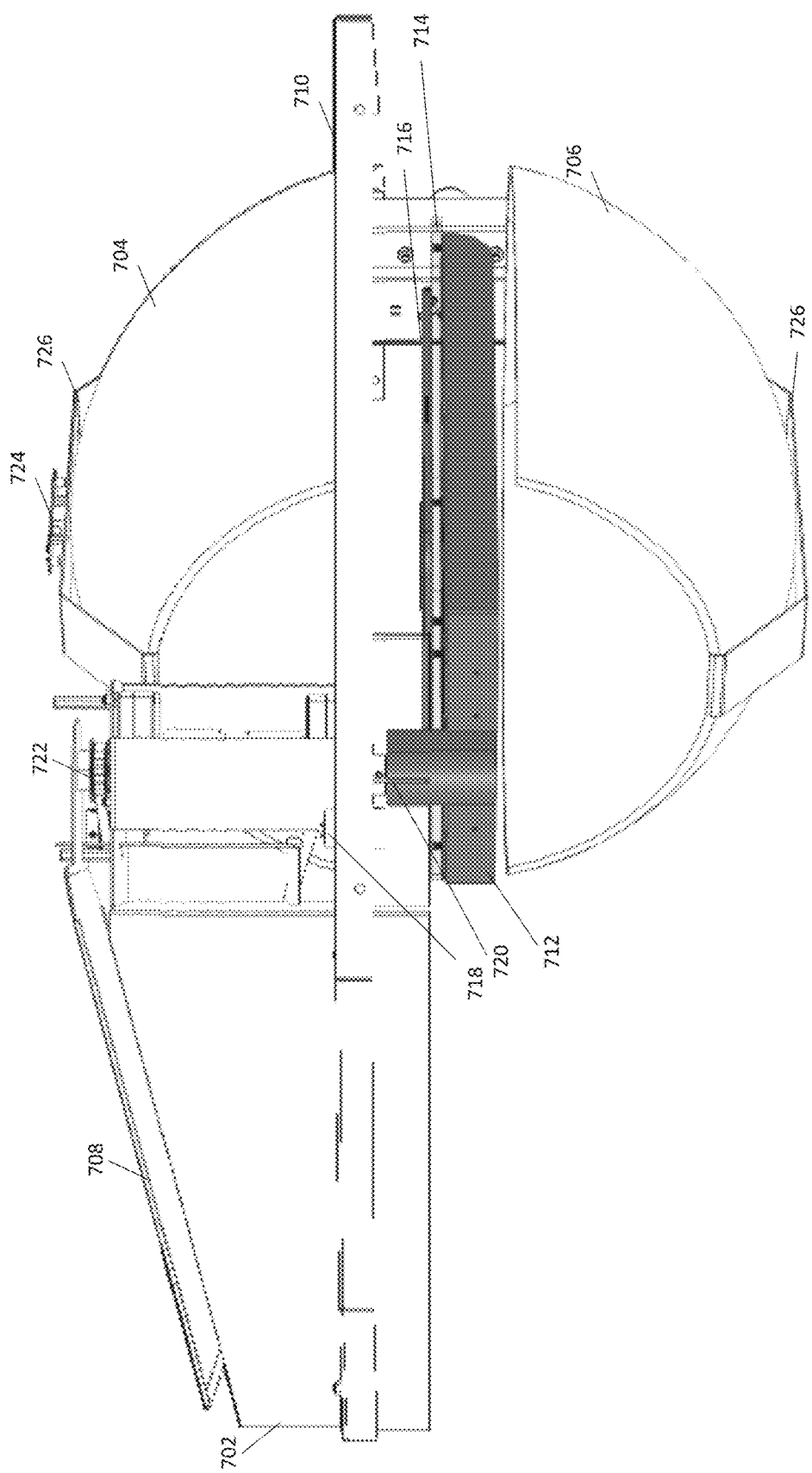

FIG. 8 illustrates a view of the device scanning unit 700 from a similar right angle as in FIG. 7, but in outline form of the structures for clarity. FIG. 8 illustrates, among other things, a device holding structure 712, device holding glass 714 attached to the device holding structure 712, and the device 716 placed on the device holding glass. The device holding structure 712 may be formed as a tray configured to hold the device holding glass 714. A motor 718 and shaft 720 assembly is actuated to move a device from the device entry area to the scanning area. An order in which this can be accomplished is as follows: the device entry door 708 is rotated from the closed position by actuating the motor and belt assembly 722; once the kiosk detects (with sensors) that the device is placed on the device holding glass 714, then the device holding structure is rotated to the camera area by actuating motor 718. A camera 724 is located at the apex of the top dome 704 and is held in place by a camera arm 726. The camera arm 726 may be formed as one unit or an interconnected plurality of units that span a substantial portion of the perimeter of both the top and bottom domes. A motor and belt assembly 722 operates to control the device entry door 708. Device entry door 708 may be controlled by the kiosk computer.

Figure 9:
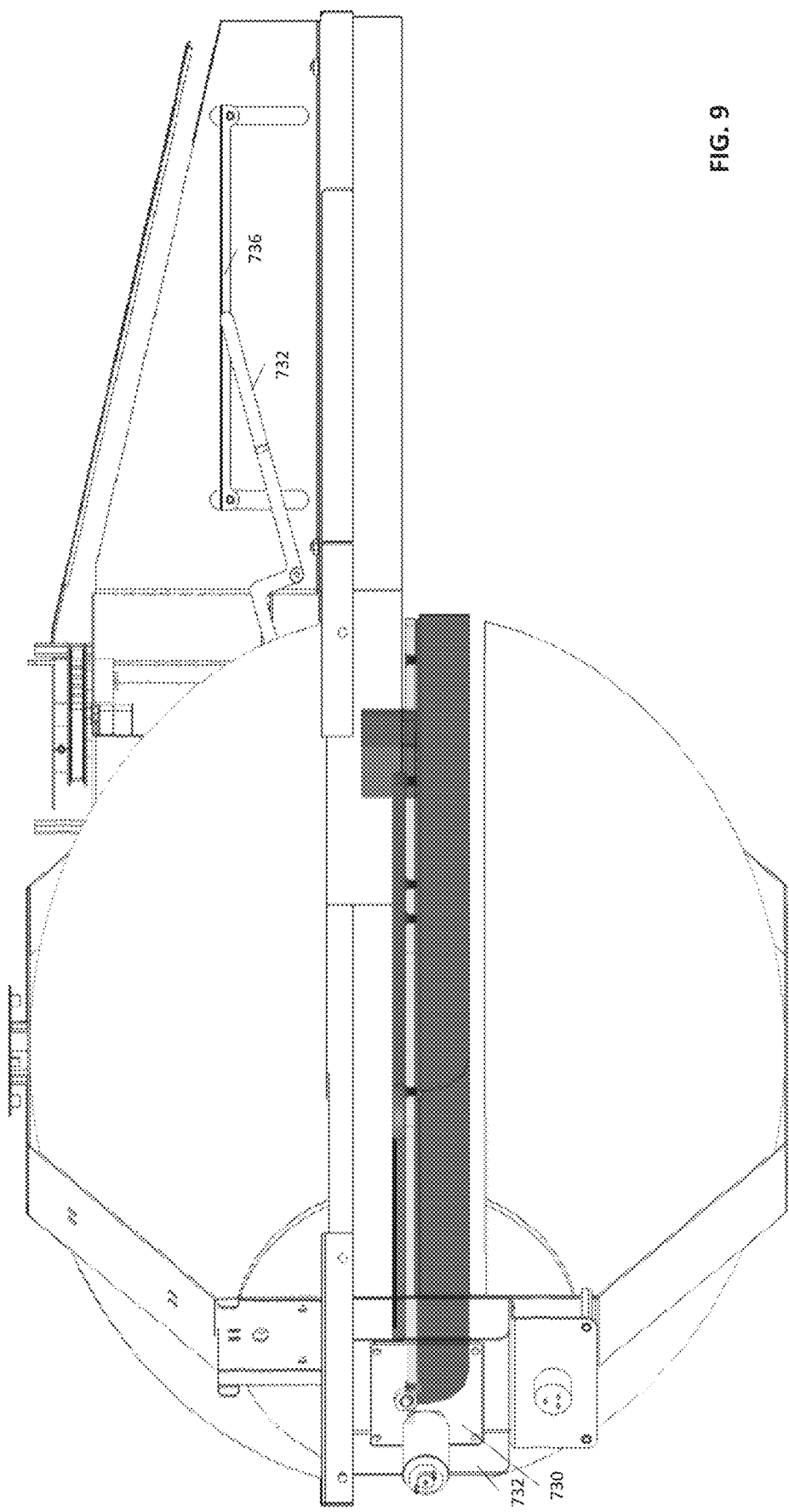

FIG. 9 illustrates a view of the device scanning unit 700 from an angle opposite (e.g. left angle) to that of FIG. 8 in outline form of the structures. FIG. 9 illustrates, among other things, a camera motor 730 and a camera motor holder 732. FIG. 9 also illustrates shutter actuator lever 734 which operate to actuate the shutter 736 to open when the device entry door 708 has been closed.

Figure 10:
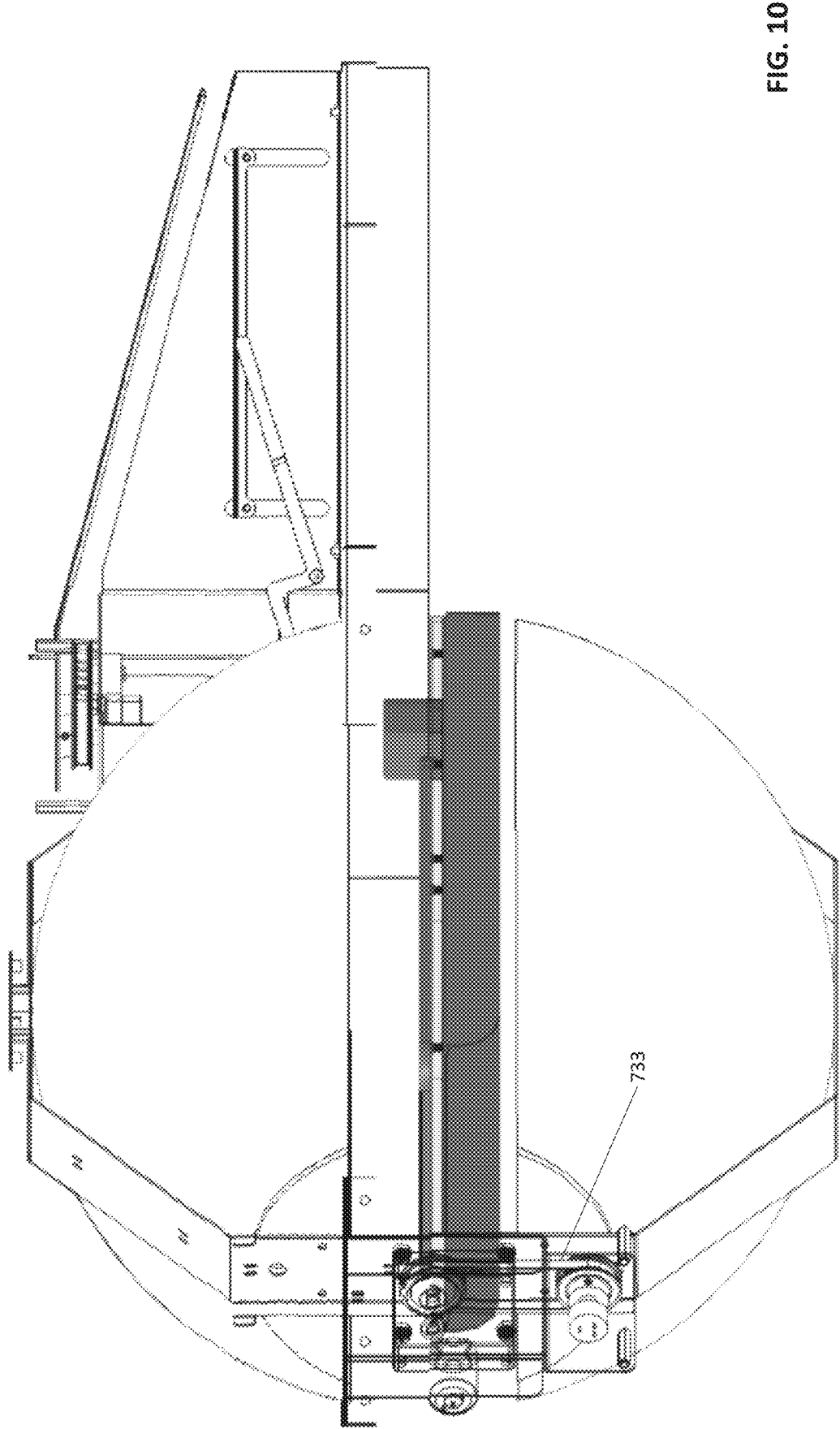

FIG. 10 illustrates the same view as FIG. 9, but with the camera motor 730 and a camera motor holder 732 illustrated in transparent mode so that more details of the camera motor 730 and belt 733 are illustrated.

Figure 11:
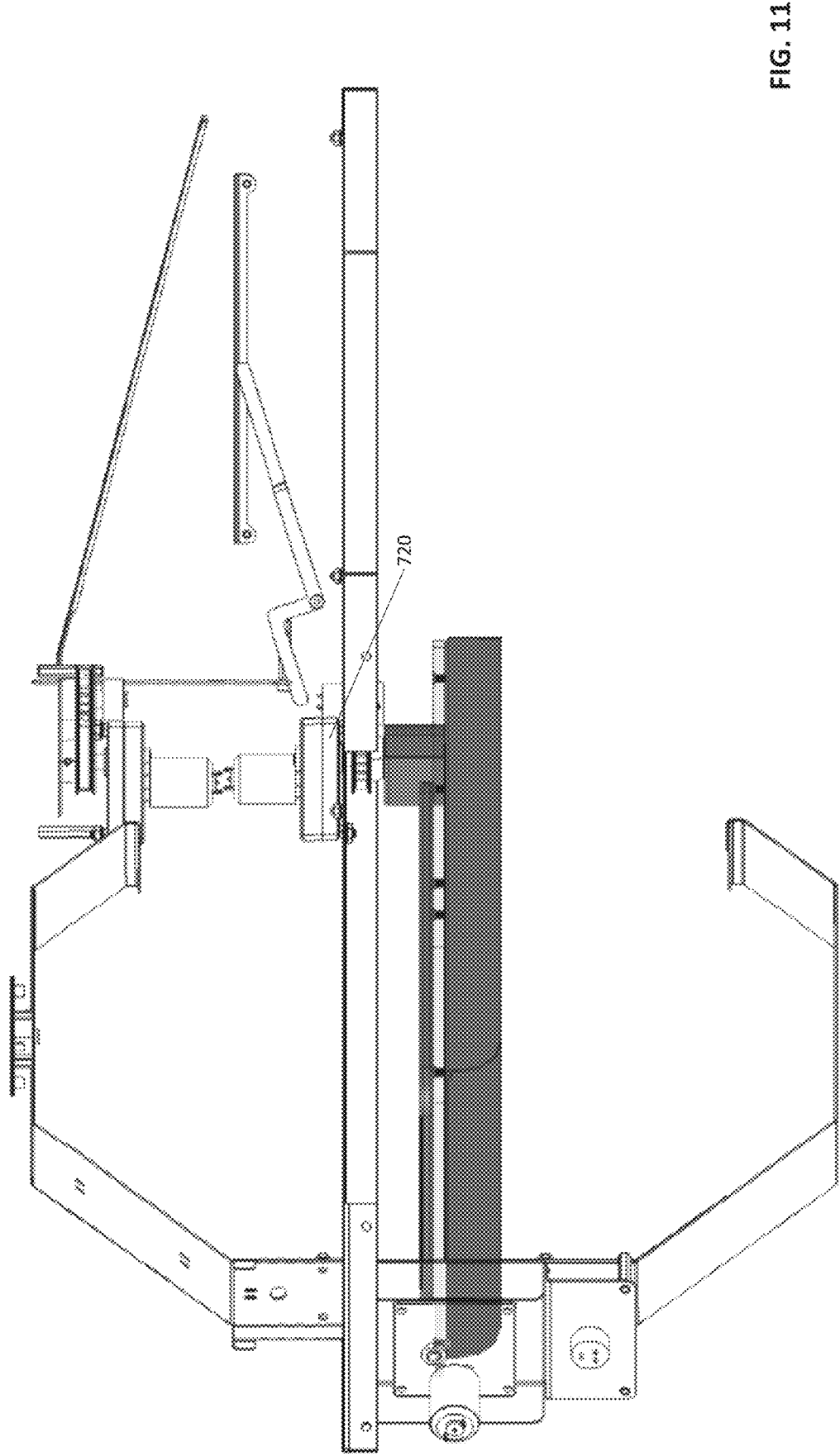

FIG. 11 illustrates yet another wireframe image of the same angle as FIGS. 9-10, but with the domes 704 and 706, and parts of the device entry unit 702 and plateau 710 hidden from view in order to more clearly illustrate certain features such as the shutter actuator 734, and shutter 736, and shaft assembly 720, and motor and belt assembly 722.

Figure 12:
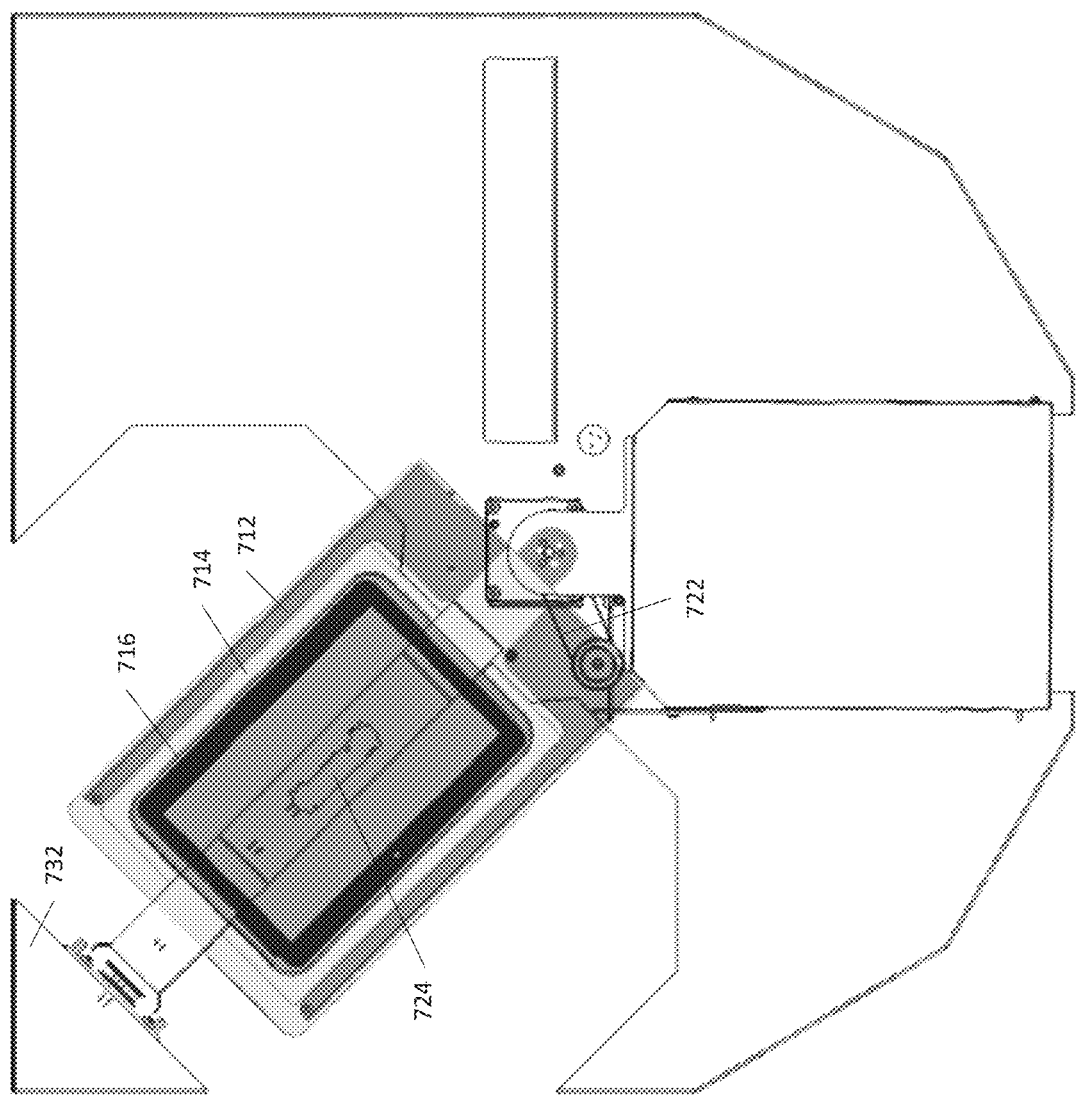

FIG. 12 schematically illustrates a view from the top with certain parts set to be transparent so that a top-side of a device 716 which is resting on the glass 714 is seen. Glass 714 is held by the device holding structure 712.

Figure 13:
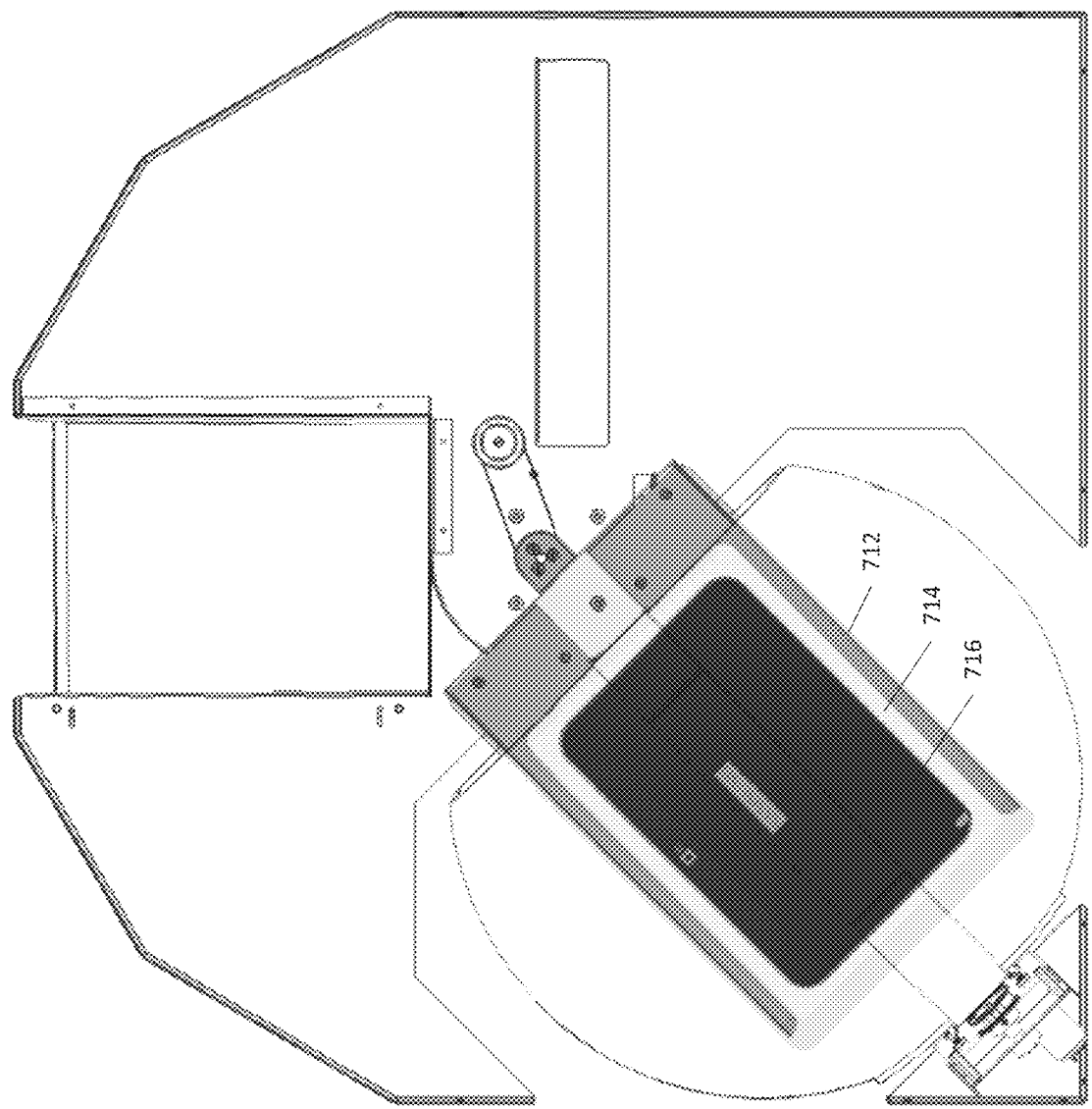

FIG. 13 schematically illustrates a view from the bottom with certain parts set to be transparent so that a bottom-side of a device 716 which is resting on the glass 714 is seen.

Figure 14:
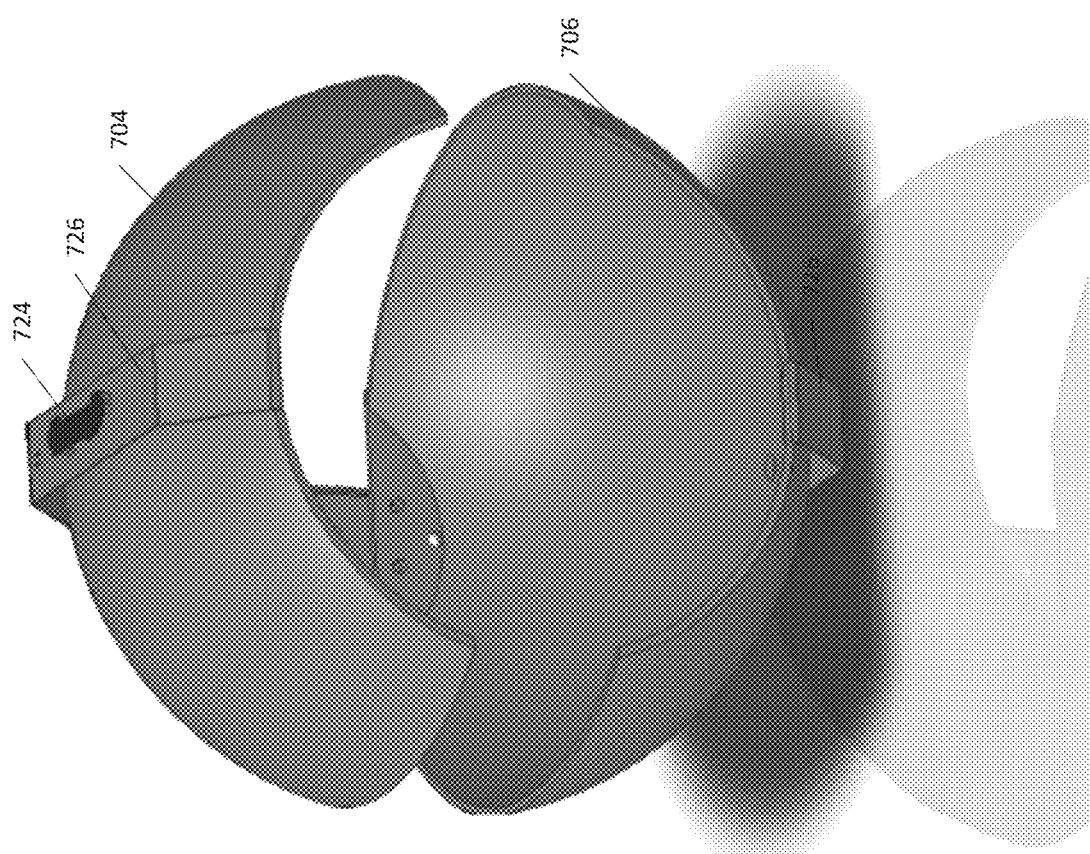

FIG. 14 schematically illustrates the two half domes 704 and 706 with the camera arm 726 and camera 724 in place, according to an embodiment.

FIG. 15A schematically illustrates a shutter 738 together with shutter actuator 736 (shutter actuator lever 734 is hidden from view by shutter 738), according to an embodiment. In some embodiments, the shutter 738 may be actuated open by the closing of the door 708 and closed by the opening of the door 708. Also illustrated in FIG. 15A is a drum assembly 740 used for collecting the scanned trade devices.

FIG. 15B schematically illustrates using camera 724 at a rotated (e.g., by 45 degrees) position in capturing images of the trade device 716 which is located on the glass 714 within the camera chamber defined by domes 704 and 706, in a manner facilitating the detection of cracks, such as crack 762, on the screen of device 716. Since there is no light in the kiosk, light rays 764 coming from outside the domes are very dim. The light rays 768 coming from the light source 766 inside the domes are very bright in contrast. When the device glass 716 is unbroken and flat, most of the light rays hitting the camera come from outside the domes. If a crack is present on the glass 762, this creates an edge perpendicular to the glass surface which reflects light rays coming from inside the domes into the camera. The resulting image highlights cracks while keeping the rest of the glass surface dark. The software then analyzes the image to detect white lines which represents cracks in the device glass.

Figure 16:
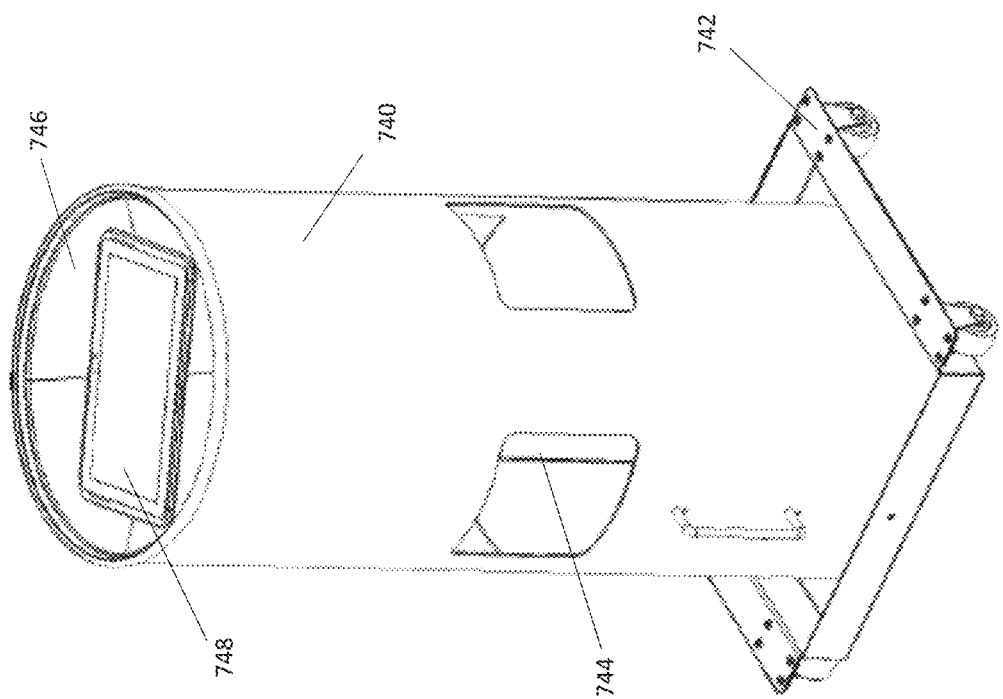

FIG. 16 schematically illustrates the drum assembly 740 which is used to collect the electronic devices that are accepted by the kiosk. The drum 740 may rest on a wheeled dolly 742. A device tray 746 and a tray sleeve 744 are inside the drum to collect the accepted electronic devices, such as shown electronic device 748.

Figure 17:
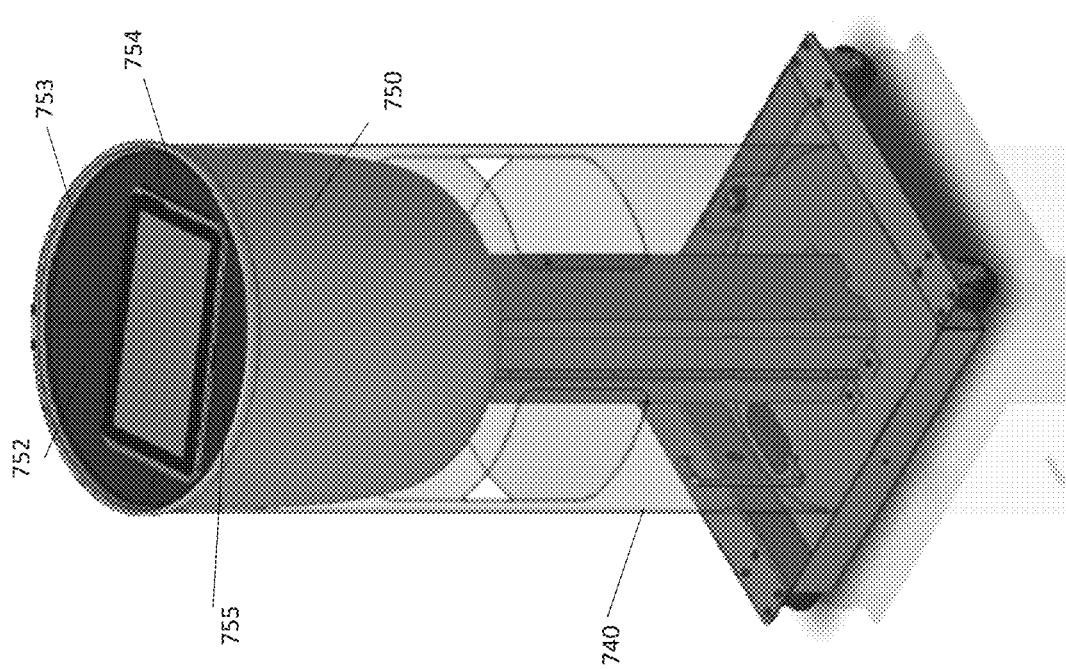
Figure 18:
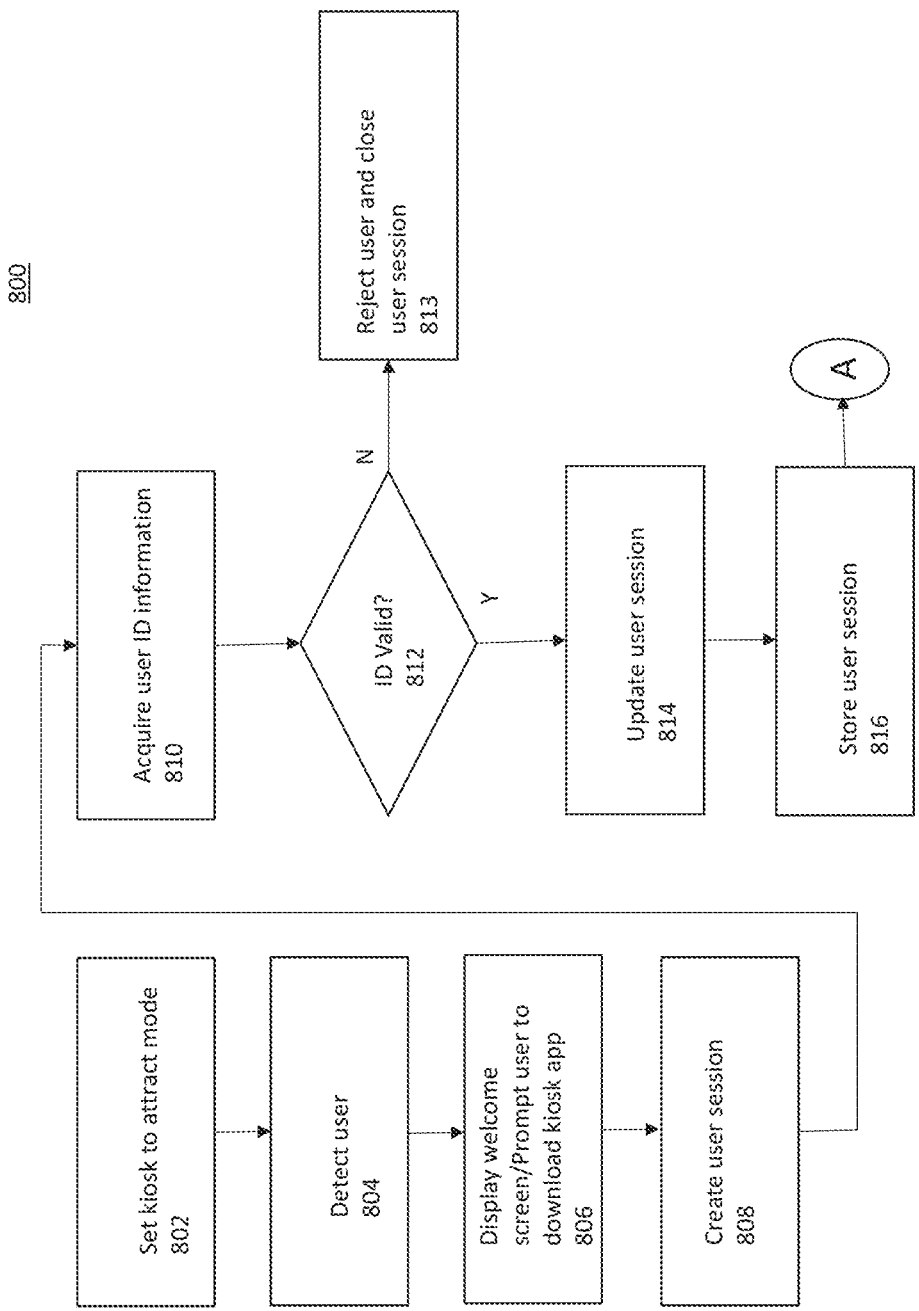
FIGS. 18-30 illustrate flowcharts of processes facilitating the operation of one or more electronic device collection booths according to some embodiments.

FIG. 17 provides a schematic illustration of the drum assembly with outer shell of the drum 740 being transparently illustrated so that the device bag 750 and the multiple device trays 752, 753, 754 and 755 which are linked as one unit can be clearly seen. As devices are dropped onto the tray 746, a motor (not shown) at the bottom of the drum 740 is actuated which drives a mechanism (e.g., an endless screw) that lowers the tray 746. The motor stops when a sensor at the top of the drum 740 detects that the tray has been lowered enough for the device resting on it to clear the top of the drum. In some embodiments, instead of, or in addition to, the sensor, the tray will be moved only for certain predetermined distances or angles based, for example, on commands sent to the actuator or motor controller, or by sending a certain amount of power for a determined amount of time. When the tray reaches the bottom of the drum, a service call is issued to let the kiosk operator know the drum is full and needs to be emptied. The service technician rolls out the drum and pulls out the bag 750 containing the devices FIGS. 18-30 illustrate flowcharts of a process facilitating the operation of one or more electronic device collection booths according to some embodiments. Although operations of process 800 are shown in a particular order, it is understood that some embodiments may eliminate one or more operations, add one or more operations, and/or change the ordering of some operations.

Process 800 may be implemented by one or more kiosks, such as kiosk 102, as shown in FIG. 1. At operation 802, the kiosk operates in a mode to attract clients, which may be its default mode of operation. For example, the kiosk may display, in a continuously repeating loop, one or more video messages on its screen for attracting clients. The video messages may be displayed, for example, on one or more of the interface touchscreen 604 or advertising screen 606. During operation 802 while displaying imagery for attracting clients, the kiosk may monitor one or more inputs to detect the presence of a client. In some embodiments, the kiosk may include one or more motion sensors that enables it to save power and/or idle when no potential client is detected nearby based upon motion. In some embodiments, the attract loop may also include predetermined audio being played through one or more speakers of the kiosk. The video and/or audio of the attract loop may include advertisements or other programming, and may be, at least in part, provided by a remote server (e.g., a central remote server providing programming to the network of kiosks) and/or local operator. For example, in some embodiments, the attract loop of a particular kiosk may include advertisements relevant to the local establishment in which the kiosk is located, and may have been provided either by a remote server or the operator of the local establishment. The kiosk may control its integrated display and/or one or more operably connected displays to display the advertisements or other programming associated with the attract loop. For example, a kiosk located in a building of a commercial establishment, may control its integrated display and one or more displays located throughout the building to display advertising and programming encouraging the use of the kiosk.

At operation 804, a client is detected. The detection may be based upon detecting that a human is facing the kiosk at a close distance (e.g., 1-2 feet) away from the kiosk. This detection of presence may be based upon one of the cameras illustrated in kiosk 302 shown in FIG. 3, or a separate motion sensor. The detection may alternatively, or in addition to the above, be based upon a touch input, voice input or button press received on the kiosk. In some embodiments, based upon a motion detected by a motion sensor, the kiosk may begin the welcome screen display and request the client to touch a virtual button displayed on the screen. In some embodiments, a client may have previously acquired the kiosk app, and, as described further below, use the app to notify the kiosk of the client's presence at the kiosk.

After the presence of a client is detected, at operation 806, a welcome screen is displayed. The welcome screen may include information prompting the client to download a kiosk application. The welcome screen may comprise one or more screens and/or displayed images and/or messages. In some embodiments, messages can also be transmitted as audio, perhaps synchronized to the video messaging being displayed. The welcome screen may also prompt the client to provide identifying information.

In some embodiments, the kiosk is capable, through at least one camera, to recognize, using facial recognition and/or height recognition, an approximate age of the person in front of the kiosk. This detection may be based upon comparing one or more images of the person to one or more stored profiles. The kiosk may in response to detecting that a person is or appears to be below a certain age, prevent certain functions from being accessible.

At operation 808, a user session is created in the kiosk. The user session is intended to capture sufficient information to record the entire transaction for purposes including, for example, legal/contractual purposes, record keeping purposes and data collection purposes. As described below, in some embodiments, the client may have acquired the kiosk app before arriving at the kiosk, and enabled the kiosk app to collect information about the client and the trade device. Thus, in embodiments in which the kiosk app already has some information regarding the client and/or trade, the kiosk app acquired information may be transferred to the kiosk before or upon the client's arrival at the kiosk, and the kiosk may change or customize the following operations to only acquire information that has not been already acquired by the kiosk app.

At operation 810, an ID card provided by the client is detected. For example, the client may have inserted a driver's license (or other similar ID card) into the ID card unit 311. The ID card is scanned and/or photographed on one or both sides in order acquire the client's ID information. In some embodiments, the ID card may be recognized and its information extracted by analyzing one or more photographs of the ID card acquired by an outside facing camera (e.g., without requiring insertion to an ID card unit).

At operation 812 it is determined whether the submitted ID is valid. In some embodiments, the scanned/photographed ID card information may be transmitted to a call center agent who verifies the information and communicates approval or disapproval. In other embodiments, at this stage, if certain basic predetermined parameters are satisfied for the scanned/photographed ID card, the ID may be assumed valid. For example, if the provided ID card is a driver's license, the kiosk may determine, by running optical character recognition or the like upon the scanned/photographed ID card, a driver's license number and name, and that information may be communicated to an internet resource that can verify the authenticity of the ID card information.

According to some embodiments, the ID card scanning system is built to reduce costs when compared to commercially available ID card scanning systems. In one embodiment, the ID card scanner includes a simplex business card scanner that drops the ID card into a chute after it passes through the scanner in one direction. This makes the mechanical process significantly simpler and more resistant to failure by removing the need to reverse the motors to get the card back out of the scanner.

Once the card is scanned, both top and bottom pictures may be sent to an OCR server. Through the use of APIs (e.g., Google Tesseract™ and Inlite ClearImage™), the server finds and decodes barcodes that may be present in the ID card or in the pictures and uses OCR to read any text. Thereafter, a check is made regarding whether the OCR data matches the data found in the barcodes. This helps automatically assess if the card is valid.

Any pertinent information ascertained by this ID card unit may be then sent to the kiosk to possibly be used during the rest of the transaction. For example, if the client's name is extracted by the ID card unit, the kiosk may continue to communicate with the client by using their name. In some embodiments, the kiosk's graphical user interface (GUI) may also use a speaking avatar and the avatar may also "speak" to the client by the name as determined by the ID card unit. The date of birth, age, or address/state information that may be obtained from the ID card may be used to further customize the avatar and/or questions asked from the client. Such information can also be used to customize the payment to be offered for a trade device. For example, age and/or address may be used in selecting among several types of coupons that may be offered in payment for a trade device.

In order to increase the likelihood of successfully completing a transaction and because customers generally respond favorably to a more personalized transaction, in some embodiments, the kiosk may use a speaking avatar to help the client throughout the transaction. The avatar may be configured such that, initially it "speaks" to the client in general terms using pre-authored audio/video files. As the transaction progresses with the client, and as the system learns more about the client and the device intended to be traded, the system may select parts from many different pre-recorded audio/video files, concatenate them (e.g., audio and video may be concatenated separately), and then it mix the audio and video files to be able to play one seamless file that "speaks" to the client in more personal terms. This makes it such that for each transaction, the avatar is modified in its speech as well as in its appearance and gestures such that every transaction becomes uniquely personal.

The kiosk contains a plurality of pre-recorded audio files. Each of these audio files may contain small snippets of phrases that have been professionally mastered, in studio, using live voice artists. Each of these audio tracks may have been engineered using certain ambient sounds, pitch modifications and other studio techniques. The selection and concatenation of the separate audio files are performed such that the concatenated file represents an audio played in one uninterrupted take, e.g., it sounds as if the whole audio file was originally recorded in one take.

The pre-stored video files each contains a small snippet of character animation rendering of an avatar's movements (e.g., body and/or face). The videos may be professionally animated. Each of these renderings start at one of a plurality of "base frames" and end at one of a plurality of "final frames". For each animation, a plurality of these video files may be concatenated in order to form an animated avatar suitable (e.g., determined based upon predetermined settings) in the appearance, in consideration of one or more of the particular client, device to be traded, time of day, location, environment etc.

To gather data that can then be used in the personalization of the avatar, certain information may be collected. The kiosk location may be determined from an internal GPS in the kiosk and/or Internet connection, and that location information can be used to determine further aspects such as: the state and city names, the location name (e.g., shopping mall, store, school etc.), the current local weather and temperature, the local weather forecast, identity of home sports team as well as latest scores, current local traffic conditions. Software can be used to determine gender, age, race, facial features, height etc. from the video streams and/or images captured from any of the camera of the kiosk. Information that can be collected directly (e.g., name, age address, etc.,) from the client or the presented ID card, information regarding the device the client intends to trade, and any other information obtained from the client, with or without the aid of the kiosk app, can also be useful in personalizing the avatar.

Since image recognition is a CPU intensive process, having this process on a central server gives the opportunity to increase performance by customizing the hardware. In contrast to many commercially available systems run their API on the client machine, some embodiments use a low power CPU which is not optimized for that kind of workload.

Additionally, specialized hardware and/or software at the processing server remotely located from the kiosk can also use facial detection/analytics software to help detect more information of the pictures taken of the client at the kiosk, such as their age, gender and height. With this, the processing server can inform the call center agent if the software has passed certain thresholds of certainty of a match.

Once the client is identified, the system can use that information to modify the kiosk's behavior perceived by the client, by personalizing the transaction, thus increasing the odds of success while also increasing the security of the transaction. For example, the avatar can be made to speak to the client using the client's name (by either using pre-recorded audio files or, commercially available text-to-speech software), and/or the avatar's speech may be personalized to the client by using more age-targeted phrases. Additionally, whereas, for security reasons, the number of transactions may be restricted to a certain number for a client initially, that number may be increased over time and instances of use by that client.

In an embodiment, the kiosk is capable, through at least one camera, to recognize, using facial recognition sentiment analysis, to determine that a user is confused and, in response to said determination, the kiosk is operable to provide additional help or to initiate a live call with a remote agent at the call center. The additional help may be in the form of a popup, audio assistance, animated assistance or multimedia assistance.

If the ID information is not valid, then the client may be rejected and the user session closed at operation 813.

If the ID information is found to be valid, at operation 814, the user session is updated to include the client's identification information. At this stage, the user session may be maintained in memory.

At operation 816, the updated user session is stored. The storing may be to non-volatile memory in the kiosk. In some embodiments, the storing may also be to a remotely located storage server.

Figure 19:
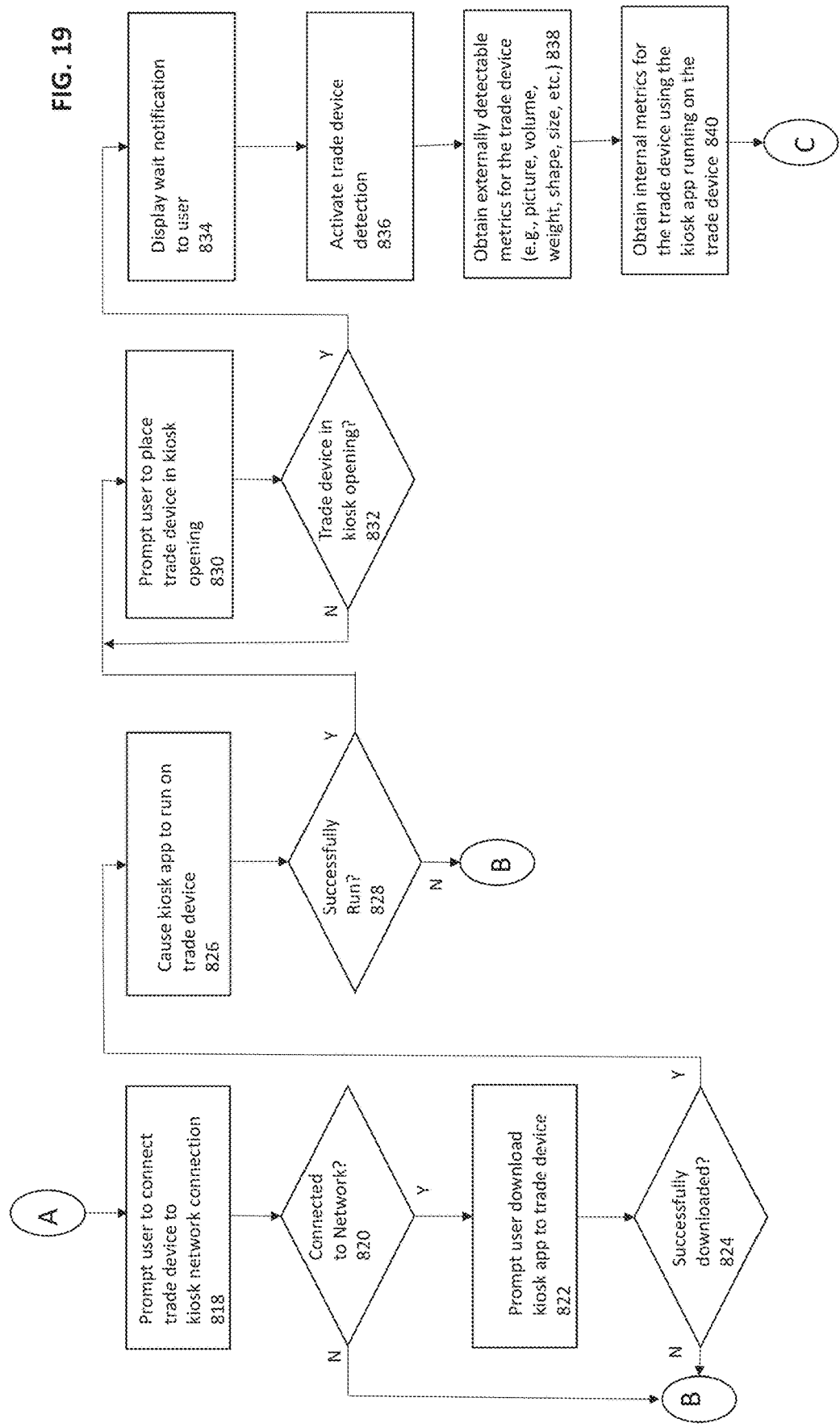

FIG. 19 illustrates a portion of flowchart 800 including operations 818 to 840. After operation 816, the flowchart 800 proceeds to operation 818. At operation 818 the client is prompted to connect the trade device (i.e., the electronic device that the client intends to trade or submit for analysis by the kiosk) to the kiosk network connection. According to an embodiment, at least one of the options available to the trade device for connecting is a wireless network connection which includes, for example, a WiFi or Bluetooth connection. The prompting may be performed using a displayed message and/or audio prompts requesting that the client connect the trade device to the kiosk client network. In some embodiments, the connection between the trade device and the kiosk may be made using another form of near field communication (NFC) protocol.

In some embodiments, prior to requesting the client to connect the trade device to the kiosk's network, the client may be queried as to whether the trade device is a smartphone. If the client responds that it is a smartphone, then processing may follow as operations 818, 820 etc. However, if the client indicates that the trade device is not a smartphone, the client may be offered a predetermined amount for the trade device without detailed testing, and the system may wait for the next trade device. In this manner, flip phones and the like, which have little residual value can be collected for some purpose such as recycling for a predetermined small payout or donation to client-selected entity.

At operation 820, it is determined whether the trade device is newly connected to the kiosk client network connection. The detection may be performed by a router in the kiosk and/or a control processor of the kiosk. The detection may be based upon monitoring new connections at the router and/or based upon a required sign-in operation to the router.

If the trade device is connected to the kiosk client network, then at operation 822, the client is prompted to download the kiosk application ("kiosk app") to the trade device. The prompting may be based upon displaying a message on the screen of the kiosk. This prompt may be customized to the device type detected while the connection was established.

At operation 824, it is determined whether the kiosk app was successfully downloaded to the trade device. This determination may be based upon an amount of data transferred via the router to the trade device. In some embodiments, this determination may be made through the use of a proxy on the router that tunnels and monitors connections to known hosts. In some embodiments, this determination may be made when the kiosk app is automatically installed on the trade device and communicates with the kiosk.

In some embodiments, a pre-evaluation of the trade device may be performed resulting in presenting the user with the initial payout offer amount. The pre-evaluation may occur at any point in the processing of process 800, but preferably occurs at an early operation before the client provides much input or spends much time. The pre-evaluation may be based upon one or more basic questions posed to the client, such as, questions for determining the age of the device, and questions for determining the condition (e.g., mint, good, damaged, broken) of the device, etc. Check boxes or other similar interface can be provided to determine the condition and, if determined to be damaged, a further set of checkbox choices may be presented to determine the type of damage (e.g., glass damage, damaged port, etc.). The client may be offered a chance to accept the pre-evaluation payout amount subject to scaled-down evaluation of the device by the kiosk and bypass the time consuming portions of the evaluation process, or to refuse the pre-evaluation payout amount and go through the entire evaluation process.

At operation 826, the kiosk app is caused to run on the trade device. For example, upon completion of the download, the kiosk app may be configured to automatically install and run on the trade device. In some embodiments, the client is prompted to install and run the kiosk app.

At operation 828 it is determined whether the kiosk app successfully executed on the trade device. This determination may be based upon the kiosk receiving a preprogrammed message from the kiosk app now running on the trade device. As described further below, the kiosk app may be configured to perform a series of diagnostic activities before being placed in the trade device, with or without being controlled by the client or another operator. Some of the diagnostic actions that may be performed is also described below in relation to processes 1700 and 1800. As noted above, results from such diagnostic activities can be transferred to the kiosk.

Figure 31:
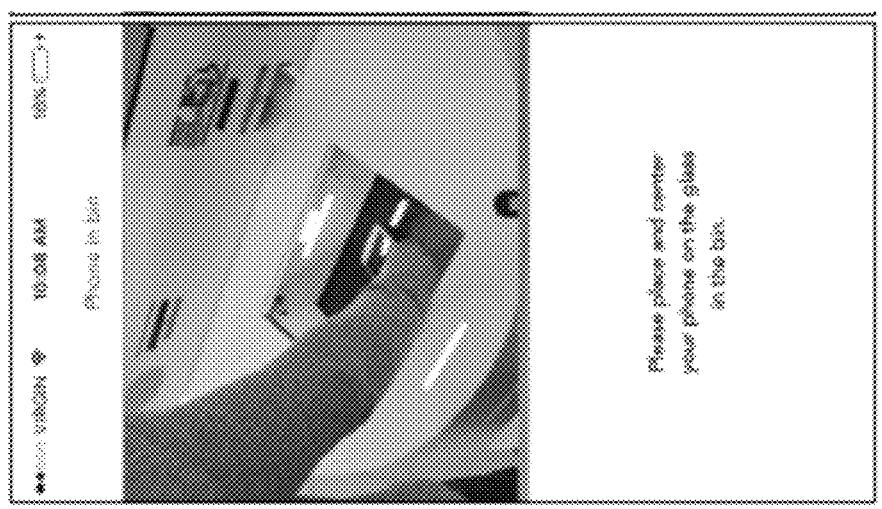
FIG. 31 illustrates an example screen displayed on the trade device instructing the client to place and center the trade device on the glass of the bin of a kiosk, according to some embodiments.

If the kiosk app was executed successfully, at operation 830, the client is prompted to place the trade device in the kiosk for evaluation. This prompting may be delivered via the kiosk's screen and/or the trade device's screen. FIG. 31 shows an example screen displayed on the trade device instructing the client to place and center the trade device on the glass of the bin.

At operation 832, it is determined whether the trade device is in the kiosk opening. This determination may be based upon a sensor in the opening and/or camera view of the opening. In some embodiments, the door to the opening is electronically controlled to open when the message prompting the client to deposit the trade device is displayed. The amount by which the door is opened may be controlled in accordance with the type of trade device being deposited, for example, in a manner that just enough space is provided in the opening to deposit the trade device in a horizontal orientation. In some other embodiments, the door is manually opened by the client.

If the trade device is detected in the kiosk opening, then at operation 834, a message is displayed to the client on a screen of the kiosk to indicate that the trade device is now being evaluated. At operation 836, trade device evaluation is activated.

In certain example embodiments, the kiosk app is used to relay information about the device to the kiosk, central server and/or to the call center, to display instructions to the client and also as a security measure. The app and the kiosk operate in tandem to make available an extensive test of each user device. Whereas some online and "brick & mortar" companies that accept used electronic devices in exchange for money, pay only after they get the phone into their hands (therefore adjusting the price once they physically test all features and see the phone's condition), in the example embodiments discussed herein, the service provider (e.g. entity purchasing the trade device) would desire to be as certain of the value of the device as possible because payment for the device is made to the client at the kiosk before the provider or any of its human operators physically receive it.

When a client is at the kiosk, after they have identified themselves (e.g., via their picture and that of their official ID card) the kiosk may open its WiFi hotspot capability (to discourage abuse, at least in some embodiments, WiFi may only be available for a short time and only points to the kiosk app on the OS's Application Store). The client may then, if they had previously already downloaded the kiosk app on to the trade device, be prompted to run the kiosk app. The app, after it is started, will connect to the kiosk and the client will be instructed to follow directions provided on the screen of the trade device and/or on the kiosk.

If the client has not yet downloaded the kiosk app, the system will guide the client (e.g., through the kiosk's GUI) on how to download the app and subsequently the client will be instructed to start the app and to follow directions.

When the kiosk app is started on the trade device, it may verify that the trade device is connected to the kiosk's WiFi. If the trade device is not already connected, the GUI (on the app and/or on the kiosk) instructs the client to connect to the kiosk's WiFi (e.g., "Buy Back Booth's Wi-Fi").

In an embodiment of the invention, the kiosk is equipped with a WiFi router on which, for example, is installed a special software that replace the router firmware that may be based on OpenWRT. In some example embodiments, the software is configured to include a web server that acts as a customized captive portal so that when a user connects to the WiFi network a custom page is presented on the user electronic device (potentially becoming a trade device). Said custom page may provide means, for example, to download the app from a store by providing a link to the application on the store, such as the Apple App Store™ or Google Play™. The software on the router also include means for protecting from intrusion, for example, by providing firewall services and enabling only certain traffics on certain subnetworks, such as having a subnetwork for the kiosk to communicate with its server and a subnetwork, distinct, that allow WiFi connected devices to access only authorized web pages or other web functions, such as downloading an application from an App Store. Additionally, for trade devices where an application can be downloaded directly from a file, not requiring a complete login, the WiFi router may provide direct access to download the file, such as an .ipa file.

Once connected, the app collects the trade device's information (e.g., IMEI/MEID/ESN (if possible), brand, model #, carrier, CPU, RAM, SD card, etc.) and detects any peripheral that is attached to the trade device either directly (e.g., earphones, battery pack, charging cable, adapters etc.) or wirelessly (e.g., watch, headset, phone, thermometer, etc.). It gathers all this info and transfers it to the kiosk. It then waits for further instructions. Certain information about the trade device, such as, for example, the age of the trade device and the condition of the trade device, may be determined based upon the client's responses to specific questions posed on a screen of the kiosk or on the trade device. As described in further detail below, in some embodiments, the information collection by the app running on the trade device may occur before the connection is made to the kiosk.

Instructions on the kiosk screen may be displayed on the kiosk application at the same time, for example, to put the trade device into the kiosk or if an accessory attached to the trade device is detected that needs to be removed (e.g., plastic cover).

A kiosk where the trade device (e.g., phone) has to be inside the kiosk to test it may have to request the client to remove the phone from the kiosk to do certain operations (e.g., a message such as "Sorry, you seem to have forgotten to remove the earphones and auxiliary battery pack as well as the charging cable. Please take the phone out of the kiosk and remove them."). Also, since there is no convenient way to tell if the client has indeed removed all of the attachments (e.g., while the phone is in the user's hands, outside of the kiosk), this may still go on a few times as the client may have only completed some of the requests. With the kiosk app that is wirelessly linked to the kiosk, the client is asked to fully prepare the phone before ever inserting it into the kiosk so as to avoid the need to have the client insert and remove the trade device from the kiosk several times.

While the client is still handling their trade device, the kiosk app may (in some embodiments, under the control of the kiosk and/or call center) also have the client test the physical buttons of the trade device (as a broken button significantly reduces a trade device's value). Both the kiosk app and the kiosk will instruct the client to press on the volume, home and on/off buttons (e.g., and other buttons specific to each model phone—since the kiosk app will have informed the kiosk or call center operator of the model). While this is going on, the kiosk or call center operator can (transparently to the client) have the kiosk app test things like, the accelerometer, the gyroscope, the GPS, Bluetooth, etc. Only when either the app has run through a standard predetermined test routine and/or the kiosk or call center operator has been satisfied that the trade device is ready to be placed within the kiosk will the client be permitted to place it in the kiosk opening for further evaluation.

Once the phone is in the kiosk, the app and the kiosk still work in tandem to continue the testing. For example, the app will force the phone to take pictures with one or both cameras (albeit within the kiosk) and transmit these to the server and have them available to the call center operator for evaluation. The kiosk may be configured with one or more particular markings for the purpose of being analyzed for quality when the markings are detected in images captured by the trade device's camera(s).

Once the trade device is in the kiosk and the door is closed, the kiosk may send a unique identifier to the trade device which then displays it as a QR code on screen. The kiosk reads back this QR code while taking pictures of the trade device which verifies that the trade device in the kiosk is really the trade device that is running the application. In some embodiments, patterns other than QR codes may be displayed and detected for this purpose. This security measure is important in order to avoid a situation where a client tries to run the application on two devices and put the lower valued one in the kiosk as the trade device.

The kiosk app can also test the trade device's speaker(s) by having the kiosk cue the app to play an audio file while the microphone in the kiosk records it and sends results to the processing server (e.g. processing server 108). The reverse may also be done where the kiosk will play a file through a speaker within the kiosk and cue the kiosk app to record it and send the results to the server or to the kiosk app. The server or the kiosk app may be configured to detect the known audio files and alert the agent if either the microphone or the speaker of the trade device is damaged. The kiosk app or other program residing in the kiosk can also be used to test for dead pixels by displaying full solid black, white and/or colored images and using the kiosks camera(s) to take pictures of the screens to then send to the server for further review. In some embodiments, the program executed on the trade device may be initiated by accessing a web page from the trade device.

Network connections can also be tested by communication between the kiosk app running on the device and the kiosk. For example, signal strength for WiFi, cellular, Bluetooth etc., can be measured and compared against known or predetermined values at the kiosk. The kiosk may be equipped with a one or more Bluetooth and/or other near field communication-enabled trade devices that can pair with the client's device, thereby providing a means for testing such functionality.

Application commands can also be used to control the trade device remotely. This gives the kiosk or the call center operator the capability of retrieving more information or display specific things on screen. For example, the call center operator may have more comprehensive tests for each particular feature. Say, for example, the call center operator needs more pictures of the trade device taken at different angles while the trade device's screen is displaying different images: it would be possible for the operator to instruct one or both the app and the kiosk to do so.

If the IMEI cannot be retrieved programmatically by the kiosk app, the kiosk app may use a corporate installation certificate that the client needs to approve which gives access to the IMEI. This feature may be used as a means for enterprises to identify and automatically install updates and applications on their fleets of mobile devices. Some or all of the analysis and detection of the audio quality can be performed at the kiosk. Some or all of the analysis and detection may be performed entirely under the control of the kiosk and/or the call center operator.

At operation 838, externally detectable metrics for the trade device (e.g., picture, volume, weight, shape, size, etc.) are obtained. The trade device is moved into a scanning chamber in the kiosk for the evaluation. One or more cameras may be utilized to capture images of the trade device. The images may be for determining the externally visible characteristics of the trade device. For example, visible indications of the type and model of the trade device, cracks, dents, scratches, etc. on the surface, missing buttons, etc. The kiosk may, in some embodiments, automatically determine, based upon images captured by a plurality of cameras, a volume, size and/or shape of the trade device. In some embodiments, a weighing scale may be integrated into a platform which holds the trade device when it is within the scanning chamber, or before it is in the scanning chamber, that can detect the weight of the trade device.

At operation 840, internal metrics for the trade device are obtained using the kiosk app running on the trade device. Internal metrics may include operating system, memory, manufacturer, model number, hardware features and configuration, battery status, network status, signal strength, audio quality, video display quality, etc.

Some embodiment are configured to one or more techniques for identifying the trade device. According to an embodiment, a first technique of identifying a device is also used to continuously upgrade the success rate of a second technique for identifying devices. The criteria to decide which technique to use may, in some embodiments, solely be based on whether a trade device can run the kiosk app or not.

If the trade device can run the kiosk app, the app may be programmed to cause the trade device to transfer all the information needed to identify itself to the system's servers. In some embodiments, the information can be deemed 100% accurate. The kiosk takes pictures of the trade device to match the information decrypted from the QR code shown on screen against the information received directly from the trade device. All pictures and data may be sent to the call center where an operator can assess the information received and condition of the trade device (scratches, missing button, etc.). The pictures obtained this way are deemed to be accurate ones of the positively identified device so they can be used to further populate one or more central databases.

If the trade device cannot run the application (because it's not a smartphone or a compatible processor based device, it's broken, etc.) the client is instructed to put the trade device in the kiosk as is. The kiosk takes pictures of the trade device and sends those pictures to the call center or processing server. Once on the call center, the pictures are run through an algorithm which detects features of the device (device surface area, screen surface area, width/height ratio, color, button placement, edge features, markings). These values are then compared to pictures stored in a database to match possible candidates. The top candidates (e.g., top five candidates)—with may be a percentage of certainty—are shown to the call center agent who then selects the correct one.

Figure 20:
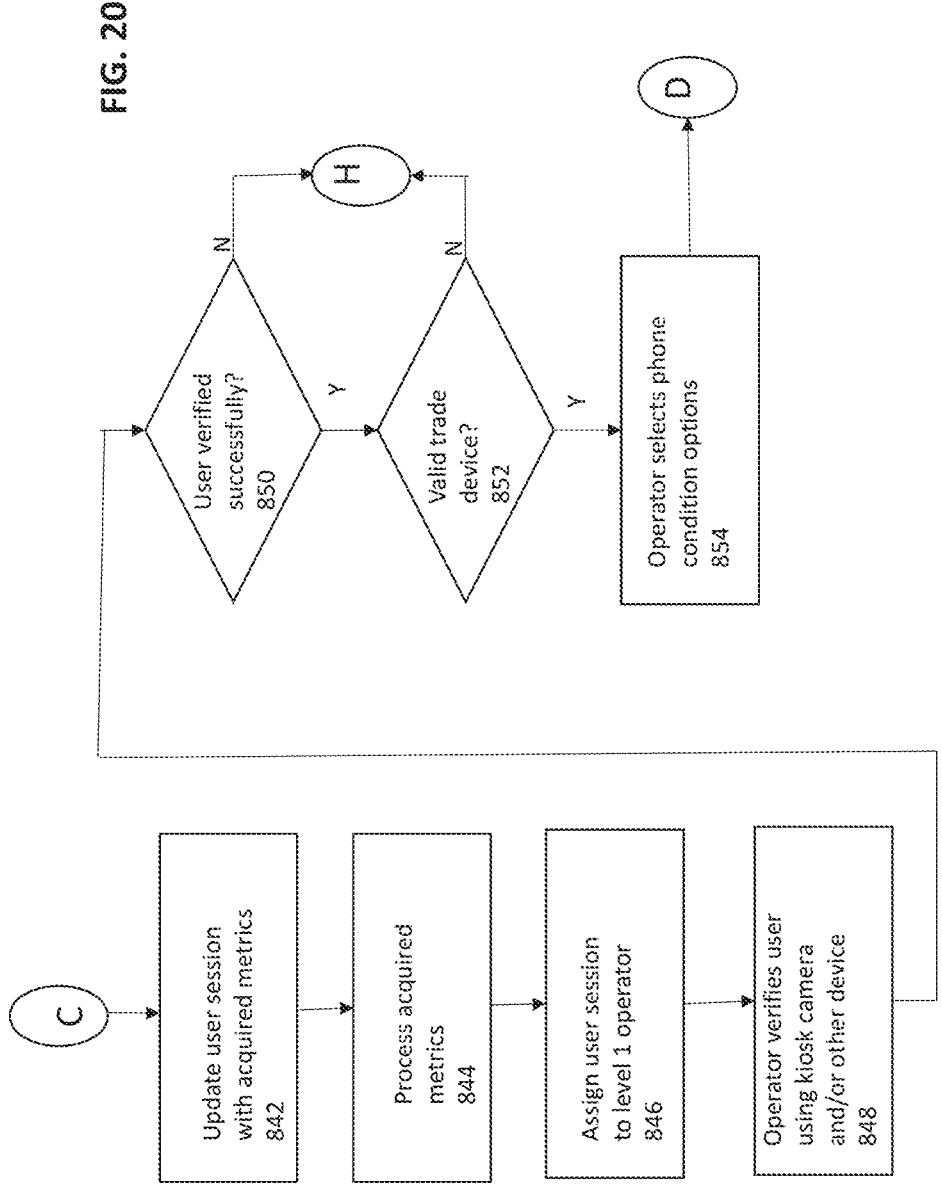

FIG. 20 illustrates a portion of flowchart 800 including operations 842 to 856. After operation 840, the flowchart 800 proceeds to operation 842. At operation 842, the user session is updated to include aspects of the collected metrics.

At operation 844, the acquired metrics are processed. The processing may include performing validity checks on some of the collected metrics. Processing may also include deriving one or more parameters based upon obtained parameters. For example, a remaining battery lifetime may be determined based upon the collected metrics of battery strength, battery type, and the type and model of the trade device.

At operation 846, the user session is assigned to a remote operator (e.g. a call center operator). According to an embodiment, where multiple levels of remote operators are available to service clients at kiosks, a level 1 remote operator is assigned to the user session based upon the specific criteria of this user session.

At operation 848, the remote operator verifies the client. Verifying the client may be based on the obtained information (e.g., ID card information) and images of the client as captured by one or more of the kiosk cameras. For example, the remote operator may compare the image in the driver's license to the image captured by the camera in order to determine whether they match. If it is determined that they match, the remote operator determines whether the client is indeed the same person as the one identified by the card inserted.

According to some embodiments, the Call Center Agent may be a final decision maker for each and every transaction. In general, there are several factors that may be used in the call center operator's decision for the satisfactory completion of a transaction.

In some embodiments, the call center operator may have to be satisfied that the pictures taken of the client matches the picture(s) on the client's official ID Card, so that, for example, a reliable positive identification can be made. If the call center operator feels more pictures are needed, he/she can command the kiosk to acquire more pictures. In some embodiments, the call center operator may command the kiosk to acquire pictures using specified capture parameters (e.g., capture angle, zoom level, light level, etc.). The captured pictures may be transferred immediately after capture to the requesting call center operator.

The call center operator can also send text messages or other signals to the kiosk's GUI commanding the GUI to display messages requesting the client to remove sunglasses, hats, scarfs, etc., or to stand and/or face in a particular manner (e.g., directly face camera, tilt face up, look to your left etc.) before the next image is taken.

The call center operator may also have to be satisfied that he can accurately identify the device submitted by the client at the kiosk, albeit with all the help that a database can offer him.

The call center operator may also have to be satisfied that the money offered to the client for their device is in line with all the rest of the information gathered up to that point—including the general condition of the device submitted.

The call center operator can also affect the progress of the transaction by sending the trade device back to the client and opening the door and asking the client to turn over the device (as it may have been placed incorrectly) or even just terminating the transaction while, optionally, sending the client a message for this decision.

At operation 850, it is determined whether the client was successfully verified.

At operation 852, it is determined whether the trade device is valid. The call center operator may make this determination based upon all the metrics and other information gathered so far regarding the trade device from the scanning and from running the kiosk app.

At operation 854, the operator selects trade device conditions. The call center operator may be presented with various visual condition options. For example: cracked screen, blemishes, scratches, missing buttons, missing back cover, missing battery. The operator may also be presented with a general condition selector (i.e.: bad, poor, good, excellent, etc.) which will directly impact price. At this point, the operator may choose to decline the trade device, for example, due to unwanted attached options (i.e.: earphones, cables, non-genuine cover, etc.).

Figure 21:
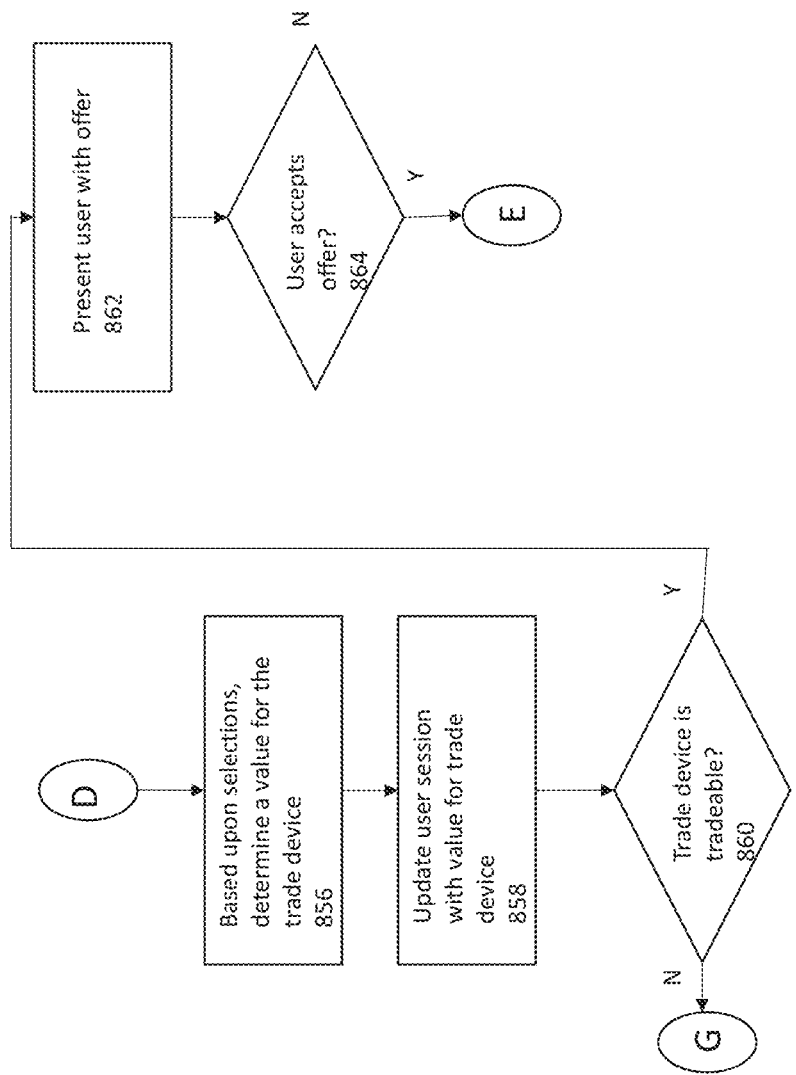

FIG. 21 illustrates a portion of flowchart 800 including operations 856 to 864. After operation 854, the flowchart 800 proceeds to operation 856. At operation 856, a value for the trade device is determined based upon the information gathered and the conditions selected previously.

At operation 858, the user session is updated with the estimated value for the trade device.

At operation 860, it is determined whether the trade device is tradeable. For example, if the estimated value for the trade device is above a predetermined threshold, then it is considered tradeable. Otherwise, it is untradeable. An example predetermined threshold value may be $0.

If the trade device is determined to be tradeable, at operation 862, the client is presented with an offer for the trade device. The offer may include a price that the kiosk operator is willing to pay the client for the trade device. The price may be the same as the estimated value or may be based upon it. The offer may be presented by displaying the price and virtual buttons that the client can use to indicate acceptance or rejection of the offer.

Some business models for operating the kiosks, like the kiosks described here, call for the same company to own, distribute and service each kiosk directly. This model is prone to being very taxing to the company's finances as well as to their human resources.

In some embodiments, each kiosk 102 (or, in some cased, each group of kiosks) is sold to an independent business owner (IBO) who will then "subscribe" to services of a first company. The goal may be to offer flexibility and/or encourage geo-specific pricing. In order to achieve this model of operation, a plurality of different "subscription packages" can be offered. The IBO may start by purchasing (or in some occasions leasing) the package that consists of the kiosk with all of the software to operate the kiosk. It is understood that the kiosk is made to work while connected to a centralized call center operators and processing servers. Some examples of flexible subscription models include a basic model, geo-specific pricing model, or a combo pricing technique.

According to the basic pricing model, the IBO purchases the kiosk as well as the software that runs it (including the call center operators, etc.). What the user is paid for a traded device is determined based on factors such as the trade device's current wholesale value, the projected retail value, the amount of inventory currently or expected to be accumulated of that particular device, etc.

According to an example embodiment, the IBO's payment for a traded device is based on a scale that integrates one or more factors which may include the amount paid to the client, the total amount of units received by the IBO in a given time, the overall number of kiosks operated by the IBO, etc.

According to the geo-specific pricing model, the IBO purchases the kiosk as well as the software that runs it (including the call center operators, etc.). The system determines what the client is paid for a particular device based on factors like: the projected price that the trade device will be resold at the amount of inventory accumulating of that particular device, etc. One may also modify the pricing based on the geographic location of the kiosk.

The IBO may keep a small amount from each sale the amounts of which are determined on a scale (based on one or more factors which may include the amount paid for the trade device, the total amount of units received by the IBO in a given time, the overall number of kiosks operated by the IBO, etc.).

According to the combo pricing, the IBO purchases the kiosk as well as the software that runs it (including call center operators, etc.). The system may determine a recommended amount that should be paid for a particular device based on factors like: the amount paid once the device is sold, the accumulated amount of inventory etc. The IBO may be able to modify the amount paid to the client (within a min/max range) based on their own criteria. The trade device collection entity (e.g. first company) may share in the gains or losses—but is likely have a minimum amount that is received in any case. In some embodiments, previous transactions and/or other sources of transaction information may be processed to determine the amount of payment, and/or to determine other transaction information that can be displayed to the client. For example, previous transaction data from various sources can be analyzed to determine the prices paid by competitors for trade devices of similar type and characteristics.

At operation 864, it is determined whether the client has accepted the offer. The client may indicate acceptance of the offer by touching the appropriate virtual button displayed on the screen of the kiosk. If the client intends to decline, he/she may instead touch a different virtual button for declining.

Figure 22:
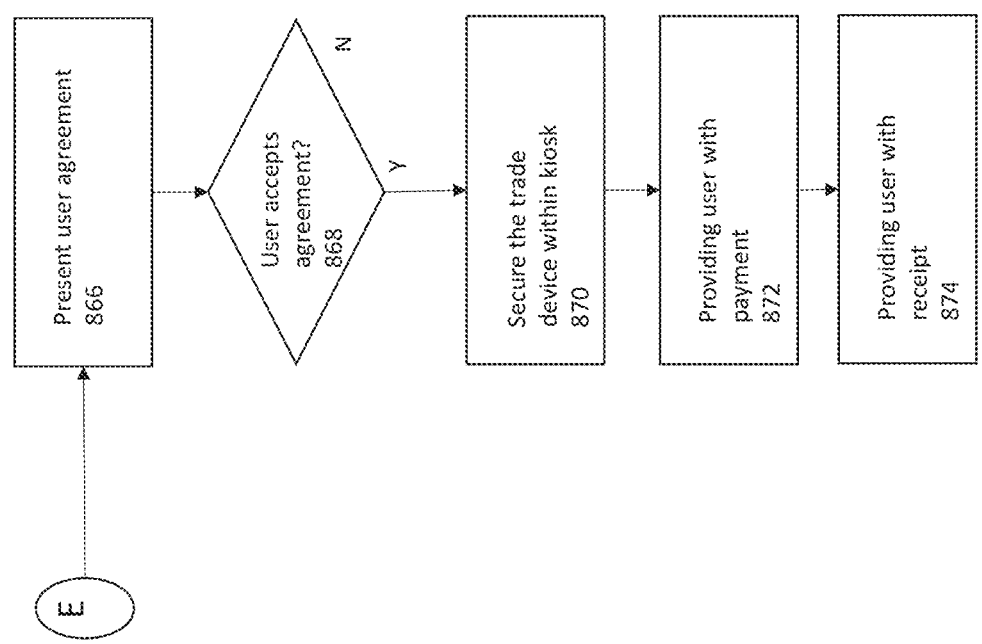

FIG. 22 illustrates a portion of flowchart 800 including operations 866 to 874. After operation 864, the flowchart 800 proceeds to operation 866. At operation 866, the client is presented with the agreement for trading the trade device. The agreement may be a standard form contract with certain fields filled in with information regarding the client's identity and address, the identification of the trade device, and, in some cases, the value for which the trade device is exchanged.

At operation 868, it is determined whether the client accepts the agreement. The client may indicate that he agrees with the agreement by pressing a displayed virtual button. The kiosk app or the server can then generate an agreement ID and associate it with other information gathered in the transaction that uniquely identifies the client.

At operation 870, the trade device is secured within the kiosk. For example, in some embodiments, the trade device will be put in a selected one of a plurality of bins collecting trade devices, in accordance with the type and/or condition of the trade device. In some embodiments, the kiosk may automatically label (e.g. affix a sticker) to the trade device with identifying information before directing the device to a selected bin.

At operation 872, the client is provided with payment. The payment to the client of the agreed upon amount may be provided in cash or other means. For example, Paypal transfer, email wire transfer or other credit may be provided in addition to, or in place of, cash. Coupons, redeemable at the local establishment where the kiosk is located or elsewhere, may be another form of payment dispensed in exchange for a trade device.

In an embodiment of the invention the ID card reader or a camera connected to the kiosk is capable of recognizing payment information from a card, by reading the magnetic information, query the integrated circuitry or through OCR of the information on a card, such as a debit card, and using said payment information, the system is capable of processing electronic payments through systems such as Master-Card Send™. For example, in an embodiment using MasterCard Send™, the payment can be processed almost instantly by depositing the payout amount to the seller's bank account associated with the payment information, which may comprise the user name, debit card number and possibly an expiration date. By sending the payment information to a network, such as MasterCard Send network, the network may proceed and confirm that the funds have been deposited. This method may greatly reduce fraud since the seller can be traced to a bank account.

At operation 874, the client is provided with a receipt for the trade device. The receipt may indicate identifying information for the trade device, the time and date of the transaction, and the amount paid to the client in exchange for the trade device. In some embodiments, the client can select to receive his receipt by email or other electronic transfer. The receipt may include a coupon which may be in the form of a QR code, bar code, or other recognizable identifiers for a merchant to accept the coupon. In an embodiment of the invention, the IBO can be presented configuration options to configure coupons to be handed out for alternate payment methods, including, for example, a coupon to be handed out when a trade device has little or no value. The server may also send to kiosks or groups of kiosks instructions for distributing coupons by the kiosk.

Figure 23:
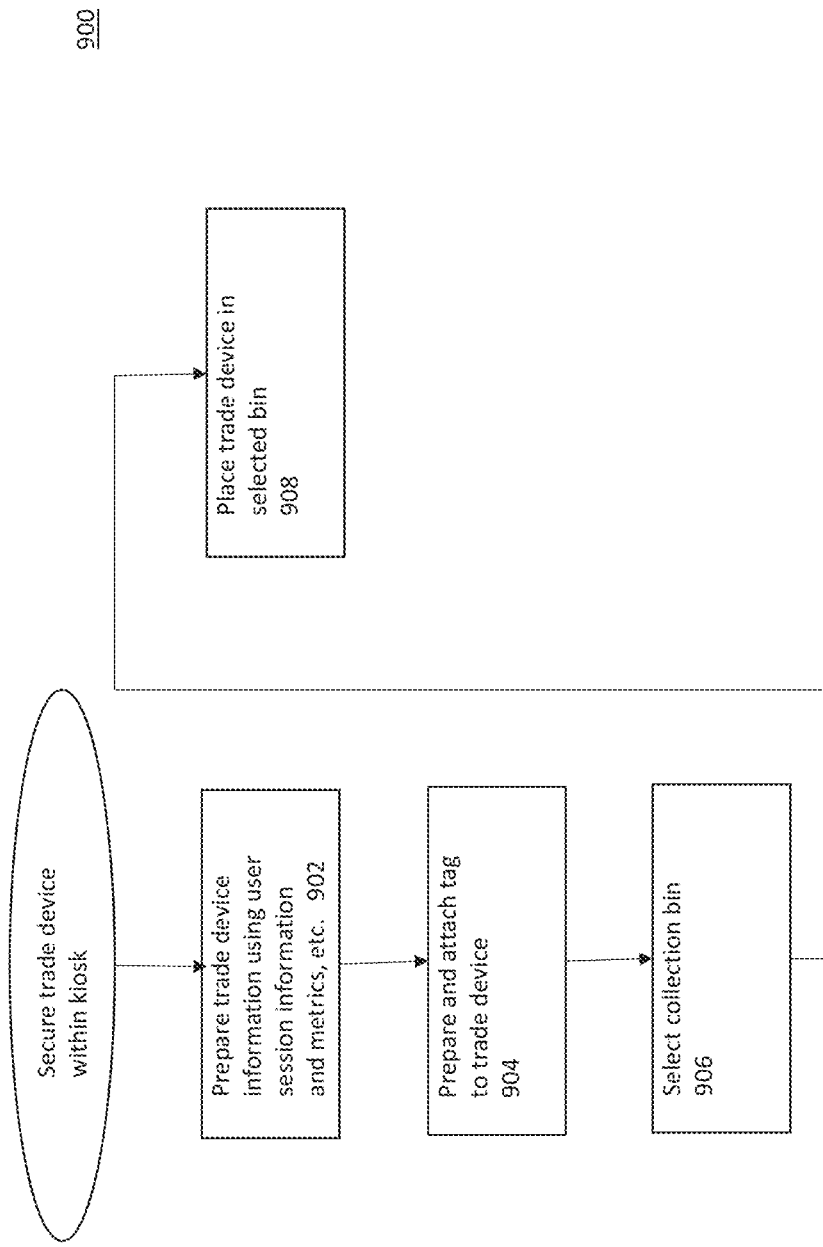

FIG. 23 illustrates a flowchart of a process 900 for securing the trade device within the kiosk. Process 900 may include operations 902-908. According to an embodiment process 900 may be executed when performing operation 870.

At operation 902, trade device information such as type of device, model information, manufacture information, obtained metrics, configurations, etc. are prepared from the user session and/or the obtained metrics.

At operation 904, the prepared information is printed on a tag (e.g., some type of sticker). An inventory tracking number may also be generated (unless already generated) and printed on the tag. The prepared tag is attached to the trade device. Some embodiments may include a robotic arm or the like that can be controlled by the kiosk to attach the tag to the trade device. In another embodiment, a Bluetooth tracking tag, RFID tag or the like may be attached to each trade device. The tracking information, along with the transaction information, is subsequently transferred to a central server for coordinating operations throughout the network of kiosks. Moreover, additionally or alternatively, a Bluetooth tracking device can be attached or somehow positioned in the kiosk to enable tracking of the kiosk. For example, such a tracking device may enable the kiosk, even if moved without authorization, to be tracked by either transmitting its location to a predetermined server, or by enabling nearby Bluetooth enabled devices (e.g., smartphones etc.) running a tracking program to detect the presence of the kiosk.

In some embodiment, the mobile app is capable to set the computer recognizable tracking information can be displayed on the wallpaper, or on "widgets", such as the widgets of IOS phones. For example, the mobile app could change the wall paper or add a widget that contains a barcode or QR code that will allow easy tracking of the device when it is powered-up at the warehouse or sorting facility.

At operation 906, a collection bin is selected. In some embodiments, each kiosk is configured with multiple collection bins. The trade devices may be categorized in accordance with their device type, value, or some other criteria, such that they may be collected in different bins. For example, smartphones, tablet computers, and smart watches, may be directed to different bins.

At operation 908, the trade device is placed into, or dropped in, the selected bin.

Subsequently, the retail or premise operator may collect the trade devices from the different bins and ship them to the kiosk operator or other service that is specified by the kiosk operator.

Figure 24:
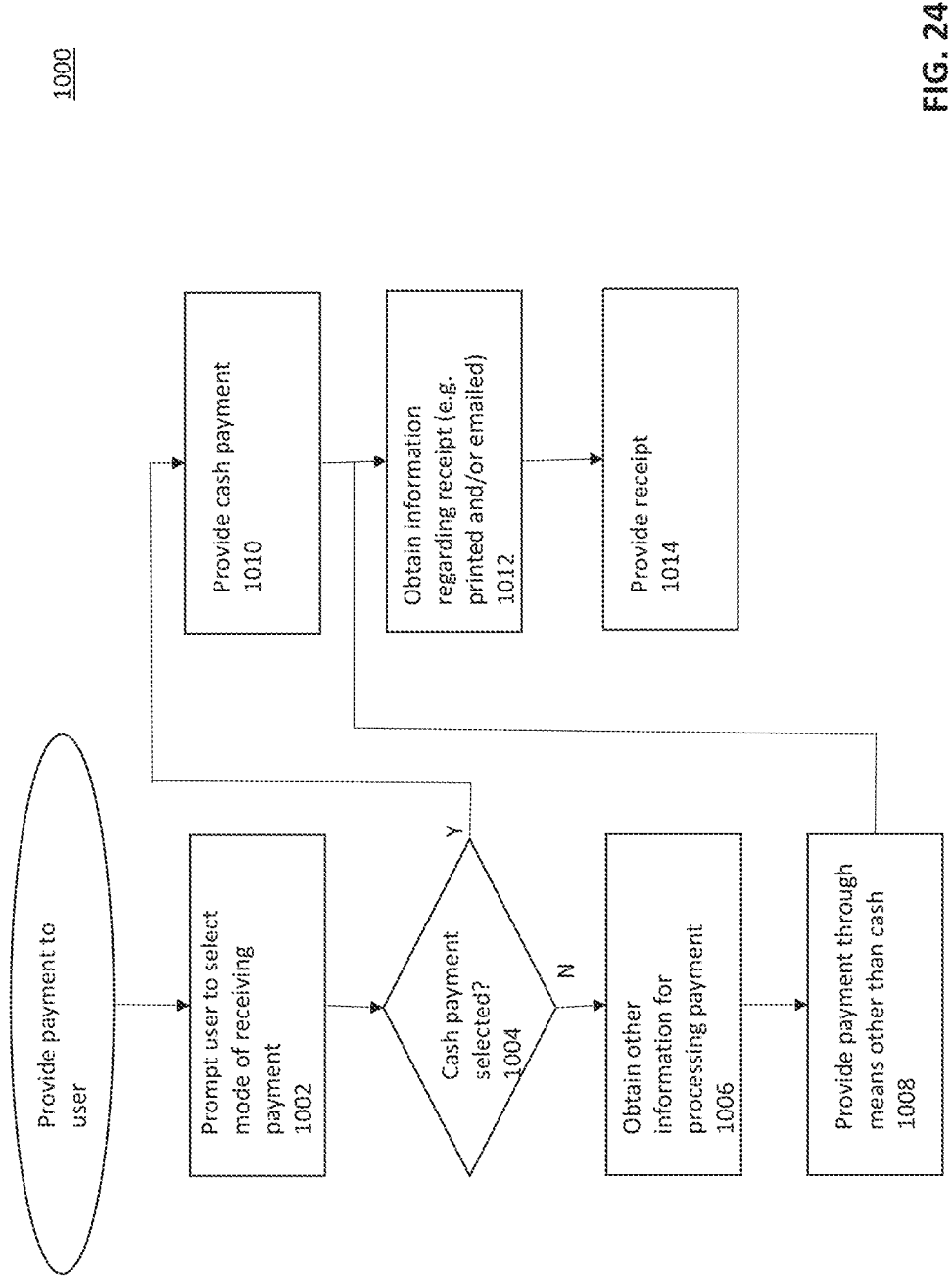

FIG. 24 illustrates a flowchart of a process 1000 for providing payment to the client. Process 1000 may include operations 1002-1014. According to an embodiment process 1000 may be executed when performing operation 872.

Several problems may prevent a transaction from completing. For example, if the final examination of the device cannot be completed because the batteries of the trade device are not charged, or if a user is reluctant to provide sensitive identification information, such as a driver's license.

In an embodiment, the kiosk software may be configured to provide the user with optional deferred payment. Such deferment may be useful, for example, when the electronic device cannot be thoroughly analyzed by the kiosk and some unverified attributes may cause significant change in the market price of the device. An example of an unverified attribute could be a user claiming that the device is working, but the batteries are not charged, thus preventing the app from properly evaluating the various attributes related to a working phone. Another example of an unverified attribute could be that the user is claiming its device is working, but has no account to download the application for completing the examination. Another unverified attribute could be the user identity, being reluctant to, for example, inserting a photo-ID card in the kiosk.

Attributes herein refer to information that can be used to describe an electronic device, including its characteristics, condition and health. Attributes of a device may also include information modeled from time to time by an operating company to represent the best practices in electronic device evaluation. Example attributes include, but are not limited to, device attributes (e.g., device type (e.g., cell phone, tablet, watch, etc.), manufacturer, model, make, version, manufacturing date or lot, memory size (e.g. RAM), storage size, screen size, carrier lock, manufacturer lock), identifier attributes (e.g., IMEI, MEID, device serial number, device MAC address), or health/device condition attributes (e.g., screen condition, body condition, battery health, GPS work-ing state, GPS working precision, touch screen health, CPU information, status of sensors (e.g., gyroscope, accelerometer), WiFi health, button health, bluetooth health, RFID health, water damage). With respect to a particular electronic device, an attribute may be in one of several conditions: the attribute exists and be evaluated, the attribute exists but is not fully evaluated (e.g., not evaluated, only partially evaluated, existence/applicability of attribute is uncertain), or the attribute may not exist (e.g., attributes not applicable to a particular device).

In some example embodiments of the invention, attributes are set using name and value implementations. For example, an electronic device attributes could be described as follows: "DeviceAttributes": {"VersionCode": 8, "VersionName": "1.0.3", "Brand": "LGE", "OS": "ANDROID", "Device": "G3", "Name": " ", "Model": "LG-D852", "Carrier": " ", "Sim": "NO", "Capacity": 25, "OriginalCapacity": 26503589888, "Width": 1440, "Height": 2392, "Storage": 32, "IMEI_UID": "990000862471854", "MAC": "a0:39:f7: 88:3b:85", "ScreenCondition": "mint", "ApplicationTests": {"TouchScreen": "OK", "WiFi": "OK", "CPUBogoMIPS": 83.763}}. Although the above device attributes are shown in a configuration in JSON to create a device attribute data structure, other techniques for describing objects, arrays, records, structures or similar data format can be used.

When unverified attributes (e.g., attributes that have not been fully evaluated) are present, the pricing server may not be able to recommend one single best price, but rather recommends a plurality of prices or a range of prices, based on the potential conditions of the unverified attributes. The evaluation of a trade device may not fully complete because of many reasons such as, for example: the device may not be charged, thus preventing many of the attributes to be properly assessed; the device seems to be working but may not be capable of downloading the kiosk app for complete diagnostic, for instance because it has been reset and has no account to the application store, such as with Apple Store™; the device may have screen protection preventing a clear view of the screen by the cameras; marks on the images coming from artifacts on the phone or in the booth may prevent the recognition of the body condition or screen condition, for instance; water damage or other similar defects that may be suspected but not confirmed; or the user has not been properly identified as the legitimate owner, for instance the IMEI could not be identified, or doubts subsists regarding the validity of the transaction.

When significant attributes are missing or missing data (e.g., are unverified), it is likely that the estimated price of a device can no longer be set to a specific amount, but rather to a range of price. As an example, if, despite inspection by camera, the screen of an iPad cannot be ascertained to be exempt of cracks, or if the application has not been properly executed to perform diagnostic, an electronic device attributes may include uncertainties. For example, the following example device attributes may represent a device that is working, because it successfully connected to the kiosk local web server, which was able to retrieve some basic information, but a complete diagnostic was not made by the user that could not download the app, for example because the user had no access to the application store: "DeviceAttributes": {"VersionCode": 8, "VersionName": "1.0.3", "Brand": "LGE", "OS": "ANDROID", "Device": "G3", "Name": " ", "Model": "LG-D852", "Sim": "NO", "Capacity": 25, "OriginalCapacity": 26503589888, "Width": 1440, "Height": 2392, "Storage": 32, "MAC": "a0:39:f7:88:3b: 85", "ScreenCondition": "mint", "ApplicationTests": {"CPUrunning:","True", "Display","True", "TouchScreen", "missing"}}}. In the above example of device attributes, some attributes are defined, for instance the "Brand", some attribute are missing, for instance the "Carrier" and "UID_I-MEI, and some attribute are missing information or data, such as the "TouchScreen" within ApplicationTests.

When at least some required attributes remain unverified, the pricing server is operable to retrieve at least two different prices based on at two different assumptions: (1) what is the price of the electronic device in the worst case scenario, that is, if all missing or incomplete attributes are set to the worst possible condition; and (2) what is the price of the electronic device in the best case scenario, that is if all missing or incomplete attributes are set to the best possible conditions. Some example embodiments may retrieve a possible price based on for instance average or common possible conditions.

In these circumstances, it may be necessary to delay the payment or part of the payment to be made after the unverified attributes have been somehow verified, for example when the device arrives at the warehouse for analysis. Thus, the payment or compensation for a tradeable device may be spaced over time (e.g., in hours, days or weeks). In an example embodiment of the invention dealing with unverified attributes, the user is presented with options, for example through the kiosk (or through the app, if the app is running) similar to a screen that informs the client that some elements of the trade device have not completed evaluation, and where possible, a list of the incompletely evaluated aspects, the range of the likely offered price, and the amount of the current offer of payment.

In some embodiments of the invention, where the user is interacting with the kiosk, a user may be offered a first partial payment, trusting the operating company for a second potential future payment to be made using electronic means or redeemable coupons that is activated after a further inspection on the trade device has been performed. However, it is to be noted that the first partial payment may be optional, for instance, if the price of the device is estimated in a range that starts at zero dollars (e.g., when highly important attributes are yet unverified, such as legitimate owner is not confirmed or uncertainties persists). In such embodiments, a unique identifier relating to the current transaction and/or to the electronic device being traded is provided to the user either by printing on a coupon or sending such unique identifier on an electronic coupon in the form of an email message, SMS message or embedded into other messaging system. At that point, the coupon has no cash or other value as it is pending a further evaluation of the electronic device for identifying or completing any missing or incomplete electronic device attributes.

Subsequently, when a staff of the operating company performs further evaluation and inspection of the electronic device possibly at a warehouse, taking whatever steps needed in order to perform such evaluation, for example, charging the battery, removing covers and processing with a series of tests on the electronic device and, ultimately or as the tests or evaluation steps are performed, entering such information concerning the further evaluation steps and/or results of each evaluation steps and/or information for any missing attribute in at least one of the network's databases. Following that further inspection, a final value may then be calculated, as described furthermore herein, so that the client can receive a said possible second future payment, either through electronic means such as PayPal or may be offered the ability to redeem cash payment at a second visit to a kiosk or to an affiliated kiosk, by using, through input means or scanning means (OCR, QR code), the unique identifier which may have been printed on the coupon or otherwise sent to the client, the client may have been notified of said second payment by electronic means (e-mail, SMS, or other messaging), or may have retrieved information about said second payment, for example through a website by entering a unique identifier, for instance printed on the coupon.

Figure 42A:
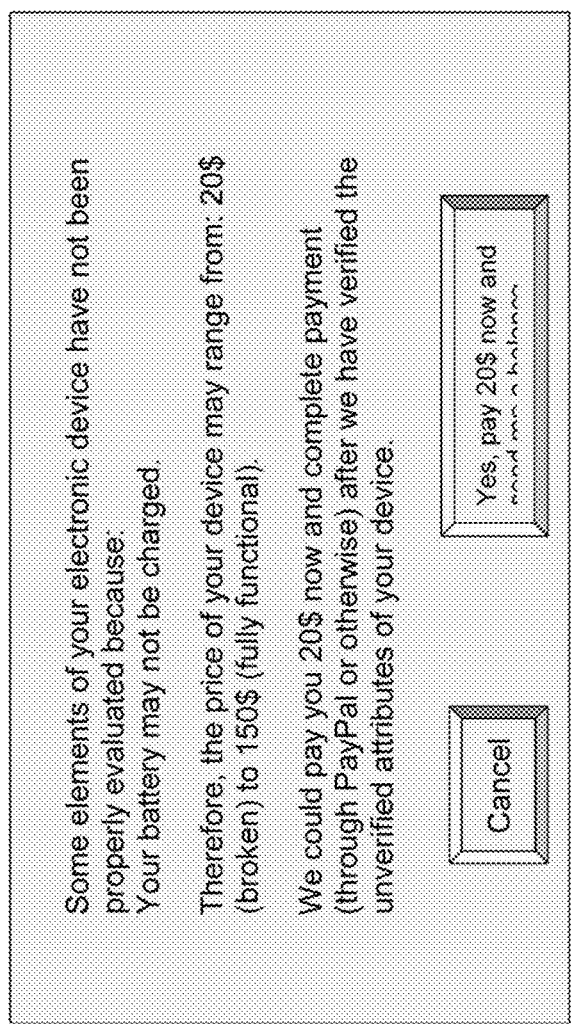
FIG. 42A-B illustrates a screen to inform the client about one or more price options with details as to features yet to be verified and the impact of those features on the offer price, according to some embodiments.
Figure 42B:
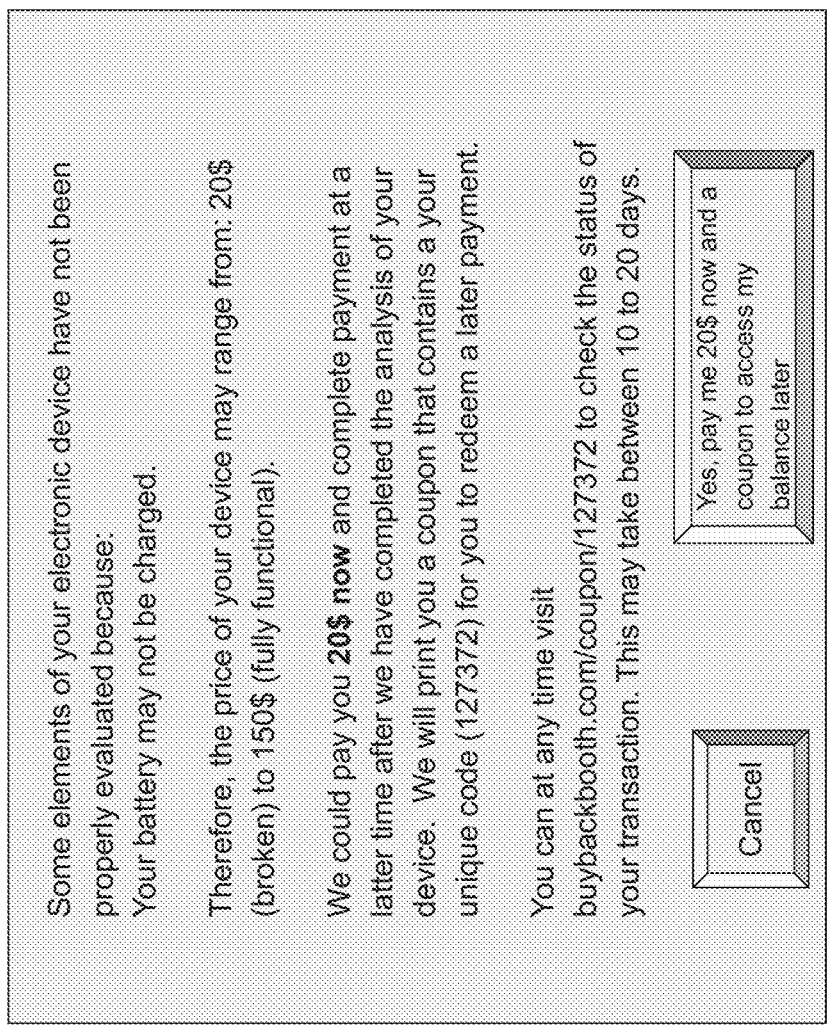

In these embodiments of the invention when a coupon is used, the client may be presented with a screen similar to FIG. 42A-B, and a coupon containing information about the transaction that contains at least said one unique coupon identifier is printed after the client selected or agreed to the potential deferred payment. In this embodiment, computer code on the network is capable to associate the unique coupon identifier, for example by means such as a database, with (i) at least a device identifier that uniquely identifies the electronic device. Computer code on the network is capable of, directly or indirectly, for example by means such as a database, associate the electronic device with (i) its attributes, (ii) missing attributes or (iii) missing attributes data gathered and stored in one of the network's database during the first evaluation of the electronic device at the kiosk.

When the user has been given a coupon after the first evaluation of the trade device with at least one unique coupon identifier, such as a typeable code or QR code, or by using a unique user identifier, such as defined above, the user can receive the potential second payment by providing said coupon or said unique user identifier to the kiosk or to an affiliated kiosk connected to the network.

In some embodiments of the invention, the network may replace coupons by using unique user identifiers, such as an email address, a telephone number, a social media login, biometric information such as thumbprints or facial recognition, in order to uniquely identify a user and any transactions, and thus identifying any pending approved payments, to be made to said user in order to proceed with redemption of said pending approved payments. In such embodiments, computer code on the network is capable of the same functions as if a coupon was used. For example, after the first evaluation of the trade device, the kiosk may store the client biometrics, such as thumbprint or facial images captured by the kiosk, in association with the results of the first evaluation, estimated payment range, and information regarding unique identifier or coupon provided to the client, and subsequently when the unique identifier or coupon if submitted to the kiosk after the further evaluation is performed, use the stored biometrics to verify the client's identity before making payment.

Techniques that may be used in embodiments for making a unique coupon identifier includes generating a number or alphanumerical string for instance using random methods, or using time-based methods, or using functions taking for input a seed which can be for example a session number, the unique identifier for the electronic device, or other commonly used seeds, the process typically includes steps for creating a record or an element of an existing record, in at least one of the network's database. Rendering such unique identifier in the form of a QR code or other computer recognizable or readable format can also be used in some embodiments.

Alternate techniques for making a unique coupon identifier includes a user's personal identifiable information or address, such as cell phone number, an email address, a social media address. In embodiments of the invention using such alternate methods, the unique coupon identifier may actually be used as a unique user identifier which contains a series of potential payments, for instance if the user has made more than one transaction.

The network may be configured to have the coupon unique identifier to be, directly or indirectly, associated with financial information about the transaction and, the financial information normally including the amount paid during said first payment made when the coupon was printed at the transaction time (which amount paid can be non-existant or zero), and the financial information optionally contains additional information about the maximum amount proposed to the client. Such association may allow the network to associate an electronic device received at a warehouse facility with a coupon, a user or a transaction, or vice-versa where applicable, so that when, at a later time, operating company personnel, for example at a warehouse facility, receive the electronic device and proceed to a further inspection for clarification of any missing attributes or attributes data. At that time, the technician can associate data with the missing attribute or the missing attribute data, for example "battery charged ok", "no water damage found", "screen is not cracked" or "phone is not stolen" by using an interface software connected to the network and causing, after analysis is complete, the calculation of a final price to be offered to the client, the price being communicated to or accessible by the client by electronic means including through a website accessible by client, through an application for example by typing the coupon code, by email address if available, by SMS messaging if available. After a final price has been associated with the electronic device or the coupon (or both), the client is then capable of receiving the final payout by accessing the original kiosk or an associated kiosk and, using client interfaces or cameras, entering or scanning the unique identifier, causing the kiosk to communicate with the network database and receiving final payout information for final cash payment, if applicable.

Some example embodiments provide for using evaluation information or pre-evaluation information gathered for instance at the kiosk or from the kiosk app, to get offers from an auctioning system.

In an embodiment, the kiosk first retrieves attributes of an electronic device as described herein and proceed in a second step to send that information to a network for analysis and bidding. After possibly identifying that no good price can be offered to the user, or for other reasons, or possibly systematically, the kiosk is operable so that a server on the network publishes information about the device being evaluated for selling to a plurality of potential buyers and demand potential buyers a price commitment for the electronic device that the potential buyers will pay for the device. An example of this embodiment can be described as follows: a user gets his electronic device evaluated as per one of the methods described herein, such as through the kiosk or through the app, the kiosk or the kiosk app, accordingly, sends the information about the electronic device and its associated attributes to a server belonging to the network, said server being capable to respond rapidly to information received and act by publishing the information about the electronic device and its associated attributes and most probably a time-limit for responding, for example on a website, by electronic mail, by text message, through RSS feeds or other similar methods for publishing electronic information to a group of bidders, and providing a method for said bidders to submit a bid price, said method can be in the form of a website input box, application input box or other input mechanism capable of capturing a price from a bidder, said bid price being stored for further processing, and said network server being operable so that, after said time-limit expired, said server select the best bid price previously stored, prepare a proposed buy price based for example on pricing methods described herein, said server being capable to communicate the proposed buy price to the client, for example, through the app, by electronic mail, by text message or other similar electronic communication means. In response to the proposed buy price, the user may select to accept or decline the offer.

In an embodiment, the network may be operable in a way so that, for devices that have no value, or for device where no value could be found at that time, instead of offering the user to simply recycle the electronic device or to refuse the transaction, the network may, through the app or the kiosk, propose the user to keep working on the offered device and return a future response, such as by email or text message or through the app or otherwise, and, if the user accepts, the network may apply one or more method for finding a price over a longer period, while returning the electronic device to the user.

At operation 1002, the client is prompted to select the mode of receiving the payment. The prompt may be displayed on the screen of the kiosk. The available modes may include, for example, one or more of, cash, coupon, credit to the client's Paypal or other specified account, or debit card.

At operation 1004, it is determined whether cash payment has been selected.

If the client selected cash payment, then at operation 1010, an amount of cash corresponding to the agreed upon payment value is provided to the client.

If the client selected another mode of payment than cash, then at operation 1006, additional information is obtained for processing the payment. The additional information may include, the exact mode of payment, account number etc.

After operation 1006, at operation 1008, the payment is provided through the selected other means. If the client has selected Paypal as the preferred payment option, then the specified account is credited with the amount of money corresponding to the agreed upon payment. If the client selected to receive a debit card, the kiosk encodes a debit card with the payment amount and outputs the card. Alternate payment methods such as electronic fund transfers directly to the client's apps (e.g., Venmo), gift cards or smart cards (e.g., generated in a card dispenser incorporated in the kiosk), can be contemplated in conjunction with the present invention After providing payment, by one of operation 1010 or 1008, process 1000 proceeds to operation 1012 where the client is prompted with respect to a receipt. The client may specify whether or not a receipt is desired and the mode of receiving the receipt.

At operation 1014, the receipt is provided. Providing the receipt may be by printing the receipt, and/or by emailing a copy of the receipt to the client at one or more specified email addresses.

Figure 25:
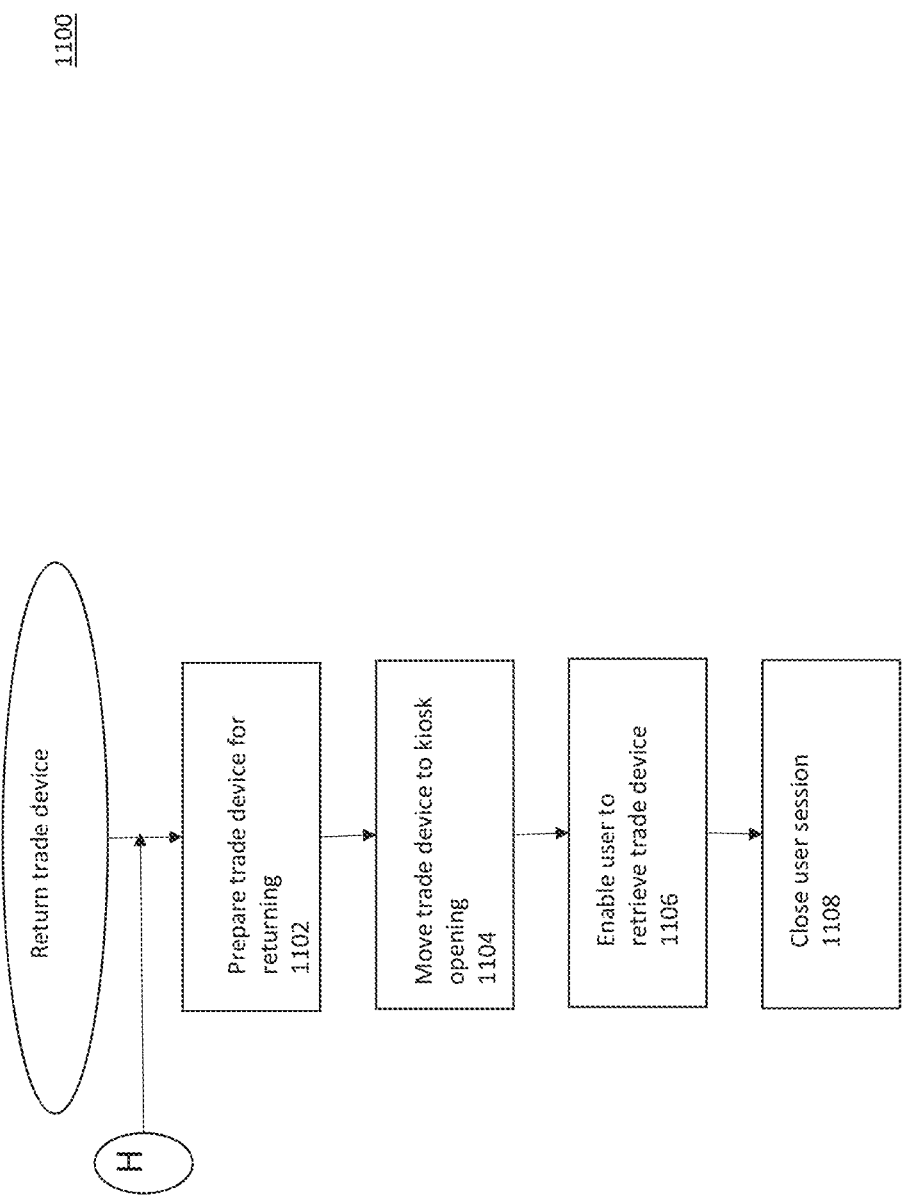

FIG. 25 illustrates a flowchart of a process 1100 for returning the trade device back to the client from the kiosk. Process 1100 may include operations 1102-1108. Returning of the trade device may be performed at any stage when the client cancels out of the transaction, or when the transaction is cancelled by the system for reasons such as the client rejecting the estimated amount, not accepting the agreement, the trade device not being eligible for trading or recycling.

Alternatively, an embodiment of the invention may be configured not to propose payment methods but is bound to a specified method, for example, printing coupons redeemable for in-store merchandise of a given merchant or group of merchants.

At operation 1102, the trade device is prepared for returning. For example, if the kiosk app was being executed under control of the kiosk or call center operator, the app would be shutdown and/or any changes caused to the trade devices system would be reverted entirely or to some extent.

At operation 1104, the trade devices is conveyed back to the kiosk opening from the scanning area.

At operation 1106, the client is prompted to collect the trade device from the kiosk opening. The door to the kiosk opening may be electronically controlled to facilitate retrieval.

At operation 1108, the user session is closed. Closing of the user session may include archiving and/or storing a copy of the session.

Figure 26:
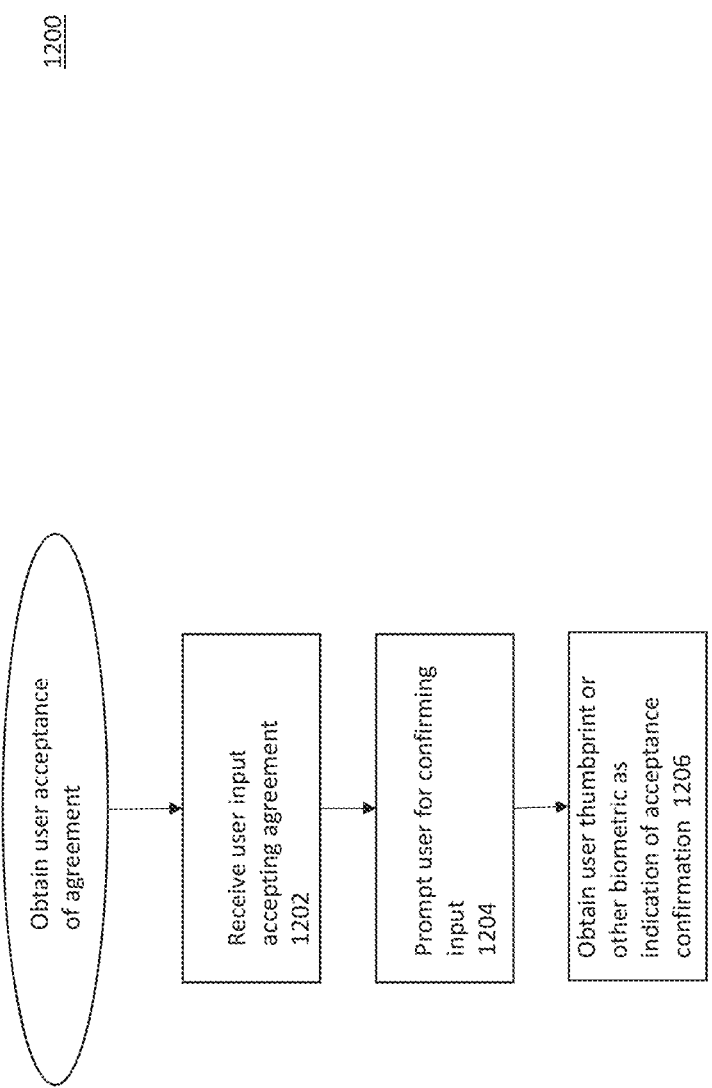

FIG. 26 illustrates a flowchart of a process 1200 for obtaining the client's approval of the trade agreement. Process 1200 may include operations 1202-1206. According to an embodiment process 1200 may be executed when performing operation 868, for example, prompting the client to indicated whether he/she accepts the agreement.

At operation 1202, an input from the client is received indicating that the acceptance of the agreement. For example, the client may have touched the displayed virtual button corresponding to the acceptance.

At operation 1204, the client is prompted for providing confirmation of the acceptance. The prompting may be via the screen of the kiosk. For example, the client may be requested to provide a thumbprint as confirmation of the acceptance. In some embodiments, a different biometric can be used as a confirmation of acceptance, for example an eye scan, voice recognition, facial pattern recognition, etc.

At operation 1206, the thumbprint reader is activated to obtain the client's confirmation.

Figure 27:
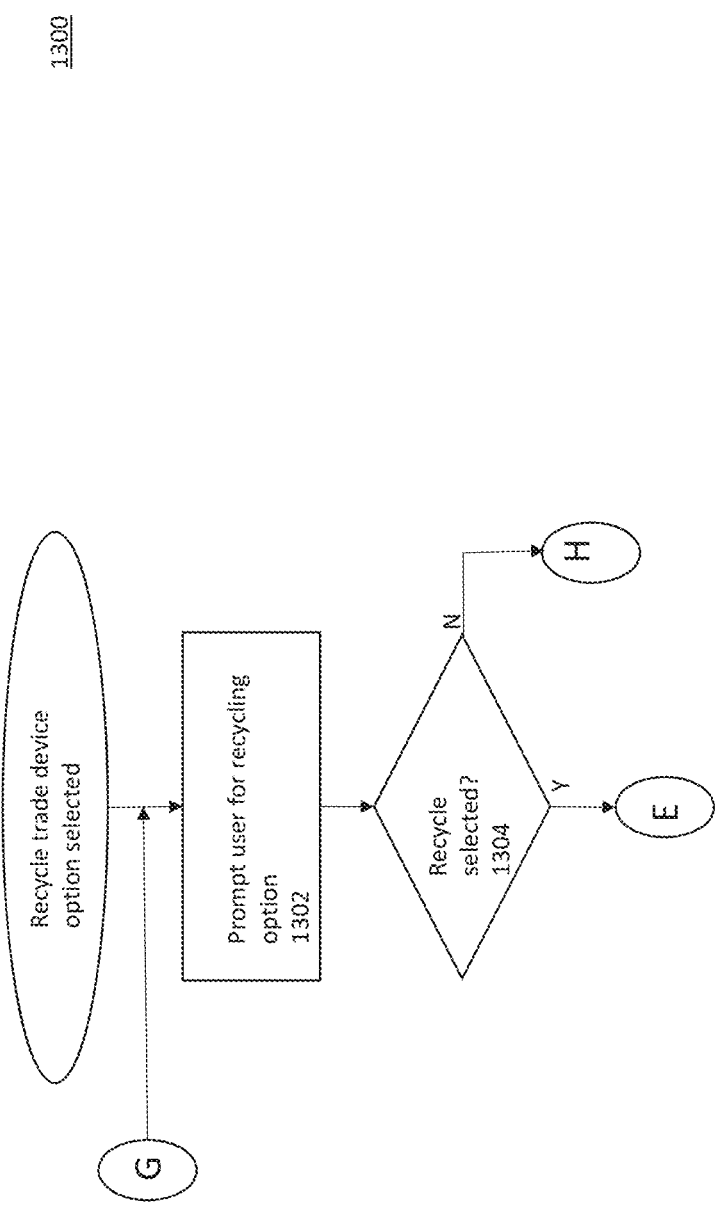

FIG. 27 illustrates a flowchart of a process 1300 for determining whether to recycle the trade device. Process 1300 may include operations 1302-1304. According to an embodiment process 1300 may be executed when performing operation 860 determines that the trade device does not have a tradeable value.

At operation 1302, the client is prompted to accept the option to recycle the trade device. For example, such an option may be provided when the system determined that the trade device does not have sufficient tradeable value.

At operation 1304, it is determined whether the user has selected the recycle option. Subsequently, the process may proceed to present the client with an agreement and collect the trade device for recycling.

Figure 28:
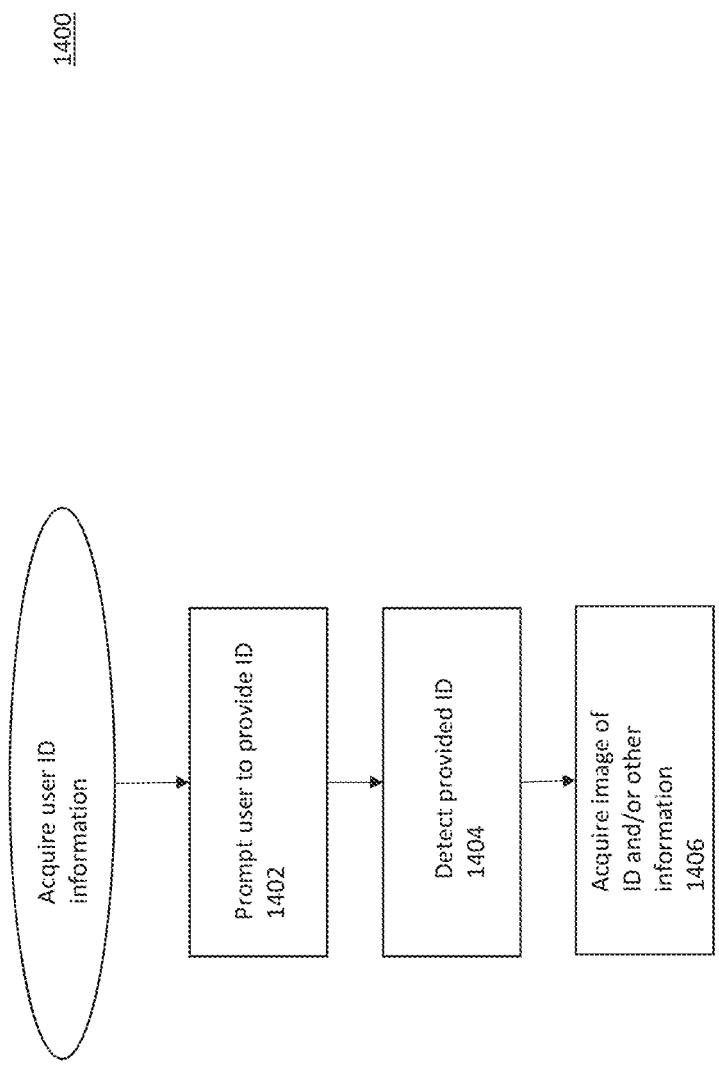

FIG. 28 illustrates a flowchart of a process 1400 for obtaining client identifying information. Process 1400 may include operations 1402-1406. According to an embodiment process 1400 may be executed when performing operation 810.

At operation 1402, the client is prompted to provide an ID.

At operation 1404, the ID unit is monitored to detect insertion of an ID by the client.

At operation 1406, upon detecting that an ID has been inserted into the ID unit, the ID is scanned/photographed. In some embodiments, additional and/or supplementary information may be obtained from the client. For example, the client may be required to manually enter a phone number, zip code etc. to aid in the identifying process.

Figure 29:
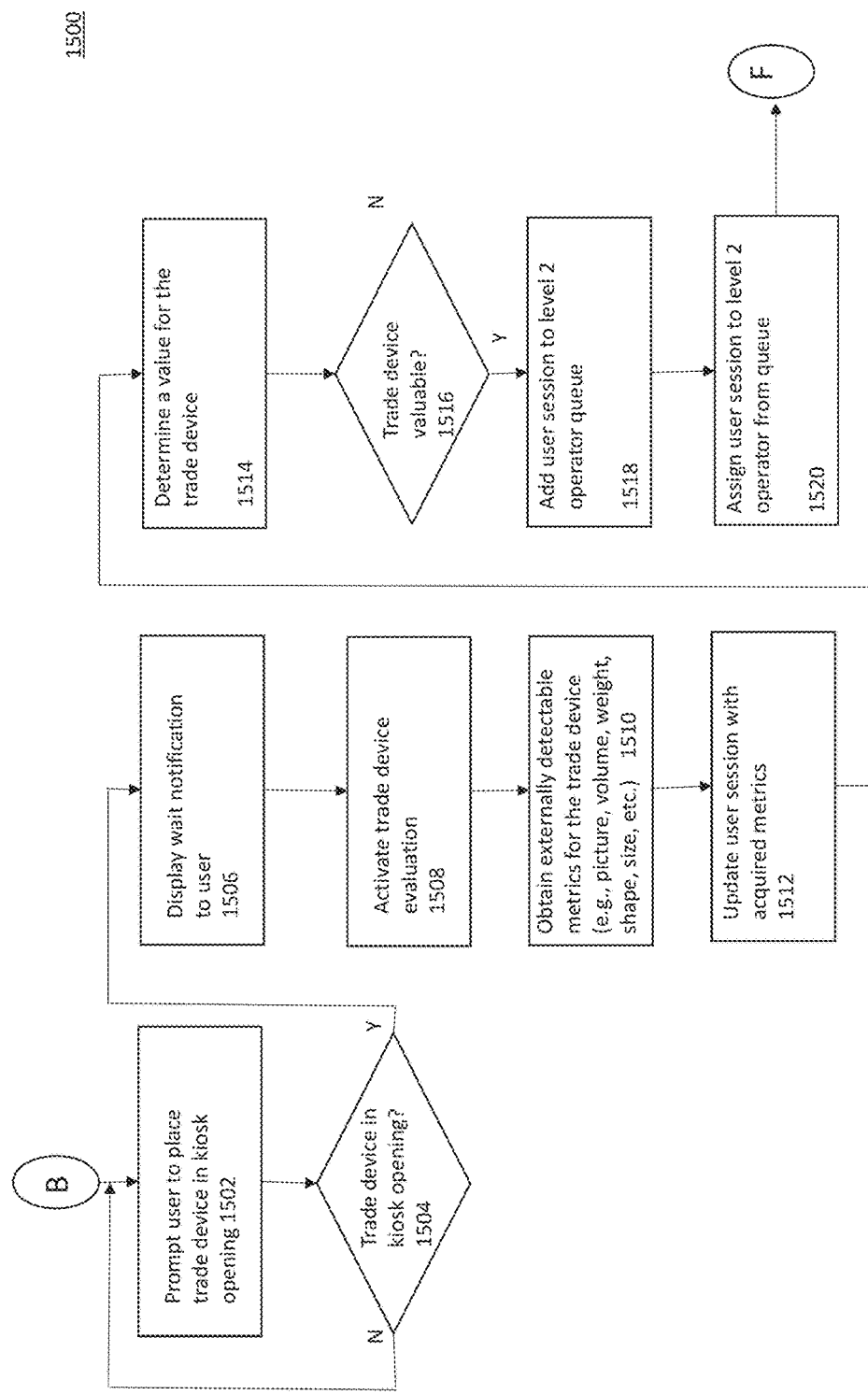

FIG. 29 illustrates a flowchart of a process 1500 for processing the trade device when the trade device cannot run, or for some reason does not run, the kiosk app. Process 1500 may include operations 1502-1520. According to an embodiment process 1500 may be executed when performing operations 824 or 828.

At operation 1502, the client is prompted to place the trade device in the kiosk opening At operation 1504, the kiosk opening is monitored to detect the presence of the trade device.

When the trade device is detected, at operation 1506, a notification is displayed requesting the client to wait until the device is evaluated.

At operation 1508, trade device evaluation is activated. This includes moving the trade device into the scanning chamber form the kiosk opening area.

At operation 1510, the evaluation of the trade device in the scanning chamber is performed. The evaluation includes detecting externally visible metrics such as size, shape, other visible characteristics that are determinable by capturing images of the trade device. Characteristics such as weight etc. may also be detected. However, because the kiosk app is not active, certain internal metrics are unavailable.

At operation 1512, the user session is updated with obtained metrics.

At operation 1514, a value is determined for the trade device. The determination may be based upon the metrics obtained in the above operations.

At operation 1516, it is determined whether the trade device has sufficient tradeable value. If no, the trade device may be considered for recycling or returned to the client. If yes, the process 500 proceeds to operation 1518 where the corresponding user session is assigned to a call center operator. In some embodiments, in this scenario where the kiosk app is not able to run on the trade device, the user session is queued to be assigned to a level 2 operator.

The queue servicing may be based upon the round robin discipline such that waiting clients at different kiosks are fairly treated. At operation 1520, the user session is assigned to an available level 2 operator. Level 2 operators are authorized and equipped for a greater level of engagement with the client than the level 1 operators.

Figure 30:
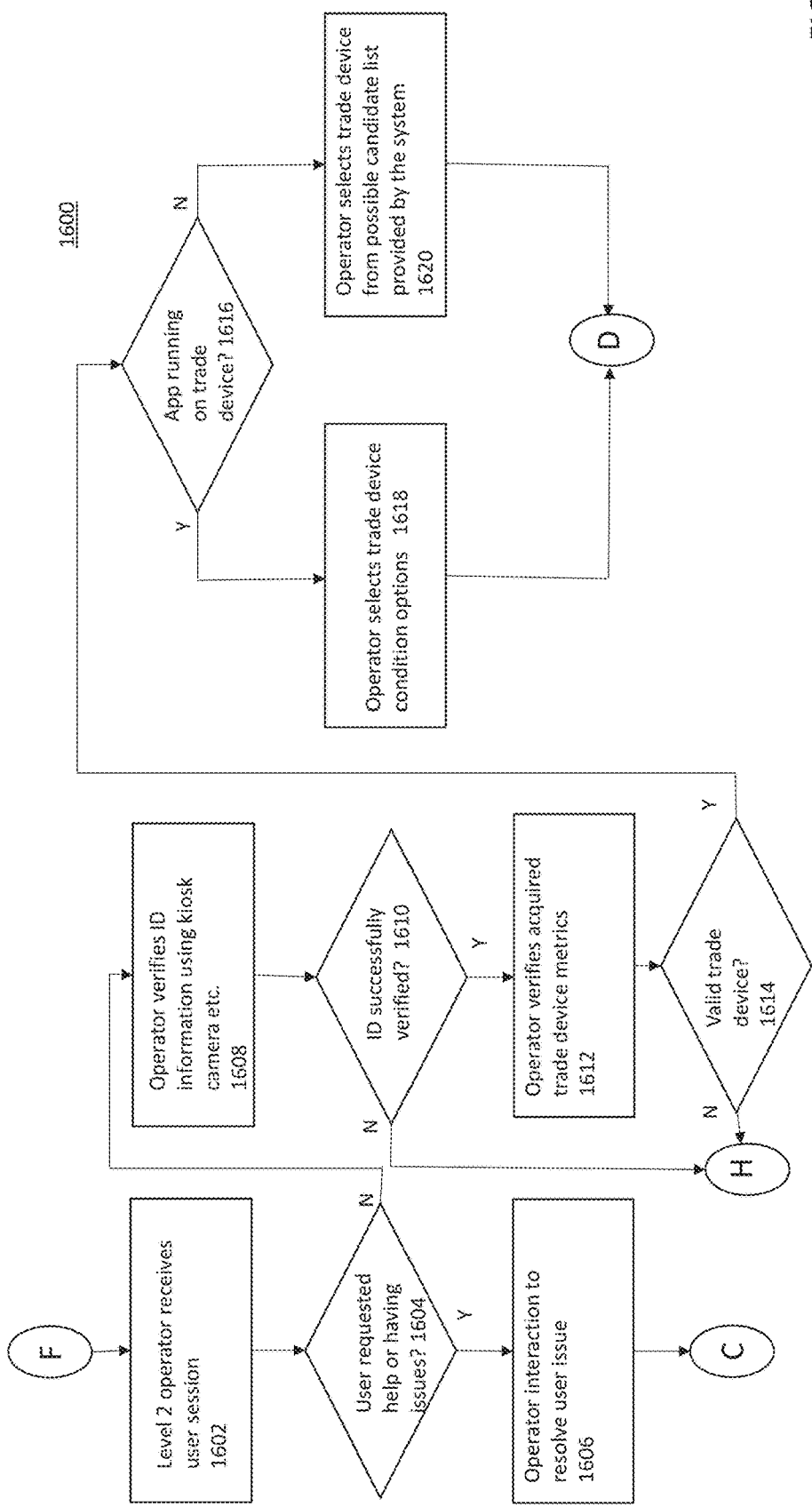

FIG. 30 illustrates a flowchart of a process 1600 for processing of a user session by a level 2 operator. Process 1600 may include operations 1602-1620. According to an embodiment process 1600 may be executed when, for example, a user session for transaction related to a trade device which does not run the kiosk app.

At operation 1602, the user session is obtained by the assigned level 2 call center operator.

At operation 1604, the operator determines whether the client has requested help or assistance.

If the client has indicated that he is having an issue, then at operation 1606, the operator directly interacts with the client to resolve the issues.

If the client has not indicated that he is having an issue, then at operation 1608, the operator may use one or more of the kiosk cameras and/or microphone/speaker to further corroborate or determine the client provided ID information.

At operation 1610, if the ID is successfully verified, the process 1600 may proceed to operation 1612 at which the operator may verify the acquired trade device metrics.

At operation 1614, it is determined whether the trade device is a valid device.

At operation 1616, it is again determined whether the kiosk app is running in the trade device.

If it is determined that the app is now running on the trade device, at operation 1618, the operator may utilize the app to further determine conditions of the trade device.

In the case that the app is not running on the trade device, or where the app is running, after certain trade device conditions are determined with the help of the app, at operation 1620, the operator may select a device option from a list of devices selected by the system.

As described above, an app to detect and diagnose various aspects of the trade device (for example, the kiosk app referred to above), may be downloaded to the trade device or another device (e.g., a second mobile device) from an app portal such as Google Play Store™ or Apple iTunes Store™. In embodiments described above, the app is primarily downloaded to the trade device when the trade device was in proximity to the kiosk. However, in some embodiments, the app may be downloaded to the trade device at any time prior to the trade device being placed in the kiosk, even before the trade device is near the kiosk.

In some embodiments, the app may be used by another device (e.g., a second portable electronic device which is not the trade device, another computer) to facilitate the evaluation of the trade device—for example, diagnostics of the trade device may be performed based at least on an image captured using the camera of the other device. Such diagnostics may be complementary to diagnostic performed by the kiosk and/or the trade device. The other device may be a smartphone, tablet computer, or other portable electronic device.

When the app is downloaded and installed on the second device, the app may provide for the client to enter information about and/or submit pictures of, the trade device, so that the time the user has to spend physically at the kiosk completing the trade can be significantly reduced. Reducing the time necessary for the user to spend at the kiosk, improves the user experience in using the kiosk to trade devices. It also provides for improving the kiosk's throughput for processing trade devices.

The reduction of the time required at the kiosk may be achieved by the app acquiring, either automatically or by the client manually entering, many of the pieces of information required for the trade before arriving at the kiosk and the app transferring the acquired information to the kiosk when the client is near the kiosk. In some embodiments, the app may transfer the acquired information to the central servers (e.g., servers 108/110) from where the kiosk can subsequently access the information. The automatic acquisition of information by the second device may be by capturing an image of the trade device using the camera of the second device, using the microphone of the second device to record audio output from the trade device, etc. Captured image or audio of the trade device may be subsequently submitted to the kiosk or the central servers for analysis. Some of the analysis may be performed by the second device. One or more pictures and/or audio clips of the trade device may be submitted to the kiosk or the central servers by the second device before or soon after the client with the devices arrives at the kiosk. The information acquired by the app in advance may also include information pertaining to the client and/or the trade device.

The photographs of the trade device can be used to reduce the number of images of the trade device required to be captured by the kiosk. In certain embodiments, a comparison of the kiosk-taken image of the trade device and an app-taken image of the trade device can be used to confirm that the app-provided information relates to the same device imaged by the kiosk.

Figure 32:
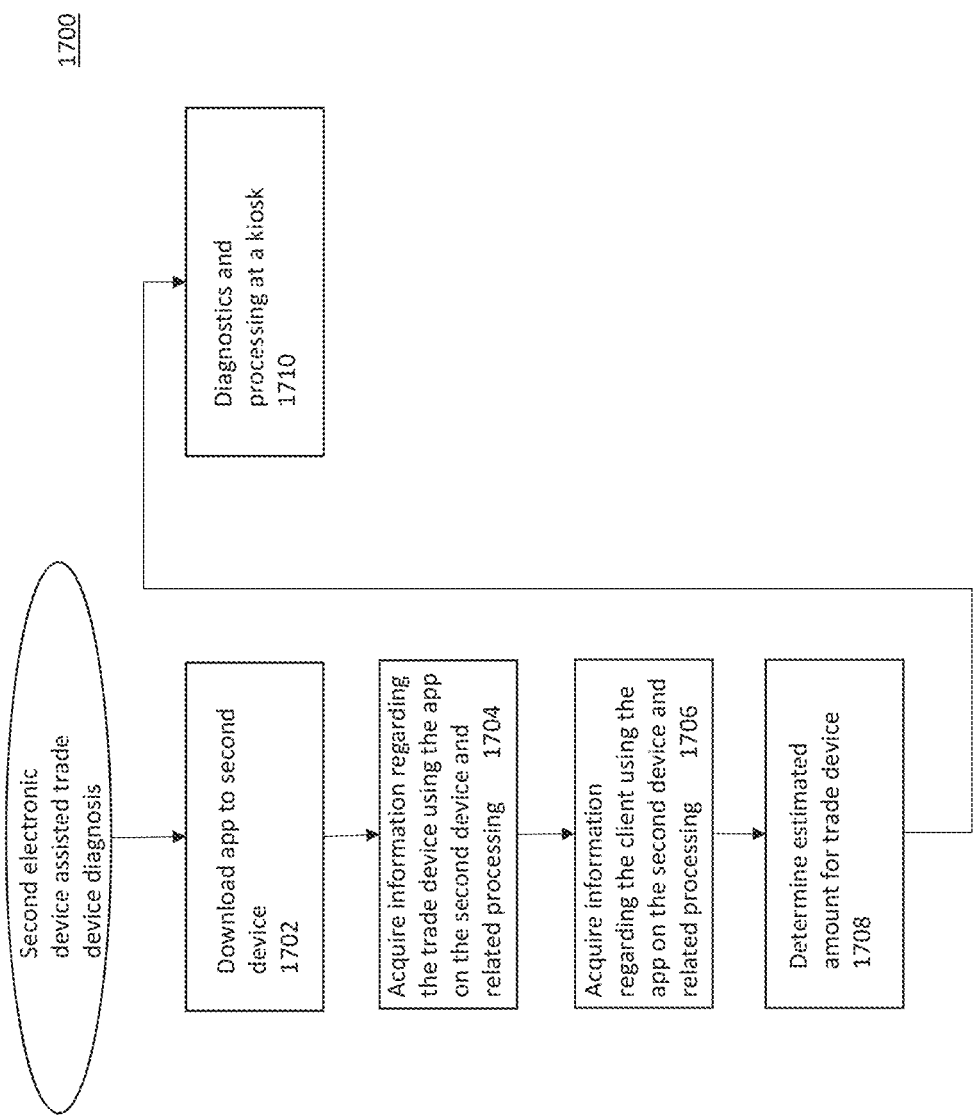
FIG. 32 illustrates a flowchart for a process in which the client runs the kiosk app on a second device such as a second smartphone to gather information about the trade device, according to some embodiments.

FIG. 32 illustrates a flowchart for process 1700 in which the client runs the kiosk app on a second device such as a second smartphone to gather information about the trade device. The app, in these embodiments, may be run before the trade device is near a kiosk. Although the following operations are described as part of the kiosk app, in some embodiments the operations may be performed by one or more apps that are separated from the kiosk app.

At operation 1702 the client downloads the app to the second device (e.g., a client's mobile phone which is not the trade device) from an app store or other network resource.

At operation 1704 the client starts the app. The app, running on the second device, may instruct the client to take one or more images of the trade device. The instructions may be displayed on the screen of the second device or may be output via the speaker. The instructions may specify that the front, back, and/or sides of the trade device are to be photographed, that one or more buttons on the trade device are to be pressed before the front display of the trade device is photographed so that what is displayed on its screen will be captured on the photographs, etc. Some of the aspects of the trade device to be detected from images captured by the second device were described above.

The app can be used by the second device to assess the features and functionalities of a trade device, at least partially, before the trade device is brought to the kiosk. For example, the app running on the second device can take at least one picture of a trade device and with processing by remote servers (e.g., servers 108 and databases 110) using technologies such as, but not limited to, computer vision, artificial intelligence, object recognition and defect recognition, the app is able to identify the trade device. For example, in order for a client to evaluate a trade device from an app running on the client's mobile device, the client may be instructed, by the call center operator and/or the remote server, to take a series of at least one photo of the trade device. The app on the second device then sends the series of at least one photo to a recognition server (e.g., in servers 108) for further analysis. The recognition server uses computer vision technologies to recognize features from the picture taken, such as, length, width, height, position of attributes such as buttons, microphones, logos, etc. The recognition server by having processed a multitude of images is capable of recognizing with a high accuracy the model of the trade device using artificial intelligence and computer vision models.

In an example embodiment, in order to classify the trade device make and model from images of the trade device itself, the recognition server may use a deep learning algorithm, such as, for example, convolution neural network (CNN), which uses a classification algorithm that has at least two phases. In the training phase the CNN is trained using a dataset comprised of images of known phones and their corresponding make, model and possibly attributes. In the prediction phase the CNN utilizes the trained model to predict phone make and model from phone images as well as possible attributes.

The CNN network may improve with training. There may be four steps in training the CNN.

In the first step of training the CNN, data preprocessing, the images may be processed for clarity and stored in a format that can be used by the recognition server. Specifically, the prepossessing step may consist of: histogram equalization on all training phone images, resize all training images to a fixed format, divide the phone training data into two sets respectively training set, for example a first set corresponding to, for example, five sixth of total image set and a validation set corresponding to the balance one sixth—the former may be used for training the model and the latter may be for calculating the accuracy of the model.

In the step of model definition, a CNN model and its parameters are defined. The defined CNN model may use for example a GoogleNET which is pre-trained on the ImageNet dataset. The use of pre-trained model is a technique referred to as transfer learning.

In the step of solver definition, the CNN model may be optimized. The accuracy of the model is computed using the validation set every predetermined fixed number of iterations (e.g., at every $i^{th}$ iteration, where i is preconfigured). The optimization is run for a maximum number of iterations i_max such as i_max>50*i.

In the step of model training, the CNN may be trained using the training set. As the loss and the model accuracy are monitored, the training process may be run until either a predetermined number of iterations is reached or the variation on the loss and the model accuracy is consistently below a predetermined threshold.

Once the training completes, the recognition server and/or the second device uses the trained CNN to make predictions on new images of phones.

In some embodiments and in conjunction with the above, the recognition server may also be configured to identify defects of the trade device based on the series of images, for example detecting that a screen is cracked or a button is missing or other attributes being altered. In order to do so, in some embodiments, the recognition server is capable of identifying analog defects in comparison to "mint condition" pictures by using various computer vision functions and libraries such as libraries available from OpenCV.

For example, in an embodiment of the invention for detecting defects, one method for detecting defects is based on images taken from at least one viewpoint and performing: (1) histogram of gradients (HOG) features; (2) transform image by applying homography transformation based on the four corners of the screen found in the previous step, (3) preprocess the image by grayscale conversion and Gaussian Blur application, and (4) find cracks using edge detector such as Canny edge detector.

In embodiments capable of detecting defects through the use of computer vision or artificial intelligence libraries, certain particular attributes may be of interests, such as "cracked screen", "missing button", "missing battery", etc. These attributes are stored and associated with the user session or the trade device for further processing, such as, for querying a price. Based on information identified above from a recognition and/or defect recognition server, taken from a series of at least one picture from either an automated kiosk or a second device capable of taking pictures, price analysis functions are performed to compute or select with the help of a database an estimated market price to be offered to the end user for the second device.

In some embodiments, at least one camera (of the second device or of the kiosk) taking images of the trade device may be an infrared camera capable of detecting defects that are otherwise left unseen by standard visible spectrum cameras. Similar models and methods for defect detections, as described herein, are applied to images generated by infrared cameras. In some embodiments, at least one camera taking images of the trade device may be a 3D camera capable of measuring depth. In some embodiments, cameras may be assisted by strategically located mirrors capable of extending the viewing capability of the camera toward the device both for device identification of the make and model or for defect detections, through techniques such as the above described techniques.

Figure 33:
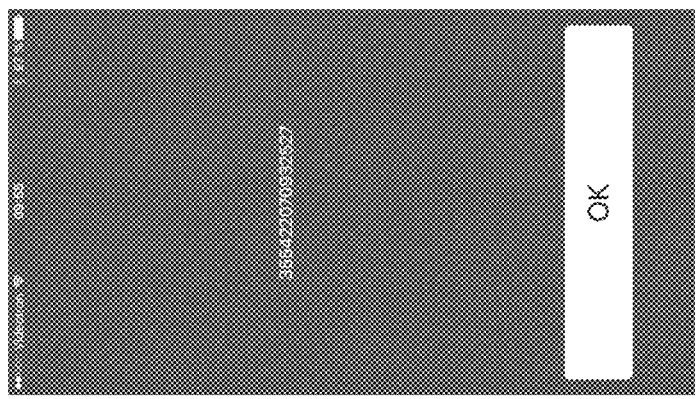
FIG. 33 shows an example trade device screen displaying an IMEI, according to some embodiments.

Further aspects of the trade device can be detected using the second device. In some embodiments, the client is prompted to dial *#06# on a first device such as a cell phone which in most cases causes the cellular phone to display the IMEI and, using another camera connected to the second device, computer code on said second device is capable of reading the IMEI displayed on the trade device, using optical character reading (OCR) technologies, which allows the second device to identify the manufacturer and model of the trade device by using an IMEI identifier functions or database which can retrieve such information from an IMEI. FIG. 33 shows an example trade device displaying an IMEI. Subsequently, using techniques described herein, one or more of the app, kiosk and central servers operate to provide an estimated offer price for the trade device based on various conditions including information acquired by the app regarding the trade device. After displaying the estimated price, the kiosk may ask the client for an email or phone number to follow-up with additional instructions, for example an email or text message that includes link to download the app. The email may contain additional information, for instance a special promotion code that could lock the price offered for certain amount of time.

Alternatively, the client may be prompted to dial *#06# on a cellular phone (trade device) which in most cases causes the cellular phone to display the IMEI and thereafter the client may be prompted to take a screenshot when the IMEI is displayed. The app running on the second device can then request access to the client's picture and look in the last pictures taken to look for a picture containing an IMEI displayed. In order to do so, the app may have various models to compare the screenshot with in order to identify a screenshot that has an IMEI. For example, on an iPhone 6s the IMEI is displayed in an area beginning approximately at coordinates (210,520) within a rectangle of approximate dimension of 330×50. The app can also look at other screenshot features, for example the existence of the battery logo or the OK button.

At operation 1706, client information may be entered into the app. The client information may include client name, address, and other identifying information. In some embodiments, the client information acquired by the app may include images of the identification card, driving license, etc. of the client.

At operation 1708, an estimated amount is determined for the trade device. The estimated amount, at this stage, is determined based on the information currently acquired by the app. In some embodiments, the pricing information can be obtained from a pricing server. The pricing server and app interaction may operate in a manner similar to that described below in relation to process 1800.

At operation 1710, the client arrives at the kiosk. The information regarding the trade device acquired by the second device may be made accessible to the kiosk by either directly transferring the acquired data to the kiosk or transferring to a central server.

In certain example embodiments, when the second device having the app comes within communication range of the kiosk, the kiosk and/or the app automatically detects the nearby device and transfers information to the kiosk as necessary. Subsequent to a synchronization process the kiosk may request additional information via the app. When running the app, a button or the like displayed on the screen of the second device can be touched by the client to notify one or more of the app, a central server such as server 108 and/or the kiosk, that the second device is near or next to the kiosk so that the transfer of app acquired information to the kiosk can be initiated.

Alternatively, the app may include computer program code for automatically identifying if the client is near a kiosk. Methods for doing so may include one or more of:

detecting the presence of specific Wi-Fi networks known to be operated by kiosks, such as networks having SSID name beginning with or containing a recognizable (e.g., preconfigured in the app) string such as, for example, "BuyBack-Booth"; detecting the presence of a specific (e.g., name of the device being preconfigured in the app) Bluetooth device; detecting or confirming the presence or authenticity of a kiosk connected to a SSID by connecting to one or more SSID and trying a specific predetermined password; detecting or confirming the presence or authenticity of a kiosk connected to a SSID by a technique consisting of connecting to a specific IP address or port or service on a Wi-Fi network. For example, the presence or authenticity of a kiosk can be validated or confirmed by using the following operations: 1) connecting to the Wi-Fi network, 2) connecting to an IP address and port combination provided either by preconfiguration or dynamic determination, such as listening to specific service, using name service or other methods for identifying a service on a network, etc. 3) establishing a network connection with the IP address and port combination, and 4) performing a validation with the established connection.

The subsequent processing after the trade device is submitted to the kiosk and the information acquired by the second device is made available to the kiosk may proceed to perform diagnostic analysis of the trade device in the kiosk and, at least in some embodiments, using the app on the trade device. The diagnostic processing in the kiosk and/or by the app on the trade device may be complementary to the acquired information received from the second device. For example, the kiosk may control its imaging of the trade device to only acquire images of parts or views of the trade device that have not been already acquired by the second device. Also, if the information acquired by the second device includes audio output from the trade device, audio for such aspects (e.g., certain predetermined audio sequences requested for playback from the trade device) may also not be obtained by the kiosk or app on the trade device.

In some embodiments, based upon the image and/or audio information acquired by the second device, the central server may provide an estimated payout offer, that may be displayed to the client on the second device. In these embodiments, the central server may keep track of the estimated offer in association with a unique identifier for the trade device (e.g., the IMEI which may be acquired by image analysis). Subsequently, when the client submits the trade device to a kiosk, the offered payout after the complete diagnostic analysis in the kiosk may also take into amount the estimated payout offer which can be located based upon the unique identifier.

Many of the above techniques for transferring acquired information about the trade device to a central server and/or kiosk and techniques for identifying whether the client is in proximity to a kiosk may be used either by the trade device running the app as described in relation to process 1800 below or by the second mobile device running the app.

The app when run on the second device is useful for acquiring photographs and capturing audio output of the trade device. When run on the trade device, the app may acquire diagnostic information covering a substantially larger portion of the functions and features of the trade device.

Figure 34:
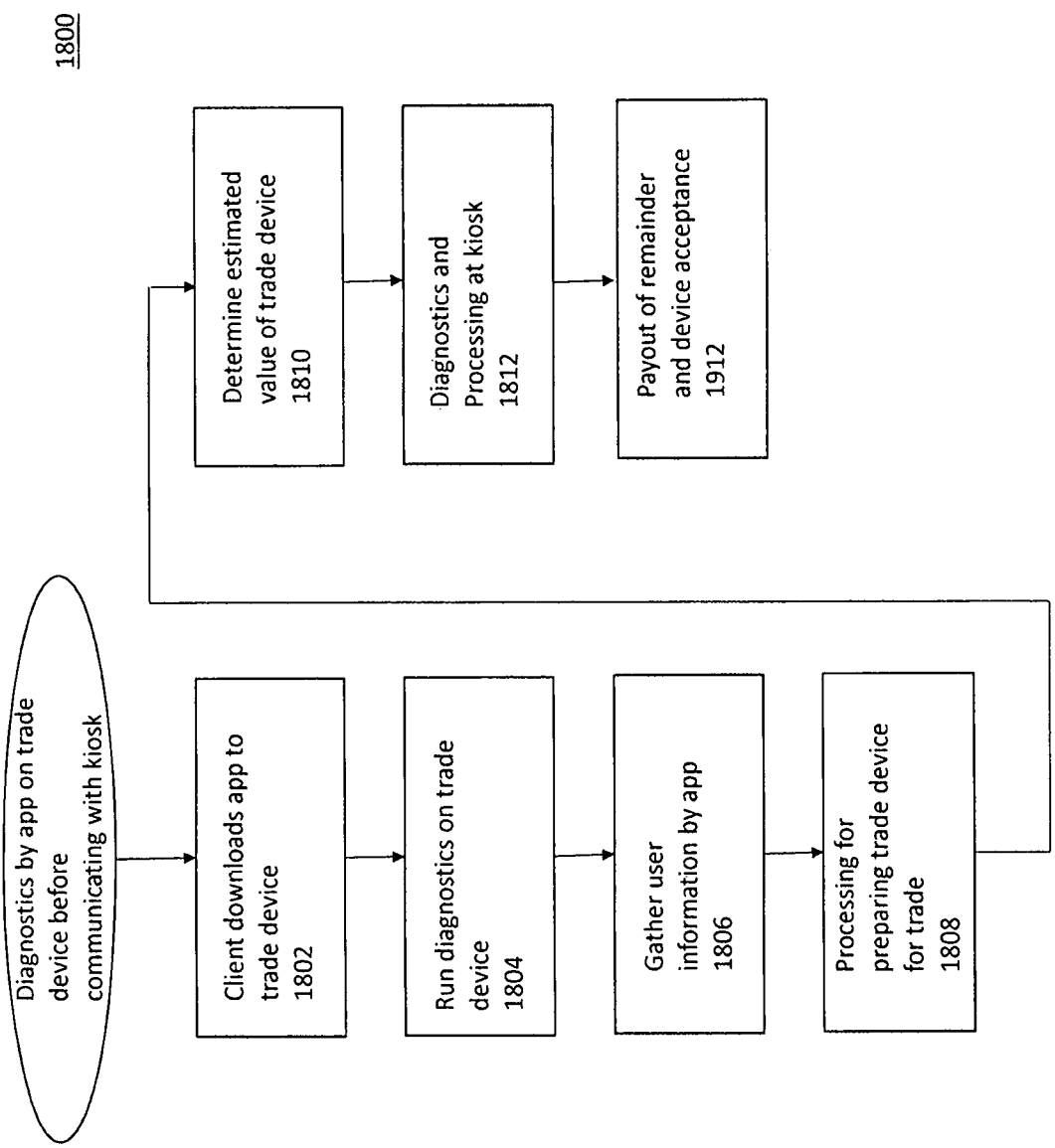
FIG. 34 illustrates a flowchart for a process in which the client runs the kiosk app on a trade device before he/she is near a kiosk, according to some embodiments.

FIG. 34 illustrates a flowchart for process 1800 in which the client runs the kiosk app on a trade device before he/she is near a kiosk. Although operations of process 1800 are shown in a particular order, it is understood that some embodiments may eliminate one or more operations, add one or more operations, and/or change the ordering of some operations.

At operation 1802 the client downloads the app to the trade device from an app store or other network resource.

At operation 1804 the client starts the app on the trade device.

Upon startup, in some embodiments, the app may ask for a promotion code or QR code that the client may have previously received. FIG. 35 illustrates a screen for acquiring a promotion code or QR code from the client. The promotion code and/or QR code may be used, among other things, in determining the offer price for the client, determining a fundraising campaign for the client, etc.

The app may have functions to analyze from a camera a QR or barcode or other computer recognizable symbols, including through optical character recognition (OCR), that enable a client interacting with the app to scan a recognizable identifier located, for instance, on a piece of paper or on a computer screen. In an embodiment of the invention, a client can type in a code that acts as a recognizable identifier, for instance when a camera is broken or other valuable reason.

The recognizable identifier can be used for a variety of purposes. For instance, the recognizable identifier can link the app with a referral program. A referral program could be, for example, a cellular store inciting its customers to use the system for recycling electronic devices, or, a brand ambassador promoting the recycling of electronic devices through the automated kiosk. These referring persons or stores have a data entity associated with their unique code in one of the system's database. This data entity may have been created from data entered by network operator personnel or through an automated online process and typically contains information to identify a person or store, including name, address, email or other means to relate to the person as well as a code that can be associated to or be a copy of the recognizable identifier.

In an embodiment, a referring person could help or guide the client for installing the app and scan a recognizable identifier which automatically links the electronic device being analyzed to the store or the referring person (such as a cellular store staff member or a brand ambassador or similar person). The information linking the app or the electronic device ID (such as MAC address) to the store or person is sent to a remote server or database for further processing.

In an embodiment, the linking information may be treated in a way to retrieve business intelligence to assess the performance of stores and or persons (cell phone store staff, ambassador or other) in the referral program.

In another series of embodiments of the invention, the app uses similar or the same functions to access a recognizable identifier that uniquely identify a specific kiosk.

The app may then determine whether it is to operate in a mode for providing a quick estimate without a kiosk, or whether the client is at a kiosk. FIG. 36 illustrates a screen providing for the user to select between the two options.

If the client indicates that the client is at a kiosk, the app operates in the mode in which it is tandem with the kiosk, as described in relation to process 800 above. Otherwise, the processing may progress as follows to perform at least some diagnostics before the trade device communicates with a kiosk.

In an example embodiment, one or more functions are applied to system logs of the trade device to detect errors or malfunctions of certain components, enabling the app to detect failures of certain features without the need to perform advanced tests. For example, a function can be used to retrieve from the logs specific error messages pertaining to network failures that could indicate a failure of the Wi-Fi components. Likewise, logs may yield information about memory defects, processor defects, radio defects and/or various port defects, for example, based upon log entries generated during boot-up diagnostics of the mobile device.

In some embodiments, some features and functionalities of the trade device are evaluated by assessing recent log files from different applications making use of such features. For example, it is possible to identify from log files of the "gallery" or "camera" applications whether a camera has been used successfully recently. In a similar manner, the functioning of the GPS device may be determinable from a log of a navigation application on the trade device, a game application in the trade device may log accelerometer and/or touchscreen functioning, etc.

The app may be configured to, through the use of diagnostic functions capable of identifying through operating system or library calls, or by analyzing information located inside the electronic device, such as stored in read only memory (ROM), on solid state storage (SSS) memory or other memory, or through analysis of system logs, or by analyzing IMEI, or by analyzing machine ID, or manufacturer models, a series of information about the electronic devices it runs on. For example, using the above, an app could determine the manufacturer, model, memory size, storage size, speed, carrier lock, enabled functions, screen size, screen resolution, as well as the state of a series of functionalities diagnostics, for instance, capable of diagnosing the working state (e.g., working, not working, working with a particular defect etc.) of such features.

Figure 38:
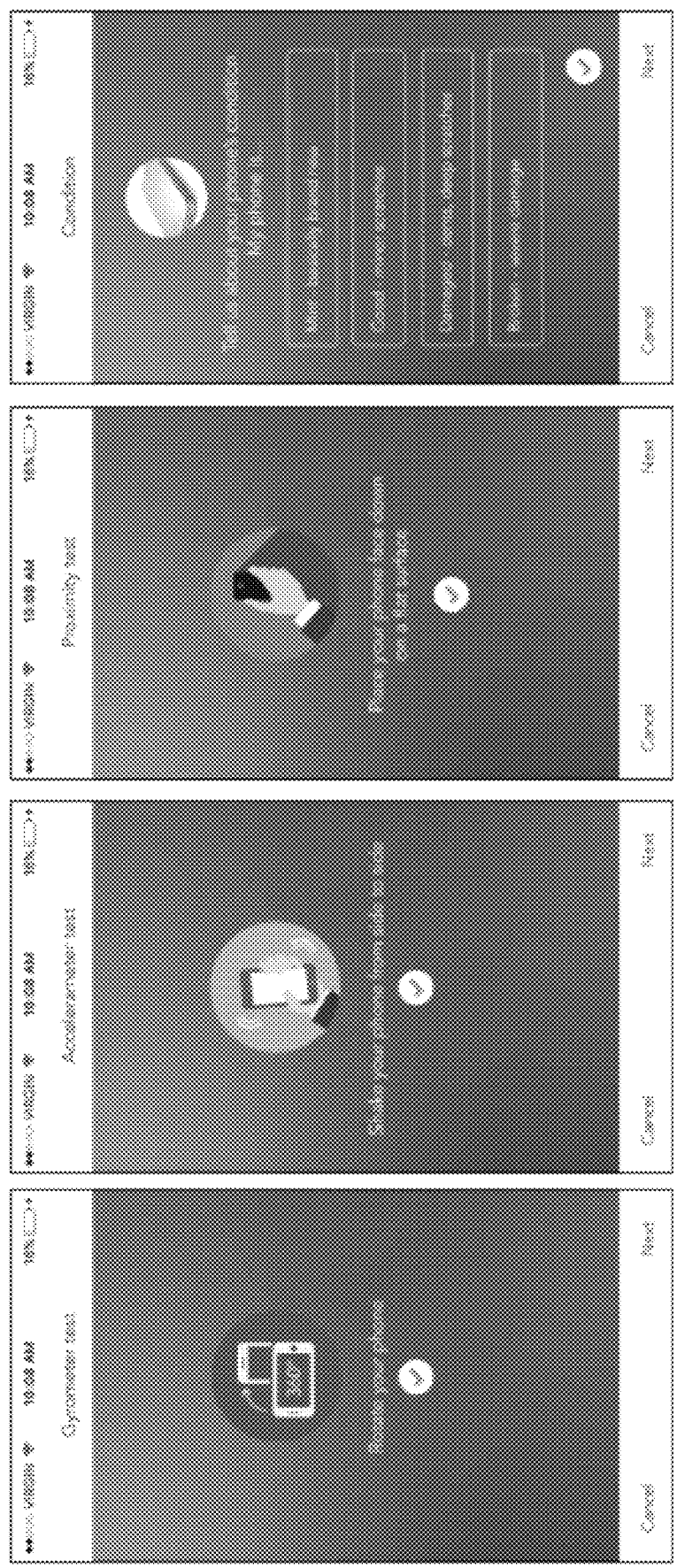
FIG. 38 shows screens for guiding the client through testing the gyroscope, accelerometer, and GPS receiver, and a screen by which the client indicates a condition of the trade device, according to some embodiments.
Figure 39:
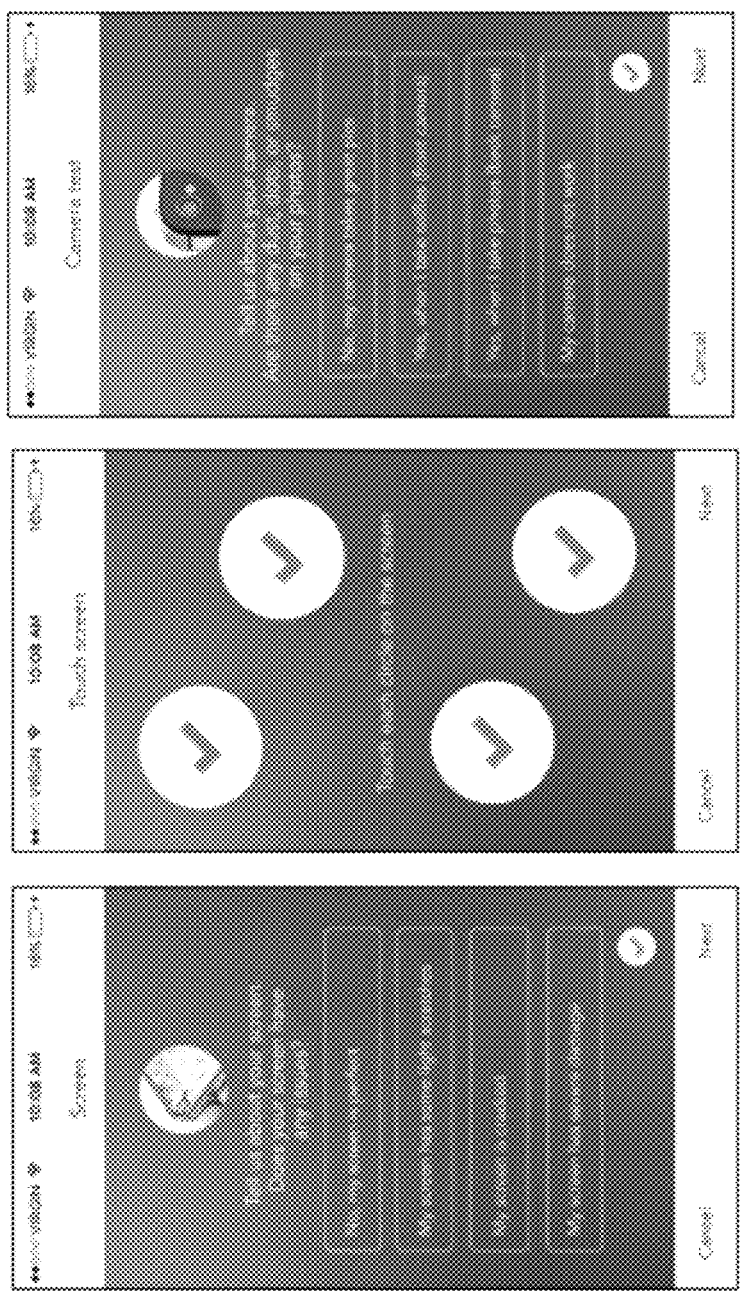
FIG. 39 illustrates screens for guiding the client through testing the touch screen and a screen for the client to indicate the condition of the screen, according to some embodiments.

Some features and the functional state or level of functionality of some features are sometime diagnosed with the help of the client. For example, control buttons (home, volume, silence or other buttons) and the touch screen. To test such features, the client may be instructed to follow certain steps in order to execute certain actions for diagnosing of any one of these features, for example, touching the home button, touching a volume button, touching certain areas of the screen, etc. When such diagnosis requires client action, the client is presented with a series of instructions on screen to follow until completion, as well as a method for notifying the app that a certain function may not work. For example, to test the volume up and down button, the client could be instructed to press the up button, and, when the signal of the up button is received by the app, a checkmark or other recognizable way to communicate that the test was successful may be presented to the client. The client can also be presented with a "volume up" not working button so that the client can select through the touch-screen an indication to the app that the volume up button is not working. FIG. 37, FIG. 38 and FIG. 39 show example screens used to guide the client in assisting with the testing of the trade device.

In certain example embodiments, specific features meaningful only to specific devices may trigger certain user pages or widgets to be displayed to the client. For example, if the app running on the trade device detected an iPhone 6 with 3D touch feature, it may present the client with additional tests for validating that the 3D touch feature is working and, as described above, a way for the client to notify the app that the 3D touch feature is not working. Alternatively, features not available on certain models are not presented for test by the client. The app may be configured with the information in a database (e.g., a database at the kiosk or at a central server 108/110) as to which features are available on which models, either, for example through static tables, but preferably through SQL or non-structured database, including for example JSON files.

Some features of the mobile device may be automatically or partly automatically diagnosed by custom instructions code or functions in the app that validate the working state of, for example, the WiFi connectivity, GPS capability, accelerometer capability, etc. For example, to detect that the WiFi connectivity is working, the app may scan the available SSID and try to connect to the available SSID. Even without credentials to an SSID, the state of the WiFi connectivity should be quite reliable by establishing connection and querying the host network and receiving valid responses.

For testing GPS capability, the app may work in conjunction with a kiosk of which the location is known and, for instance, by requesting the current location of the device while being analyzed inside the kiosk, compare the values to determine that the device is working properly and within predetermined tolerances. Additionally, some embodiments may request GPS coordinates at different time intervals during the lengthy examination process and compare the values for exactness and tolerance.

A similar method for testing the accelerometer may be applied by common work of the kiosk and the app. In such embodiment, the accelerometer is queried as the device is moved inside the kiosk by means of motorized movement, for example, as the device is moved within the device examination chamber.

The audio capabilities of an electronic device (the microphone and speaker) may be diagnosed by combined usage such as playing a specific audio signal through the speakers and analyzing whether or not the received microphone signal is similar, accepting certain level of ambient noise. For example, an audio sweep from 5 Hz to 20 000 Hz can be used for such diagnostic, the audio sweep is played and using a microphone recorded to be compared either immediately or afterward and compared with expected results for said examined model or with a generic model (less precise). To test the microphone, the audio source may be the speaker of the device itself or another speaker controlled by either the app or the kiosk. By using another audio speaker than the examined device, it is possible to distinguish if the microphone is failing versus the examined device's speaker. Likewise, to test the speaker, a microphone controlled by the kiosk or the app can be used to generate a sweep.

Some embodiments, may perform one or more of the actions described above in relation to the camera of the second device, by using one of the external facing cameras of the kiosk. For example, if certain information is determined to be incomplete in the information received by the kiosk (e.g., from the app running on the trade device or the second device, and/or from servers 108) when the client arrives at the kiosk, the kiosk may instruct the client to place the trade device such that an image is captured of the trade device, and at least some of the preparatory actions described above are performed before the detailed examination of the device by the kiosk.

FIG. 37 show the client being guided through testing various buttons and ports. FIG. 38 shows the client being guided through testing the gyroscope, accelerometer, and GPS receiver. FIG. 38 also shows a screen by which the client indicates a condition of the trade device. FIG. 39 illustrates screens for guiding the client through testing the touch screen and a screen for the client to indicate the condition of the screen.

As in most industries, electronic devices such as cellular/mobile devices are subject to counterfeit. These counterfeit devices are sometime very well done and designed and it is almost impossible to properly identify a counterfeit device versus an original device through one or more of a visual inspection, including high resolution cameras, computer vision and artificial intelligence mechanisms. Well done counterfeit systems may even mimic the electronics so that attributes such as make, model, IMEI and other information that would allow an app to properly identify an original electronic device cannot be reliable methods for distinguishing between an original or counterfeit device.

Some example embodiments provide techniques for detecting such counterfeits. In an embodiment, the app includes means to perform certain performance tests such as, evaluating the processing performances (i.e. MIPS or BogoMIPS), evaluating the display performances (analyzing refresh rate, analyzing performance of data transfer to the graphic processing functions, etc.), and evaluating camera megapixel.

Such apps can then store said performance test results for further association by the app, the kiosk or a server as additional attributes (performance attributes), so that functions can be applied to compare said performance attributes with expected similar performance attributes of an original equipment.

For example, in an example embodiment, an app could determine the processing performance of a device by running performance evaluation function CalculateDeviceMIPS( ) which returns a performance metric of lambda MIPS, the app then preferably sends this information as a performance attribute for the kiosk or a server on the network to evaluate against known performance metric of an original equipment. If the performance metrics differ substantially, the electronic device is considered a counterfeit device and is rejected or its price adjusted accordingly.

In another embodiment, the network of kiosks learns automatically from performance metrics each time an electronic device is evaluated. In such embodiment, all accepted electronic device performances are accepted in the average calculation of performance for the equivalent model of said electronic device.

Some embodiment of the invention may use web technologies to determine devices attributes and/or performance metrics for use in counterfeit detection. In an example embodiment, a "user agent" of a browser on the trade device may be used to identify the model name and other aspects. Then, at the kiosk or the central server, the model information can be retrieved in the user agent information sent by the browser. With this retrieved information, the system can assess a value of the device when the user connects to the Wifi network. In some embodiments, the software on the router may be programmed so that a likely value for the trade device identified with the user agent information is displayed through the captive portal web server. To achieve this, the captive portal software may be configured to connect with a price database located on the network.

In another embodiment, a Javascript or other computer code may be sent for execution on the trade device for executing code that is capable of measuring the time elapsed between at least one series of instructions and comparing the time elapsed of said at least one series of instruction to results stored such as in a database for the expected model. For example, a database may include a table storing the expected completion times for each of a plurality of tests for each several models. The expected completed times may be specified as an average time or time range. Each series of instructions can be set to test specific functions, such as concatenating large number of words into strings, or sorting through lists, or performing series of floating point instructions, or, the series of instructions could be a mixture of such, or similar instructions.

In such embodiments, the central server or kiosk compares the actual trade device results with the expected results according to known information and determine, possibly using tolerance information, whether or not a trade device performance corresponds to the reported or identified model of the trade device performance. Benchmark tests may provide for differentiating between the different models of a same device, for example in Canada a certain phone comes with a quad core processor but in the USA it's an Octa Core. By doing calculation test we could be able to tell which processor it is.

In another embodiment, an external camera may be used to observe the trade device responses which may be useful in graphic manipulation tests. Results of observations are then either communicated to the central server or compared with data available locally for analysis and comparison like described above. As an example in such embodiment, a trade device could be required to perform a series of instructions, such as: draw a white screen; draw a said number of polygons, for example 200, of different colors; and draw a black screen. The camera of the kiosk, external to the trade device, may then begin observing starting at the white screen signal up until the black screen is detected. It may observe time, or graphical information.

At operation 1806, user information is gathered by the app running on the trade device.

In order to speed up the transaction at the kiosk, the client may validate client identity prior to arriving at the kiosk. The app may request the client to take at least one picture, preferably using the back camera of the trade device, of a photo-ID card and a second picture, preferably using the front camera of the trade device, for taking a "selfie" so that the app can send to a facial recognition server preferably accessible on a network such as the internet can validate the client identity in advance. In order to do so, the facial recognition server uses facial recognition technologies, and can confirm the resemblance between the photo ID card and the selfie previously taken. Upon successful recognition of the photo ID and the selfie picture, the facial recognition server may either store locally information about the legitimacy of this potential transaction, or send such information, preferably in an encrypted form, on the app. Such information contains, either in a computer data structure or by use of related information, at least date information, electronic device information such as the IMEI, serial number or other uniquely identifiable recognizer of the electronic device. Once the client has successfully identified himself with the steps described herein, any kiosk on the network is now capable, by communicating either with the app or with the facial recognition server or another database containing said information to accelerate the validation process. In an example embodiment of this, a client having completed the pre-identification steps goes to a kiosk located nearby, identify the kiosk with a QR code as described herein, the kiosk and the app now knowing that they are in communication, the app notifying the kiosk or a server on the network that it has pre-identification information and sends a reference, such as the IMEI, for the kiosk or a server to further assess that the pre-identification information has indeed been completed.

Identity validation may be desired in order to prevent fraud. In an embodiment, the facial recognition server also has QR and OCR capabilities for comparing and validating that (1) the person is the same on the card and on the selfie and (2) the data is valid, such as validating the address written and possibly encoded as part of a QR code, as seen on most American driver licenses.

In another embodiment, the validity of the client (i.e., that the client is indeed the authorized owner of the trade device) is validated by the app as it detects in a first step that the trade device, such as a smartphone, is in iCloud lock for iPhones (or equivalent for other device) and, after demanding the client to unlock its device, the app detects in a second step that the device has indeed been iCloud unlocked by the client, thus, the system may now safely assume that the person is the owner of the device as it knows its password. The system can make this assumption because it relies upon iCloud authentication to authenticate the client.

In some example embodiments, the pre-identification process helps reducing the risk factor related to phone ownership because the time between the pre-examination and pre-identification process is lengthy enough to allow the legitimate owner of the electronic device to notify and register its IMEI as stolen in a national database. As an example of such embodiment, a client downloads, installs and executes the app on the first day, and further execute sufficient steps so that the system has a minimum of client identity, such as a photo-ID or a selfie picture, the system may request a delay before visiting the kiosk in order to reduce potential fraud, for example, the system may request the client to wait three days, after expiration of the delay, the system through the app then notifies the client that he may go at a kiosk for completing the transaction.

In some embodiments, identity confirmation is made by the use of a third party online identity management, such as http://www.miicard.com/, PayPal or other such online service. In this embodiment, the app is capable of communicating with a third party service, for instance using web services or other sort of preferably encrypted communications so that the third party service, after having confirmed the identity of a client using their own internal process, confirms to the app that the client identity is validated. Typical third party applications use reliable methods to ensure that an online client is a legitimate client, for instance, by ensuring that his account has a link to a valid banking account, credit card, verified driving license or other generally recognized method for reliably assuring that a client is a unique and real and identifiable person.

In an alternate embodiment, identity confirmation is made by communications between the network servers and the third party application which, likewise, returns confirmation of identity.

In another alternate embodiment, the secure validation of a client's identity through a known secure method, such as linking an account to a banking account, is made directly by one of the network's servers. In this embodiment, a client may, for instance, take a photograph of a "blank check" (also known as void check) and, for example using OCR technology, the application or a network's server identifies the client banking account number. Alternatively, the client may be requested to enter banking account number information from his application. With this information, it is possible to validate that the client has access to said banking account, such as by depositing at least one small amount of money in the account and asking the client to confirm the amount deposited, similarly to methods used for instance when creating a PayPal account.

An alternate embodiment of the invention validates the client identity by asking the client to transfer a relatively small amount of money, which can be as low as 0.01$, through an online money transfer service, to an email account own and recognizable by the network. Upon receiving the email from the online money transfer service, such as payments.interac.ca, the network now has a certain level of confidence that the client is a real and unique person. To achieve better level of confidence, the network may require the password or passcode selected by the client in order to complete the online money transfer and keep a trace in the banking system that the transaction occurred between the network and the client.

At operation 1808 other actions to prepare the trade device for the trade may be performed by the app.

As also mentioned above, minimizing the time at the kiosk is generally preferred by clients. In some embodiments, the app may propose a sequence of actions by which the client may speed up the transaction to be completed at the kiosk. An example of such embodiment would be a button on the application providing steps for "Preparing for transaction", the steps can comprise a series of functions such as validating client identity, preparing the trade device for backup, automating backup of the trade device, and erasing sensitive information.

Preparing the trade device for backup is another action that may be taken by the client prior to arriving at a kiosk. The app provides instructions to the client for making a copy of all information contained on the electronic device or, the app can be coded in such way that, if proper access is granted by the operating system and the client, it could create the backup automatically.

The client may also automate backup of the trade device in order to speed up the transaction at the kiosk. The app code may provide means to initiate a cloud backup (i.e., backing up data to a location in the cloud) of all relevant information for the client to later retrieve, said relevant information may include one or more of contacts, calendar information, email messages, pictures, etc.

The client may erase sensitive information before arriving at the kiosk, in order to speedup the transaction at the kiosk. Once the backup is performed, the app can propose ways to erase any sensitive information contained on the electronic device, or propose the client to do it, given proper operating system and client access.

At operation 1810 an estimate of the value of the trade device is obtained.

Some clients may desire to have a rough estimate as to the value of a trade device before deciding whether to go to a kiosk. Thus, in some embodiments, a client seeking to trade a smartphone may first access a database for a pre-evaluation by using a web page operated by a server, such as server 108, on the network. The web page can present choices to the clients similar to web sites operated, for example, by existing services such as Orchard Labs Inc. (https://www.getorchard.com/), which allow the client to select the model of its smartphone to be traded (trade device) and select among a plurality of attributes in order to get a pre-evaluation. Based on this pre-evaluation data, the web page can, in contrast to conventional services, provide information for guiding the client toward the nearest kiosk for dropping, final evaluation and payment. Also, the web site can provide a "lock in" mechanism so that the network remembers the price offered and guarantee such price for a certain time. For example, after accessing a web site hosted by servers 108 for pre-evaluation and accepting an offered price, the server 108 may associated a unique identifier with the trade device and offered price and conditions. The unique identifier may be some identifier such as an IMEI or serial number that the server 108 can determine from the trade device without the client's manual entry of such an identifier, a system-generated QR code or other unique identifier. Subsequently, when the client accesses a kiosk and the trade device information becomes known to the servers 108 in relation to the kiosk and/or app running on the trade device, servers 108 can associate the previous record based upon the unique identifier. Being able to associate the trade device at the kiosk with its pre-evaluation, enables the system to be consistent with any guaranteed prices provided during the pre-evaluation.

Some embodiments may include a pricing server. For example, a pricing server may operate as one or more of servers 108. The pricing server (and/or a database) stores information and prices for a plurality of electronic devices, classified in various ways, such information likely containing at least one but preferably a plurality of device attributes, such as model, make, carrier lock and others and health attributes such as screen condition, button conditions, and others as described herein.

The pricing server or database may be structured in a way to be capable of retrieving a list of prices based, for example, on a plurality of buyer's conditions and device conditions. Each buyer may have its own business logic configured for considering electronic devices. For example: buyer "ABC Cell Store" may define a broken device has "a device not powering on"; buyer "DEF Cell Trade" may define a broken device has "a device not powering on" or "a "device having at least 2 major defects", such as "missing button", "broken screen", "broken microphone", "broken GPS"; and buyer "GHI Recycling" may define a broken device has a "device incapable of making a phone call".

Consequently, buyers may have different or non-matching conditions. For example, "ABC Cell Store" define a "mint condition" device has a device having "0 scratch", must have "all features working. "DEF Cell Trade" may not define "mint condition" but instead define an "excellent condition" and define such device has having "at most 1 minor scratch" and must have "all features working".

The pricing server and/or the app are capable of modeling each attributes into each possible business logic rules established for each buyer in order to provide the best possible price for each examined electronic device that corresponds to each buyer's modeling of device conditions.

In order to do so, some embodiments include means consisting of computer instructions and computer models that are capable to: describe and categorize a plurality of devices into at least one "attribute" so that for example model number "A1633", "A1688", etc. all refer to "iPhone 6s 64 GB"; describe a plurality of additional "attributes", some of which may be considered positive attributes, such as "Device is working", "GPS is working", "WiFi is working", "microphone is working", "speaker is working", "buttons are working". Alternatively capable of considering negative attributes, such as: "Screen is cracked", "button is missing", "device is locked to carrier X", "phone is remotely locked" (such as iCloud lock), "device is water damaged", "device has missing camera", "device has broken camera", "device has missing battery", "device has missing SIM tray", "device has damaged connectivity ports".

Aggregate attributes into "meta descriptions" consistent with the business logics established for each buyer taking into consideration at least one attribute for determining a device condition. The pricing server may be capable, based on at least one attribute, to retrieve the best possible price for an electronic device corresponding to the at least one attribute.

The pricing server and/or the app are capable of applying business rules to further modify how the offered price varies from the market price in order to create sustainable margins based on a variety of factors, such as risks, expected short term variations in price, expected profit or other considerations. For example, business rules may be based on calculations that includes dynamic variables such as: "base_markup_%", "risk_markup_for_model_%", "risk_markup_for_buyer_%", "risk_markup_for_area_%", "transportation_fee_from_area_$", "transportation_fee_for_partner", "shipping_cost_to_buyer_$", "seasonality" or "seasonality_for_area" (in % or $), (or equivalent margin based variables). In this example, the offered price could be calculated as a function of (base_markup_%+risk_markup_for_model_%+risk_markup_for_area_%) so that if the selling price of a device on a market (for example an iPhone 6s in good condition) is 100$, and the base markup demanded is 20%, and the risk markup for the model (for instance because there are many unidentified stolen iPhone 6s) is set to 25%, and the risk markup for an area is set at −10% (because an area is considered with a low crime-rate), a potential formula for establishing the offered price is shown FIG. 40.

The offered price may be modified according to business rules that are applied either dynamically as requests are processed, or statically stored in a database. Dynamic considerations that may cause the offer price to increase or decrease may include the number of units of similar type of electronic devices being collected over a specified time period by a particular kiosk or a group (e.g., geographical) of kiosks, how many electronic devices have been collected by a particular kiosk or group of kiosks, an amount of money available for payout in the kiosk, etc.

The price logic may be rounded up or down by computer code on the network according to the smallest denominator of cash bills available on a kiosk, for instance rounded down to 5$, or rounded down to 5$ if delta is less than 1$, rounded up otherwise.

Figure 41:
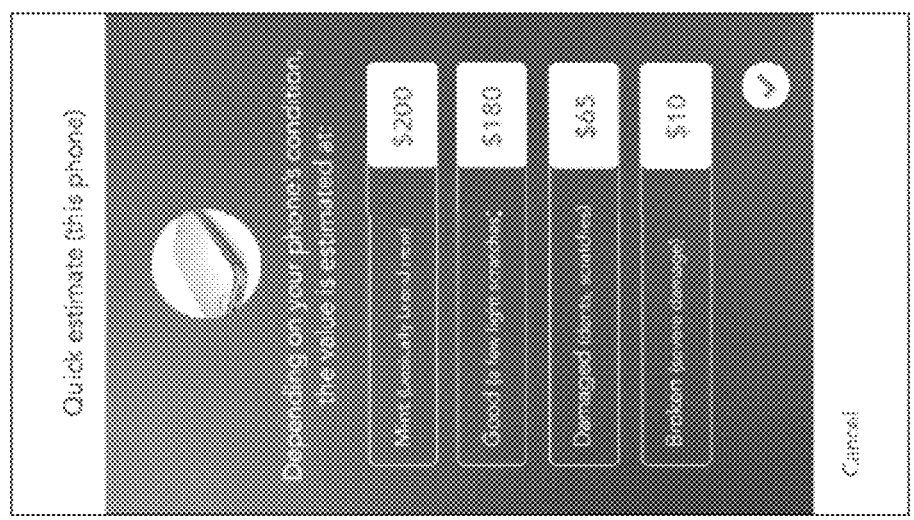
FIG. 41 shows a screen for presenting multiple prices corresponding to various conditions, according to some embodiments.

In an embodiment, multiple offers are presented to the client for instance based on characteristics that cannot be evaluated by the app, such as for example the presence of a cracked screen or other damages. In such embodiment, the prices presented may for instance be displayed according to at least 2 different conditions (mint, good, poor, broken). The display of the app when displaying such pricing is shown, for example, in such as explained by FIG. 41. Pricing with multiple conditional offers may also be displayed if the client elects to get a quick estimate without spending the time to complete the assistive diagnostics discussed above.

In an embodiment of the app the offered price is affected as the system detects new defects over time. For instance, if an offer was made but not accepted, and a functionality subsequently is found to be defective, the app can proactively upon automatic detection either through functions or log analysis reassess the new condition of the device and provide a revised offer for the device through notification systems or SMS or email or other means of electronically contacting the client.

In some example embodiments, a client may get a quick estimation of the market value of the trade device by presenting the trade device to at least one camera of the kiosk or from a camera of another electronic device, such as a second mobile phone running the app. In a manner similar to the techniques used by existing object recognition technologies including Google Cloud Vision or CamFind™, the kiosk software or the app software, using at least one picture of the trade device but preferably a series of pictures submitted to object detection algorithms such as provided for example by Open CV libraries, the app or other computer program having access to the one or more pictures tries to identify using various methods (some of which are described herein) the device within the detected object. Once a sufficient level of certainty concerning the device permits a positive evaluation, the client is provided with potential prices for such device either on the screen of the kiosk or on the screen of the electronic device running the app or computer code which may include detection and estimation software.

In some embodiments, the app running on the trade device can take self-assessment pictures by demanding the client to take pictures of the trade device through a mirror, in this case, mostly for defect detection, such as detecting a cracked screen by using the methods such as those described herein. All these aspects may be taken into consideration when providing the client with a quick estimation.

The app may provide a client an estimated offer or final offer for the trade device on which the app is running. In order to do so, the app with the help of the diagnostic information retrieved from the various diagnostic functions described herein communicate with at least one remote servers or databases having access to recent information on market value of devices for similar devices. This information may be classified, for instance by geographic location, in order to present prices according to the location of the client.

If one or more functionalities could not be verified due to an issue that is likely of a temporary nature (e.g., battery out of charge, client not allowing the diagnostic testing to complete), the system may present the client with one or more price options with details as to features yet to be verified and the impact of those features on the offer price. FIG. 42 illustrates an example of such a screen.

Figure 44:
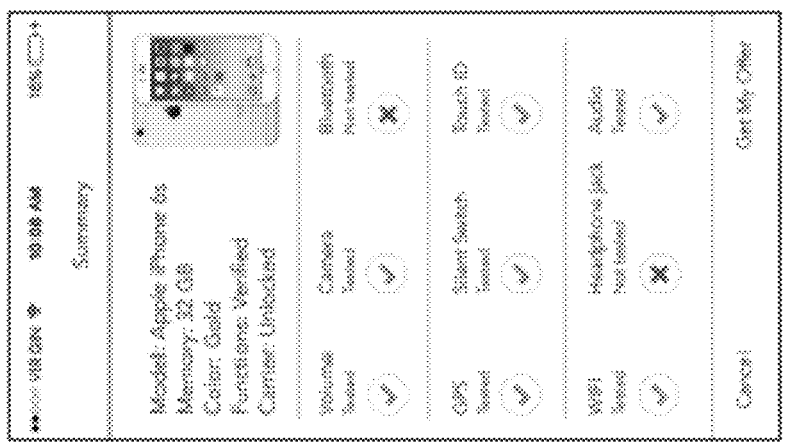
FIG. 44 illustrates a screen for specifying the at least some of the diagnostic tests performed and the status of each, according to some embodiments.
Figure 43:
FIG. 43 illustrates an example screen in which an offer is presented with a predetermined suit of tests having been completed, according to some embodiments.

FIG. 43 illustrates an example screen in which an offer is presented with a predetermined suit of tests having been completed. The client may also be provided one or more screens such as that shown, for example, in FIG. 44 specifying the at least some of the diagnostic tests performed and the status of each.

Figure 45:
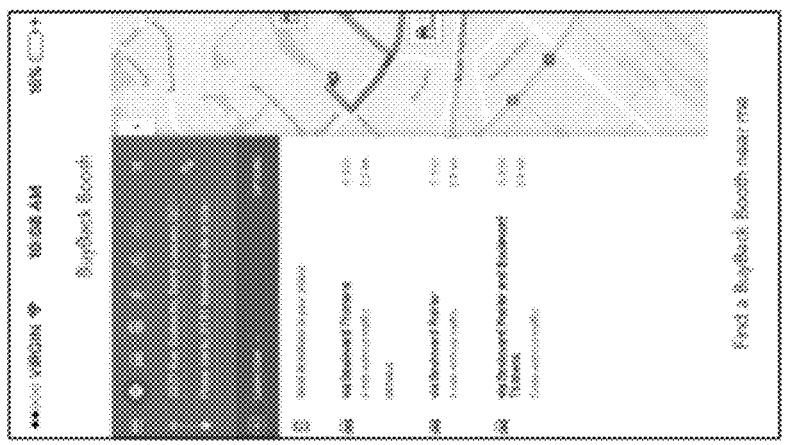
FIG. 45 shows nearby kiosks that can be used by the client for completing the trade, according to some embodiments.

The client may also be provided with access to a screen like, for example, FIG. 45 which shows the nearby kiosks that can be used by the client for completing the trade.

At operation 1812, the trade device communicates with the kiosk. The detection of a trade device coming nearby the kiosk, and the initial interaction between the kiosk and the trade device may be similar to that described above in relation to process 1700 and/or operation 1710 described in relation to the kiosk and the second portable electronic device running the app.

In some embodiments, the app running on the trade device or computer code on the kiosk may also perform defect detections to capture and identify potential attributes susceptible to affect the offered price, such as a cracked screen.

In some embodiments, a kiosk can interact with the app running on a trade device (or, in the embodiment of process 1700, the other device) by communicating with the app through a private network (subnet) provided, for example, by connecting the kiosk and the electronic device to a router that can provide WiFi access to that device. By using a private local network, such as, for example, 192.168.0.*, the kiosk is able to uniquely communicate with the app on a one on one basis. Because the kiosk knows the WiFi communications are only local (e.g., within feet of the kiosk), any device it communicates with on 192.168.0.* may be considered to be local. This causes problems when WiFi connection is unavailable or unwanted.

Certain example embodiments provide a solution to this problem of a WiFi connection being unwanted or unavailable. Having a recognizable identifier used to uniquely identify a kiosk in front or nearby the client provides such a solution. In this embodiment, a client can scan using the app a printed or on-screen QR, bar code, or alternatively enter a unique code displayed on screen or on the kiosk, (thereafter the unique location identifier). With this information, the network of kiosks can now reliably know that the app used by the client is communicating with the kiosk uniquely identified by the recognizable identifier. In order to do so, when the app scans or knows about the unique location identifier, it sends the unique location identifier alongside a unique identifier corresponding to itself, such as the IMEI, to a server through any available internet connection, including cellular data, and said server or a component on the network initiates a communication with a kiosk corresponding to the unique location identifier providing information in the communication so that the kiosk can start a transaction with the client, said information containing a unique identifier for the device, such as the IMEI. Upon verifying a unique identifier received from a kiosk or a trade device in association with the other of the kiosk or the trade device to reliably determine the association (e.g., presence in proximity, authenticity etc.), the central server may, in some embodiments, enable certain functions in the kiosk such as, for example, enabling opening of the door to receive the trade device into the kiosk, beginning evaluation of the device, performing certain selected evaluations of the device etc. Such functions may be disabled to the kiosk until enabling by the central server.

However, copies of the unique identifier, such as photographs taken or other means to copy the identifier could cause problems by malicious users wanting to disturb the network or a specific kiosk. By using the copied recognizable identifier, a malicious user could initiate fake communication with a kiosk causing erroneous behavior on one or more kiosks.

In an example embodiment, the recognizable identifier may be dynamically modified either by generating a new recognizable identifier displayed on screen for every session, or changing the recognizable identifier on a time basis. For example, a kiosk or its server or its database could create every minute a new recognizable identifier that would be displayed on screen for the app to recognize. As an example of this embodiment, a kiosk can encode with a function taking as argument the kiosk identifier on the network and as a second argument a time-based argument, possibly the number of minutes since a specific time in history. The encoding function would create with these two arguments alongside a private key a unique recognizable identifier that would be valid for a certain time only and understandable only by software components knowing the private key. The private key in the current invention provides an additional layer of security to avoid tampering but is not necessary.

In another series of embodiments, the recognizable identifier can modify the application behavior based on the type of code recognized, or other information associated with the recognizable identifier.

For instance, in an embodiment, a recognizable identifier can trigger specific functions for cell store staff when a cell store staff recognizable identifier is recognized, for example, providing advanced diagnostic or different price-list or multiple offers based on various external condition of the electronic device. For example, a cell store staff using its recognizable identifier would get four different offer prices, for example for mint, good, bad and broken condition (e.g., see FIG. 41). In this embodiment, the same application used without the recognizable identifier or an identifier not recognized to a cell store staff would only get one price, possibly the mint price condition.

In another embodiment, a recognizable identifier can give additional benefits, for example allowing the client to select or influence donations to third party charity or non-profit organizations. For instance, in an embodiment of the app, such as that described in relation to process 1900 below, a client using a recognizable identifier can be granted the benefit of planting an extra tree, or provide extra water, within one of the network's supported charity organizations.

In some embodiments, a QR code or other recognizable identifier for a kiosk with a camera is used to uniquely identify an electronic device it has communicated with, either directly or through the internet. An example of such embodiment includes sending a recognizable identifier displayable by the app on the electronic device display such as in the form of a QR code and having at least one camera taking at least one image of the said device display and analyzing for detecting the presence and information contained in the displayed code. From that point, the kiosk may be certain that the device being examined is the device wherein the app is being executed and, for instance, where some attributes of the electronic device were analyzed and communicated.

In some embodiments, the kiosk can scan using one of its camera a recognizable identifier that is showed on the trade device. Alternatively, instead of scanning, a user may be demanded to enter a code in lieu of a unique identifier, such code being first displayed on the first device (the kiosk or trade device) and entered on the other device. With this information, the network of kiosks can now reliably associate that the two devices (the kiosk and the trade device) are being operated at a known location know that the application used by said user is communicating with the kiosk uniquely identified by the recognizable identifier, or vice-versa. In an embodiment, when the application or kiosk scans or knows about the unique location identifier, it sends the unique location identifier alongside a unique identifier corresponding to itself, such as the IMEI or kiosk ID, to a server through any available internet connection, including cellular data, and said server or a component on the network can now associate the devices by matching the recognizable identifier and providing information to at least one of the devices so that the devices (the kiosk and the trade device) can now communicate together using any networking mechanisms, which may include WebSocket, http communication or any other network protocol, either using point to point communication or relayed communication, such as, for example, relayed by the server.

In some example embodiments, certain kiosks and/or the kiosk app may be configured to contribute to online communities. Such contributing may be, for example, for collaborating toward a goal of recycling, reusing and reducing carbon footprint related to disposal or renewal of electronic devices, such as cell phones and tablets. Each kiosk and/or a central server connected to the kiosks may, for example, have one or more social streams such as a Facebook page, a Twitter account, and other social media presence. Each kiosk, through computer code residing on it and on the central servers, may be operable such that certain events are caused to be published automatically to such social streams. For example, when a kiosk attains certain goals, when a satisfied customer completes a substantial transaction, or when a certain fundraising objective is met, when certain campaign targets are met (such as "We just planted our 100 000th tree!"), etc.

In some example embodiments, the kiosk and the app may cooperate to present the user with the opportunity to play games and/or participate in a campaign such as a fundraising campaign. The client may begin engaging in such a game or fundraising campaign, for example, primarily while waiting for the trade of the trade device to complete. For example, the game or campaign may be started by the kiosk and/or app at some point during the process 800 described above.

In some embodiments, the games and/or fundraising campaign may be a collaboration between the kiosk operator (e.g., operator of the kiosk network, or an independent operator of a kiosk) and a fundraising organization (e.g., non-government organization planting trees or providing water in developing countries). The kiosk may be configured to present the client with the option to participate in one or more fundraising campaigns and, if the client successfully completes the trade, contribute part of the trade's value to the client's selected fundraising campaign(s).

Figure 46:
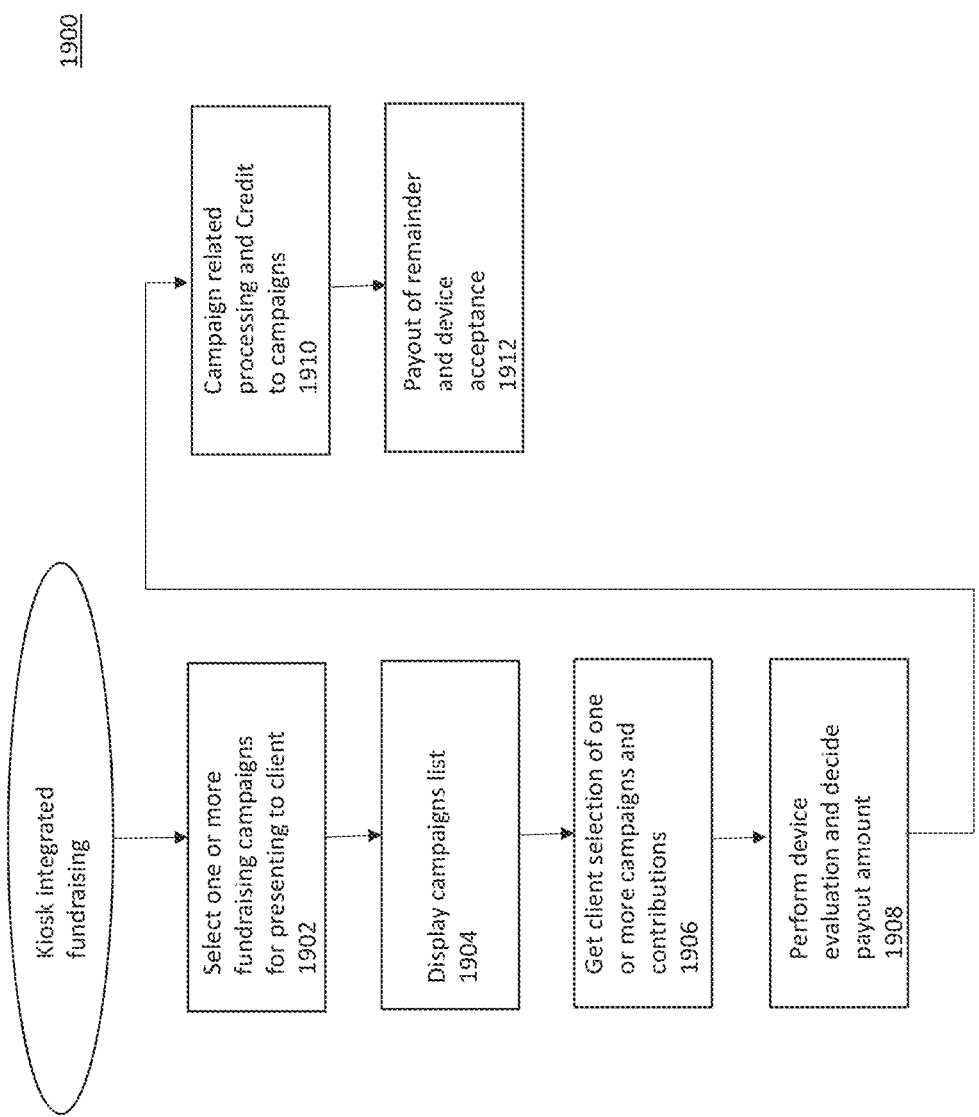
FIG. 46 is illustrates a flowchart for a process for enabling a client of a kiosk to participate in a fundraising campaign, according to some embodiments.

FIG. 46 illustrates a flowchart for a process 1900 for enabling a client of a kiosk to participate in a fundraising campaign. Although operations of process 1900 are shown in a particular order, it is understood that some embodiments may eliminate one or more operations, add one or more operations, and/or change the ordering of some operations.

At operation 1902, one or more campaigns are chosen from a plurality of campaigns stored in the system. One or more fundraising options from among a plurality of available options configured in a database (e.g., at a central server 108 or central database 110) may be selected for presentation to the client. The selection of options may be according to any scheme, for example, randomly selected, round robin, seasonal, or based on the geographic area match between the kiosk or mobile device and the particular fundraising option.

In some embodiments, a fundraising option may be selected for presentation based on characteristics including a characteristic of the client and/or trade device. For example, at least some of the fundraising options may be associated in the database with particular corporations that are known to be sponsoring or otherwise associated with them, and the kiosk and/or app may be configured to identify a manufacturer or other corporation associated with the trade device and/or corporation associated with the client. Then, one or more of the available fundraising options may be selected for presentation to the client based upon a comparing corporations associated in the database with the respective fundraising options with corporations determined to be associated with the trade device.

Other criteria such as the potential residual value of the trade device may also be used in selecting fundraising choices. For example, an early estimation of the trade device, determined based on a captured image of the device and/or client provided information, may be used to select fundraising options of a certain class. For example, a client with a trade with an estimated trade residual value higher than a first configurable amount may be presented with fundraising options with contribution amounts in a certain range.

Still other criteria such as geographic area and emplacement (e.g., located in a mall, university etc.) of the kiosk(s) can also be used in selecting fundraising choices. For example, in a fundraising for a flooding, kiosks in a particular geographic area may be configured to raise funds for the flooding. The kiosk may also be configurable to send messages to users corresponding to certain criteria, such as, for example, criteria for selecting certain kiosks of the network on which to launch the fundraising for the flooding.

In another series of embodiments of the invention, a recognizable identifier is related in the database to a fundraising activity and will enable the app to provide the client with specific questions about a potential donation to the fundraising activity. For example, a client scans a QR code (recognizable identifier) related to a college fundraising for an organized trip to Peru and the app then behaves according to rules set forward relating to that specific fundraising campaign.

Figure 47:
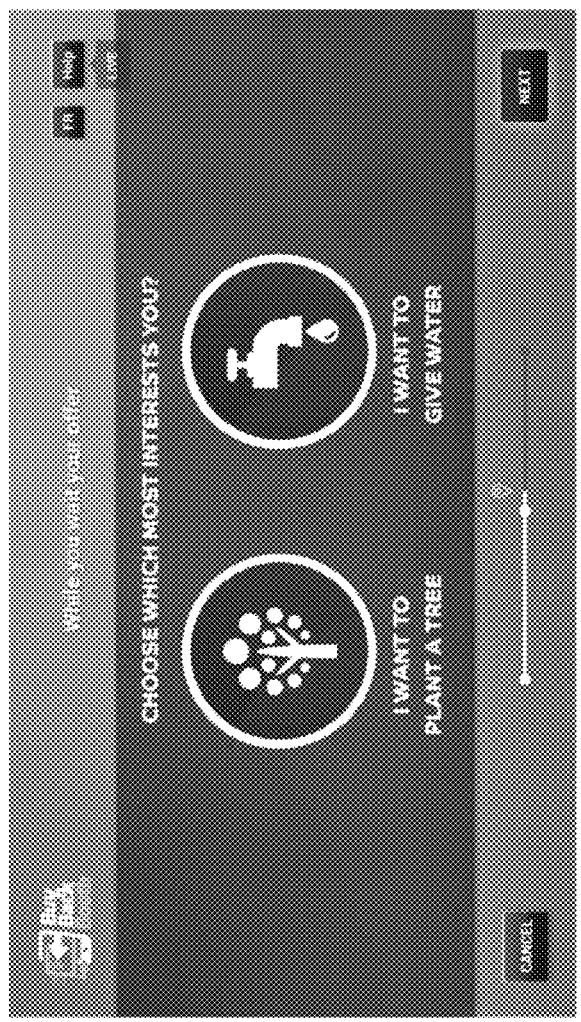
FIG. 47 is an example screen presenting a list of campaigns for selection by the client, according to some embodiments.

At operation 1904, the one or more campaigns are displayed on the kiosk so that the client can select to participate in one or more of he campaigns. The client may be presented with one or more fundraising option choices on the screen of the kiosk or on the display of the mobile device running the app at any time—preferably before the trade is completed. FIG. 47 is an example screen presenting a list of campaigns for selection by the client.

At operation 1906, the client selects one or more of the listed campaigns. An interface may also enable the client to specify a percentage of the amount of the payout, or a specified dollar amount that should be contributed to each of the selected campaigns.

At operation 1908, the evaluation of the portable electronic device may be performed as described in relation to processes 800, 1700 and 1800, and a payout amount accepted by the client.

At operation 1910, processing related to the campaign contributions is performed and the one or more campaigns selected by the client are credited the specified amounts based on the payout amount. Operation 1910 may occur, for example, after the diagnostic evaluation similar to process 800 and after operations similar to that described in relation to operation 864 where the client agreement is obtained to a payout amount.

The credited amounts to the campaigns may be affected by things other than the payout amount for the portable electronic device.

Social media integration allows a client to post his or her contribution information to one or more social networks. Some embodiments may automatically add a predetermined amount (for example, from an operator's account) to the user's contribution if the user posts contribution information to a certain number of social media contacts. In another embodiment, the user may be given an incentive for posting to his social networks. An example incentive may include planting a tree (in a tree planting fund raising campaign).

A link may be transmitted to the client's social media contacts such that the link contains a uniquely identifiable code such as a unique number or string in the URL, so that the network can identify each time when any of the user's contacts or others who have received the link clicks on the link. By counting the number of times a link has been accessed, the kiosk operator may offer an incentive to the client who originated the link.

In some embodiments, the client may be offered to play one or more games, and, depending on the client's performance in the game, various changes to the amount contributed and/or the fundraising campaign may be made. For example, while the client is waiting for the trade evaluations, he may be offered to play a game of trivia or another short game. And, if the client gets better than a predetermined threshold score or gets better than a predetermined threshold score and successfully completes the trade, the client may be given a reward associated with a fundraising campaign. An example reward may be the kiosk operator contributing an additional amount to at least one of the fundraising campaigns selected by the client.

In an embodiment of the invention, users may register to a feed, such as a newsletter, a Twitter account, an RSS feed or other electronic feed in order to receive updates about a specific fundraising campaign, or part of their program, including more granular levels such as "how is my tree doing". Registration may occur at the kiosk, for instance by having the kiosk capturing the desired feed address, for example the Twitter account of the user or its electronic mail address, sending such information to a server for registering in a database and probably sending a confirmation message to said desired feed address.

In an embodiment users may be given the option to participate furthermore into the fundraising program through the use of the kiosk, the app or otherwise. For example, a user may be provided a choice to "Plant more trees", by providing additional funding, which may come from a portion of the sale of its electronic device, or by providing additional funding through electronic payments for example on its mobile app. Users could also embark into periodical transfer of moneys to the fundraising organization through the app. In an embodiment of the invention, users may give names to trees, wells or other fundraising campaign point of presence. This information may then be used dynamically by the network to demonstrate concrete effort made by the network toward helping the planet.

Each kiosk may be configured to issue printed or electronic receipts that can be used by the user for tax filing purposes.

Each kiosk, in addition to its display device(s), may also have other digital signage that can be used, for example, to display information about various fundraising campaigns and/or games associated with the kiosk. For example, the digital signage can announce the current status of a fundraising campaign (e.g., number of trees planted and amount of money collected). Some embodiments may display pictures, maps or other information on the kiosk's displays or other digital signage connected to the kiosk. In an example embodiment, an interactive map may be presented showing the trees planted in a particular campaign, and highlighting trees planted by persons satisfying certain predetermined criteria.

In an example embodiment dynamic information about the progress of fundraising campaigns, as furthermore explained below, may be provided on screen, through the main kiosk monitor, through the digital signage displays, through the app or through a website, and such information is being dynamically updated as actions are made either on a specific kiosk, within a specific geographical area or network-wide. For example, a kiosk could display dynamic information such as "This kiosk planted 500 trees" or "BuyBackBooth helped the planet by planting 500 000 trees". Such information may also include fundraising campaign created content such as videos filmed locally and uploaded, or through social media.

The accounting for keeping track of contributions to the fundraising campaigns and distributing such contributions may be controlled in any of several ways. In some embodiments, the kiosk and/or app may be configured to enable a user to specify that configurable portions of a total contribution amount from the user is credited to one account or to a plurality of accounts. The apportionment among the different accounts may be configurable (e.g., as percentages of the total contribution amount). The aggregate credited amounts may be maintained such that the contributions can be tracked for each kiosk and for each geographic area by each fundraising project.

In an effort to augment the client or fan base, in some embodiments, the network may, at several entry points, such as when the user completes a transaction at the kiosk, after the user donates a certain amount for a fundraising, when the user completes a pre-evaluation when downloading the app, request the user to register to a newsletter and, in turn, in some embodiments, the network may offer to make something special through for instance a fundraising campaign affiliate, such as planting an extra tree upon confirmation of the validity of an email.

At operation 1912, the rest of the processing to complete the trade transaction takes place. This operations will reduce the payout amount to the client by the total amount of the client's contributions to the selected campaigns made in this trade. The processing at operation 1912, using the changed payout amount, may be similar to that described in relation to operations 866-874 in process 800 above, where the payout amount is paid to the client, and the trade device is secured within the kiosk.

Although particular embodiments have been described above, a person of skill in the art having been provided with this disclosure, would appreciate aspects of the different embodiments may be used in various combinations to realize still other embodiments of an electronic kiosk for recycling electronic devices.

While the embodiments presented herein have been described in detail, the foregoing description is in all aspects illustrative and not restrictive. It is understood that numerous other modifications and variations can be devised without departing from the scope of the disclosed embodiments.

What is claimed is:

1. A distributed kiosk system, comprising:
   a central server;
   a plurality of kiosks, wherein each kiosk includes a portable device receiving arrangement and a payment dispensing arrangement, is connected to the central server via a network, and is configured to:
      receive, using the portable device receiving arrangement, a portable electronic device deposited by a client;
      display a list of one or more fundraising campaigns from a database;
      receive a client selection of a selected fundraising campaign from the displayed list;
      determine a value of the deposited portable electronic device, wherein the determining a value is based upon a comparison of a location of the kiosk to the geographic location criteria associated with the selected fundraising campaign in a database comprising geographic location criteria for a plurality of fundraising campaigns;
      credit a first amount to the selected fundraising campaign, wherein the first amount is determined based at least upon the determined value and upon a result of a game executed on the kiosk for playing by the client;
      pay to the client, using the payment dispensing arrangement, a second amount determined based upon the determined value and the first amount;
      post information related to the selected fundraising campaign and the crediting to a social media site;
      count a number of said posting by the client and/or access to the posting by others informed by the client;
      determine, when the counted number is greater than a predetermined threshold, an incentive for the client; and
      display the incentive determined for the client.

2. The distributed kiosk system according to claim 1, further comprising:
   choosing, from a plurality of fundraising campaigns in the database, said list to include fundraising campaigns based upon a type or characteristic of the portable electronic device.

3. The distributed kiosk system according to claim 1, wherein said determining a value is based upon an evaluated condition of the deposited portable electronic device and the selected fundraising campaign.

4. The distributed kiosk system according to claim 3, wherein a database comprises portable device condition criteria for a plurality of fundraising campaigns, and wherein the determining a value is based upon a comparison of the evaluated condition to the portable device condition criteria associated with the selected fundraising campaign in the database.

5. The distributed kiosk system according to claim 3, wherein a database comprises portable device value criteria for a plurality of fundraising campaigns, and wherein the determining a value is based upon the evaluated condition and the portable device value criteria associated with the selected fundraising campaign in the database.

6. The distributed kiosk system according to claim 1, further comprising:
   selecting the game from a plurality of games, the selecting being based upon a type of characteristic of the deposited portable electronic device.

7. The distributed kiosk system according to claim 1, further comprising:
   determining an incentive associated with the selected fundraising campaign, wherein the incentive is determined based at least upon an aspect of the deposited portable electronic device; and presenting the incentive for selection by the client.

8. The distributed kiosk system according to claim 1, further comprising:
   determining an incentive associated with the selected fundraising campaign, wherein the incentive is determined based at least upon a value of portable electronic devices deposited at the kiosk.

9. The distributed kiosk system according to claim 1, wherein the incentive is determined based further upon a value of deposited portable electronic devices in a group of kiosks including said kiosk.

10. The distributed kiosk system according to claim 1, further comprising:
    displaying, on a display of the kiosk, up to date information from the group of kiosks regarding the fundraising campaign.

11. A kiosk including a portable device receiving arrangement and a payment dispensing arrangement, and connected to the central server via a network, the kiosk configured to:
    receive, using the portable device receiving arrangement, a portable electronic device deposited by a client;
    display a list of one or more fundraising campaigns from a database;
    receive a client selection of a selected fundraising campaign from the displayed list;
    determine a value of the deposited portable electronic device, wherein the determining a value is based upon a comparison of a location of the kiosk to the geographic location criteria associated with the selected fundraising campaign in a database comprising geographic location criteria for a plurality of fundraising campaigns;

credit a first amount to the selected fundraising campaign, wherein the first amount is determined based at least upon the determined value and upon a result of a game executed on the kiosk for playing by the client;

pay to the client, using the payment dispensing arrangement, a second amount determined based upon the determined value and the first amount;

post information related to the selected fundraising campaign and the crediting to a social media site;

count a number of said posting by the client and/or access to the posting by others informed by the client;

determine, when the counted number is greater than a predetermined threshold, an incentive for the client; and display the incentive determined for the client.

12. The kiosk according to claim 11, further configured to choose, from a plurality of fundraising campaigns in the database, said list to include fundraising campaigns based upon a type or characteristic of the portable electronic device.

13. The kiosk according to claim 11, wherein said determining a value is based upon an evaluated condition of the deposited portable electronic device and the selected fundraising campaign.

14. The kiosk according to claim 13, wherein a database comprises portable device condition criteria for a plurality of fundraising campaigns, and wherein the determining a value is based upon a comparison of the evaluated condition to the portable device condition criteria associated with the selected fundraising campaign in the database.

15. The kiosk according to claim 13, wherein a database comprises portable device value criteria for a plurality of fundraising campaigns, and wherein the determining a value is based upon the evaluated condition and the portable device value criteria associated with the selected fundraising campaign in the database.

16. A method performed by a kiosk which includes a portable device receiving arrangement and a payment dispensing arrangement, and is connected to a central server via a network, the method comprising:

receiving, using the portable device receiving arrangement, a portable electronic device deposited by a client;

displaying a list of one or more fundraising campaigns from a database;

receiving a client selection of a selected fundraising campaign from the displayed list;

determining a value of the deposited portable electronic device, wherein the determining a value is based upon a comparison of a location of the kiosk to the geographic location criteria associated with the selected fundraising campaign in a database comprising geographic location criteria for a plurality of fundraising campaigns;

crediting a first amount to the selected fundraising campaign, wherein the first amount is determined based at least upon the determined value and upon a result of a game executed on the kiosk for playing by the client;

paying to the client, using the payment dispensing arrangement, a second amount determined based upon the determined value and the first amount;

post information related to the selected fundraising campaign and the crediting to a social media site;

count a number of said posting by the client and/or access to the posting by others informed by the client;

determine, when the counted number is greater than a predetermined threshold, an incentive for the client; and display the incentive determined for the client.

17. The method according to claim 16, further comprising:

choosing, from a plurality of fundraising campaigns in the database, said list to include fundraising campaigns based upon a type or characteristic of the portable electronic device.

18. The method according to claim 16, wherein said determining a value is based upon an evaluated condition of the deposited portable electronic device and the selected fundraising campaign.

19. The method according to claim 18, wherein a database comprises portable device condition criteria for a plurality of fundraising campaigns, and wherein the determining a value is based upon a comparison of the evaluated condition to the portable device condition criteria associated with the selected fundraising campaign in the database.

20. The method according to claim 18, wherein a database comprises portable device value criteria for a plurality of fundraising campaigns, and wherein the determining a value is based upon the evaluated condition and the portable device value criteria associated with the selected fundraising campaign in the database.

* * * * *